United States Patent
Rose et al.

(10) Patent No.: US 10,500,481 B2
(45) Date of Patent: *Dec. 10, 2019

(54) DYNAMIC PAYMENT OPTIMIZATION APPARATUSES, METHODS AND SYSTEMS

(71) Applicant: PLAYSPAN INC., San Francisco, CA (US)

(72) Inventors: Mark Rose, San Jose, CA (US); Afshin Shafie, Los Gatos, CA (US); Lex N. Bayer, Melno Park, CA (US)

(73) Assignee: PLAYSPAN INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/701,391

(22) Filed: Sep. 11, 2017

(65) Prior Publication Data
US 2018/0056179 A1 Mar. 1, 2018

Related U.S. Application Data

(63) Continuation of application No. 14/036,562, filed on Sep. 25, 2013, now Pat. No. 9,757,644, which is a (Continued)

(51) Int. Cl.
*A63F 13/00* (2014.01)
*G06Q 20/12* (2012.01)
(Continued)

(52) U.S. Cl.
CPC ........... *A63F 13/00* (2013.01); *G06Q 20/065* (2013.01); *G06Q 20/12* (2013.01); *G06Q 20/127* (2013.01);
(Continued)

(58) Field of Classification Search
CPC ...... A63F 13/00; G06Q 20/065; G06Q 20/12; G06Q 20/127
(Continued)

(56) References Cited

U.S. PATENT DOCUMENTS

| 789,106 A | 5/1905 | Seymour |
| 5,237,164 A | 8/1993 | Takada |

(Continued)

FOREIGN PATENT DOCUMENTS

| EP | 0855659 A1 | 7/1998 |
| JP | 2008545210 A | 12/2008 |

(Continued)

OTHER PUBLICATIONS

Gopalan, NP & Selvan, B Siva. TCP/IP Illustrated. Prentice-Hall. 2008. pp. 101-102, 175-176 and 235. 7 pages.

(Continued)

*Primary Examiner* — Vanel Frenel
(74) *Attorney, Agent, or Firm* — Loeb & Loeb LLP

(57) ABSTRACT

The DYNAMIC PAYMENT OPTIMIZATION APPARATUSES, METHODS AND SYSTEMS ("DPO") transform requests for on-demand and flexible monetization and related services via DPO components into currency transfers, purchase receipt notifications, social networking communications and transaction analytics reports. In some embodiments, the DPO obtains a user product purchase request for a user engaged in an online experience at a point of sale device. The DPO parses the user product purchase request, and thereby identifies at least one attribute of at least one of: the user; the online experience; and the point of sale device. The DPO customizes one or more properties of a user interface for initiating a purchase transaction related to the user product purchase request, according to the identified at least one attribute of the user, the online experience or the point of sale device; and providing the customized user interface.

19 Claims, 54 Drawing Sheets

Example Data Flow: Person-2-Person (P2P) Social Network Marketing

Related U.S. Application Data continuation of application No. 13/278,171, filed on Oct. 20, 2011, now Pat. No. 8,571,937.

(60) Provisional application No. 61/455,378, filed on Oct. 20, 2010, provisional application No. 61/455,379, filed on Oct. 20, 2010, provisional application No. 61/455,383, filed on Oct. 20, 2010, provisional application No. 61/455,454, filed on Oct. 21, 2010, provisional application No. 61/506,425, filed on Jul. 11, 2011.

(51) Int. Cl.

| | | |
|---|---|---|
| *G06Q 20/20* | (2012.01) | |
| *G06Q 20/32* | (2012.01) | |
| *G06Q 20/36* | (2012.01) | |
| *G06Q 20/38* | (2012.01) | |
| *G06Q 20/42* | (2012.01) | |
| *G06Q 30/06* | (2012.01) | |
| *G06Q 50/00* | (2012.01) | |
| *G06Q 20/06* | (2012.01) | |
| *G06Q 20/40* | (2012.01) | |
| *G06Q 30/02* | (2012.01) | |
| *A63F 13/792* | (2014.01) | |

(52) U.S. Cl.
CPC ......... *G06Q 20/20* (2013.01); *G06Q 20/3224* (2013.01); *G06Q 20/3274* (2013.01); *G06Q 20/3276* (2013.01); *G06Q 20/3278* (2013.01); *G06Q 20/363* (2013.01); *G06Q 20/381* (2013.01); *G06Q 20/385* (2013.01); *G06Q 20/405* (2013.01); *G06Q 20/425* (2013.01); *G06Q 30/0207* (2013.01); *G06Q 30/0241* (2013.01); *G06Q 30/06* (2013.01); *G06Q 30/0601* (2013.01); *G06Q 30/0641* (2013.01); *G06Q 50/01* (2013.01); *A63F 13/792* (2014.09)

(58) Field of Classification Search
USPC ....... 705/16, 21, 39, 40, 44, 26.1, 26.81, 76; 709/202, 203
See application file for complete search history.

(56) References Cited

U.S. PATENT DOCUMENTS

| | | | |
|---|---|---|---|
| 5,311,594 | A | 5/1994 | Penzias |
| 5,446,890 | A | 8/1995 | Renslo |
| 5,459,656 | A | 10/1995 | Fields |
| 5,510,777 | A | 4/1996 | Pilc |
| 5,521,362 | A | 5/1996 | Powers |
| 5,530,438 | A | 6/1996 | Bickham |
| 5,536,045 | A | 7/1996 | Adams |
| 5,588,105 | A | 12/1996 | Foster |
| 5,615,110 | A | 3/1997 | Wong |
| 5,615,264 | A | 3/1997 | Kazmierczak |
| 5,649,118 | A | 7/1997 | Carlisle |
| 5,815,657 | A | 9/1998 | Williams |
| 5,850,446 | A | 12/1998 | Berger |
| 5,878,337 | A | 3/1999 | Joao |
| 5,903,830 | A | 5/1999 | Joao |
| 5,943,624 | A | 8/1999 | Fox |
| 5,963,924 | A | 10/1999 | Williams |
| 6,061,660 | A | 5/2000 | Eggleston |
| 6,064,990 | A | 5/2000 | Goldsmith |
| 6,092,053 | A | 7/2000 | Boesch |
| 6,202,052 | B1 | 3/2001 | Miller |
| 6,202,933 | B1 | 3/2001 | Poore |
| 6,263,447 | B1 | 7/2001 | French |
| 6,267,292 | B1 | 7/2001 | Walker |
| 6,304,886 | B1 | 10/2001 | Bernardo |
| 6,330,593 | B1 | 12/2001 | Roberts |
| 6,336,099 | B1 | 1/2002 | Barnett |
| 6,374,250 | B2 | 4/2002 | Ajtai |
| 6,473,500 | B1 | 10/2002 | Risafi |
| 6,529,725 | B1 | 3/2003 | Joao |
| 6,535,855 | B1 | 3/2003 | Cahill |
| 6,601,761 | B1 | 8/2003 | Katis |
| 6,643,652 | B2 | 11/2003 | Helgeson |
| 6,735,572 | B2 | 5/2004 | Landesmann |
| 6,799,165 | B1 | 9/2004 | Boesjes |
| 6,842,741 | B1 | 1/2005 | Fujimura |
| 6,853,386 | B1 | 2/2005 | Keim |
| 6,853,982 | B2 | 2/2005 | Smith |
| 6,857,073 | B2 | 2/2005 | French |
| 6,873,974 | B1 | 3/2005 | Schutzer |
| 6,898,598 | B2 | 5/2005 | Himmel |
| 6,915,279 | B2 | 7/2005 | Hogan |
| 6,934,528 | B2 | 8/2005 | Loureiro |
| 6,963,859 | B2 | 11/2005 | Stefik |
| 6,999,943 | B1 | 2/2006 | Johnson |
| 7,015,912 | B2 | 3/2006 | Marais |
| 7,024,383 | B1 | 4/2006 | Mancini |
| 7,028,052 | B2 | 4/2006 | Chapman |
| 7,047,041 | B2 | 5/2006 | Vanska |
| 7,051,002 | B2 | 5/2006 | Keresman, III |
| 7,089,208 | B1 | 8/2006 | Levchin |
| 7,096,003 | B2 | 8/2006 | Joao |
| 7,111,789 | B2 | 9/2006 | Rajasekaran |
| 7,155,411 | B1 | 12/2006 | Blinn |
| 7,165,041 | B1 | 1/2007 | Guheen |
| 7,167,844 | B1 | 1/2007 | Leong |
| 7,177,848 | B2 | 2/2007 | Hogan |
| 7,194,437 | B1 | 3/2007 | Britto |
| 7,206,847 | B1 | 4/2007 | Alberth |
| 7,212,979 | B1 | 5/2007 | Matz |
| RE39,736 | E | 7/2007 | Morrill |
| 7,268,667 | B2 | 9/2007 | Beenau |
| 7,268,668 | B2 | 9/2007 | Beenau |
| 7,290,704 | B1 | 11/2007 | Ball |
| 7,318,049 | B2 | 1/2008 | Iannacci |
| 7,337,119 | B1 | 2/2008 | Geschwender |
| 7,337,144 | B1 | 2/2008 | Blinn |
| 7,343,149 | B2 | 3/2008 | Benco |
| 7,343,351 | B1 | 3/2008 | Bishop |
| 7,349,885 | B2 | 3/2008 | Gangi |
| 7,356,505 | B2 | 4/2008 | March |
| 7,357,310 | B2 | 4/2008 | Calabrese |
| 7,359,880 | B2 | 4/2008 | Abel |
| 7,373,669 | B2 | 5/2008 | Eisen |
| 7,379,899 | B1 | 5/2008 | Junger |
| 7,392,222 | B1 | 6/2008 | Hamilton |
| 7,395,242 | B2 | 7/2008 | Blinn |
| 7,398,250 | B2 | 7/2008 | Blinn |
| 7,413,113 | B1 | 8/2008 | Zhu |
| 7,450,966 | B2 | 11/2008 | Vanska |
| 7,477,780 | B2 | 1/2009 | Boncyk |
| 7,499,889 | B2 | 3/2009 | Golan |
| 7,500,607 | B2 | 3/2009 | Williams |
| 7,533,064 | B1 | 5/2009 | Boesch |
| 7,536,360 | B2 | 5/2009 | Stolfo |
| 7,571,139 | B1 | 8/2009 | Giordano |
| 7,571,140 | B2 | 8/2009 | Weichert |
| 7,593,858 | B2 | 9/2009 | Matz |
| 7,603,311 | B1 | 10/2009 | Yadav-ranjan |
| 7,630,937 | B1 | 12/2009 | Mo |
| 7,634,295 | B2 | 12/2009 | Hayaashi |
| 7,644,037 | B1 | 1/2010 | Ostrovsky |
| 7,644,859 | B1 | 1/2010 | Zhu |
| 7,645,194 | B2 | 1/2010 | Van Luchene |
| 7,660,749 | B2 | 2/2010 | Koski |
| 7,676,434 | B2 | 3/2010 | Evans |
| 7,685,067 | B1 | 3/2010 | Britto |
| 7,698,221 | B2 | 4/2010 | Blinn |
| 7,707,113 | B1 | 4/2010 | Dimartino |
| 7,708,194 | B2 | 5/2010 | Vawter |
| 7,708,198 | B2 | 5/2010 | Gangi |
| 7,712,658 | B2 | 5/2010 | Gangi |
| 7,716,141 | B2 | 5/2010 | Stewart |
| 7,734,630 | B2 | 6/2010 | Kato |

(56) References Cited

U.S. PATENT DOCUMENTS

| | | |
|---|---|---|
| 7,739,194 B2 | 6/2010 | Blinn |
| 7,742,984 B2 | 6/2010 | Mohsenzadeh |
| 7,756,752 B2 | 7/2010 | Duvall |
| 7,765,166 B2 | 7/2010 | Beringer |
| 7,774,076 B2 | 8/2010 | Skowronek |
| 7,779,360 B1 | 8/2010 | Jones |
| 7,783,569 B2 | 8/2010 | Abel |
| 7,784,684 B2 | 8/2010 | Labrou |
| 7,801,829 B2 | 9/2010 | Gray |
| 7,802,719 B2 | 9/2010 | Johnson |
| 7,810,720 B2 | 10/2010 | Lovett |
| 7,819,307 B2 | 10/2010 | Lyons |
| 7,828,206 B2 | 11/2010 | Hessburg |
| 7,828,992 B2 | 11/2010 | Kilickiran |
| 7,837,125 B2 | 11/2010 | Biskupski |
| 7,844,530 B2 | 11/2010 | Ziade |
| 7,849,014 B2 | 12/2010 | Erikson |
| 7,870,027 B1 | 1/2011 | Tannenbaum |
| 7,877,299 B2 | 1/2011 | Bui |
| 7,878,400 B2 | 2/2011 | Harris |
| 7,890,370 B2 | 2/2011 | Whitsitt |
| 7,890,393 B2 | 2/2011 | Talbert |
| 7,895,119 B2 | 2/2011 | Praisner |
| 7,899,744 B2 | 3/2011 | Bishop |
| 7,904,360 B2 | 3/2011 | Evans |
| 7,908,227 B2 | 3/2011 | Zizzimopoulos |
| 7,926,714 B1 | 4/2011 | Zhu |
| 7,933,779 B2 | 4/2011 | Rooks |
| 7,942,337 B2 | 5/2011 | Jain |
| 7,962,418 B1 | 6/2011 | Wei |
| 7,967,196 B1 | 6/2011 | Bierbaum |
| 7,971,782 B1 | 7/2011 | Shams |
| 7,996,259 B1 | 8/2011 | Distefano, III |
| 8,016,192 B2 | 9/2011 | Messerges |
| 8,020,763 B1 | 9/2011 | Kowalchyk |
| 8,024,260 B1 | 9/2011 | Hogl |
| 8,028,041 B2 | 9/2011 | Olliphant |
| 8,032,438 B1 | 10/2011 | Barton |
| 8,041,338 B2 | 10/2011 | Chen |
| 8,050,997 B1 | 11/2011 | Nosek |
| 8,060,413 B2 | 11/2011 | Castell |
| 8,074,876 B2 | 12/2011 | Foss |
| 8,086,535 B2 | 12/2011 | Zweig |
| 8,090,618 B1 | 1/2012 | Chu |
| 8,108,261 B2 | 1/2012 | Carlier |
| 8,127,982 B1 | 3/2012 | Casey |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,975 B2 | 5/2012 | Cai |
| 8,175,979 B2 | 5/2012 | Baentsch |
| 8,176,416 B1 | 5/2012 | Williams |
| 8,179,563 B2 | 5/2012 | King |
| 8,180,289 B1 | 5/2012 | Glickman |
| 8,180,705 B2 | 5/2012 | Kowalchyk |
| 8,185,439 B2 | 5/2012 | Webb |
| 8,190,513 B2 | 5/2012 | Felger |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,200,582 B1 | 6/2012 | Zhu |
| 8,204,774 B2 | 6/2012 | Chwast |
| 8,204,829 B2 | 6/2012 | Alvarez |
| 8,209,217 B1 | 6/2012 | Griffith |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,275,704 B2 | 9/2012 | Bishop |
| 8,280,777 B2 | 10/2012 | Mengerink |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |

(56) References Cited

U.S. PATENT DOCUMENTS

| | | |
|---|---|---|
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,380,177 B2 | 2/2013 | Laracey |
| 8,401,904 B1 | 3/2013 | Simakov |
| 8,412,586 B1 | 4/2013 | Foulser |
| 8,412,630 B2 | 4/2013 | Ross |
| 8,417,633 B1 | 4/2013 | Chmara |
| 8,423,462 B1 | 4/2013 | Amacker |
| 8,429,013 B2 | 4/2013 | Symons |
| 8,504,559 B1 | 8/2013 | Elman |
| 8,606,649 B2 | 12/2013 | Keener, Jr. |
| 8,639,685 B2 | 1/2014 | Huang |
| 8,788,935 B1 | 7/2014 | Hirsch |
| 9,355,393 B2 | 5/2016 | Purves |
| 9,430,579 B2 | 8/2016 | Hsu |
| 9,471,332 B2 | 10/2016 | Li |
| 9,582,598 B2 | 2/2017 | Kalgi |
| 9,622,142 B2 | 4/2017 | Burton |
| 9,710,807 B2 | 7/2017 | Theurer |
| 9,760,871 B1 | 9/2017 | Pourfallah |
| 9,940,610 B1 | 4/2018 | Davison |
| 2001/0037297 A1 | 3/2001 | McNair |
| 2001/0044774 A1 | 11/2001 | Sasazawa |
| 2001/0056359 A1 | 12/2001 | Abreu |
| 2002/0016765 A1 | 2/2002 | Sacks |
| 2002/0019777 A1 | 2/2002 | Schwab |
| 2002/0040325 A1 | 4/2002 | Takae |
| 2002/0077976 A1 | 6/2002 | Meyer |
| 2002/0082919 A1 | 6/2002 | Laundau |
| 2002/0107755 A1 | 8/2002 | Steed |
| 2002/0112014 A1 | 8/2002 | Bennett |
| 2002/0116271 A1 | 8/2002 | Mankoff |
| 2002/0120859 A1 | 8/2002 | Lipkin |
| 2002/0143614 A1 | 10/2002 | MacLean |
| 2003/0014307 A1 | 1/2003 | Heng |
| 2003/0014331 A1 | 1/2003 | Simons |
| 2003/0020748 A1 | 1/2003 | Charpentier |
| 2003/0026404 A1 | 2/2003 | Joyce |
| 2003/0028481 A1 | 2/2003 | Flitcroft |
| 2003/0061170 A1 | 3/2003 | Uzo |
| 2003/0061482 A1 | 3/2003 | Emmerichs |
| 2003/0080185 A1 | 5/2003 | Werther |
| 2003/0097318 A1 | 5/2003 | Yu |
| 2003/0101134 A1 | 5/2003 | Liu |
| 2003/0135734 A1 | 7/2003 | Fagan |
| 2003/0135842 A1 | 7/2003 | Frey |
| 2003/0158811 A1 | 8/2003 | Sanders |
| 2003/0174823 A1 | 9/2003 | Justice |
| 2003/0177361 A1 | 9/2003 | Wheeler |
| 2003/0191711 A1 | 10/2003 | Jamison |
| 2003/0200142 A1 | 10/2003 | Hicks |
| 2003/0200184 A1 | 10/2003 | Dominguez |
| 2003/0212642 A1 | 11/2003 | Weller |
| 2003/0233286 A1 | 12/2003 | Hahn-Carlson |
| 2004/0054625 A1 | 3/2004 | Kellogg |
| 2004/0059659 A1 | 3/2004 | Safaei |
| 2004/0078332 A1 | 4/2004 | Ferguson |
| 2004/0103037 A1 | 5/2004 | Wetmore |
| 2004/0117358 A1 | 6/2004 | von Kaenel |
| 2004/0128197 A1 | 7/2004 | Bam |
| 2004/0138999 A1 | 7/2004 | Friedman |
| 2004/0148255 A1 | 7/2004 | Beck |
| 2004/0215963 A1 | 10/2004 | Kaplan |
| 2004/0230536 A1 | 11/2004 | Fung |
| 2004/0236646 A1 | 11/2004 | Wu |
| 2004/0254836 A1 | 12/2004 | Emoke Barabas |
| 2004/0254891 A1 | 12/2004 | Blinn |
| 2004/0267608 A1 | 12/2004 | Mansfield |
| 2005/0010483 A1 | 1/2005 | Ling |
| 2005/0015338 A1 | 1/2005 | Lee |
| 2005/0037735 A1 | 2/2005 | Courts |
| 2005/0065819 A1 | 3/2005 | Pamela |
| 2005/0080747 A1 | 4/2005 | Anderson |
| 2005/0080821 A1 | 4/2005 | Breil |
| 2005/0097320 A1 | 5/2005 | Golan |
| 2005/0137969 A1 | 6/2005 | Shah |
| 2005/0171894 A1 | 8/2005 | Traynor |
| 2005/0177464 A1 | 8/2005 | Komem |
| 2005/0192893 A1 | 9/2005 | Keeling |
| 2005/0192895 A1 | 9/2005 | Rogers |
| 2005/0220326 A1 | 10/2005 | Sim |
| 2005/0234817 A1 | 10/2005 | VanFleet |
| 2005/0246278 A1 | 11/2005 | Gerber |
| 2005/0253840 A1 | 11/2005 | Kwon |
| 2005/0254714 A1 | 11/2005 | Anne |
| 2005/0261967 A1 | 11/2005 | Barry |
| 2006/0004713 A1 | 1/2006 | Korte |
| 2006/0005207 A1 | 1/2006 | Louch |
| 2006/0015399 A1 | 1/2006 | Alberth |
| 2006/0041618 A1 | 2/2006 | Chang |
| 2006/0053056 A1 | 3/2006 | Alspach-goss |
| 2006/0053077 A1 | 3/2006 | Mourad |
| 2006/0085328 A1 | 4/2006 | Cohen |
| 2006/0085477 A1 | 4/2006 | Phillips |
| 2006/0089962 A1 | 4/2006 | Tsukazaki |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano |
| 2006/0190347 A1 | 8/2006 | Cuervo |
| 2006/0212722 A1 | 9/2006 | Ginter |
| 2006/0218153 A1 | 9/2006 | Voon |
| 2006/0226216 A1 | 10/2006 | Keithley |
| 2006/0268007 A1 | 11/2006 | Gopalakrishnan |
| 2006/0277143 A1 | 12/2006 | Almonte |
| 2006/0293947 A1 | 12/2006 | Nicholson |
| 2007/0011025 A1 | 1/2007 | Cracchiolo |
| 2007/0038515 A1 | 2/2007 | Postrel |
| 2007/0038516 A1 | 2/2007 | Apple |
| 2007/0055571 A1 | 3/2007 | Fox |
| 2007/0060315 A1 | 3/2007 | Park |
| 2007/0061250 A1 | 3/2007 | Kuo |
| 2007/0087820 A1 | 4/2007 | Van |
| 2007/0087822 A1 | 4/2007 | Van Luchene |
| 2007/0094066 A1 | 4/2007 | Kumar |
| 2007/0100691 A1 | 5/2007 | Patterson |
| 2007/0100728 A1 | 5/2007 | Rotman |
| 2007/0101276 A1 | 5/2007 | Yuen |
| 2007/0106607 A1 | 5/2007 | Seib |
| 2007/0113289 A1 | 5/2007 | Blumenau |
| 2007/0143204 A1 | 6/2007 | Claus |
| 2007/0150413 A1 | 6/2007 | Morgenstern |
| 2007/0180119 A1 | 8/2007 | Khivesara |
| 2007/0189579 A1 | 8/2007 | Crookham |
| 2007/0208662 A1 | 9/2007 | Jeronimus |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0239502 A1 | 10/2007 | Babu |
| 2007/0239552 A1 | 10/2007 | Sundaresan |
| 2007/0255653 A1 | 11/2007 | Tumminaro |
| 2007/0267479 A1 | 11/2007 | Nix |
| 2007/0276765 A1 | 11/2007 | Hazel |

(56) References Cited

U.S. PATENT DOCUMENTS

| | | |
|---|---|---|
| 2007/0299976 A1 | 12/2007 | Zafar |
| 2008/0004116 A1 | 1/2008 | Van |
| 2008/0004952 A1 | 1/2008 | Koli |
| 2008/0010096 A1 | 1/2008 | Patterson |
| 2008/0021829 A1 | 1/2008 | Kranzley |
| 2008/0034309 A1 | 2/2008 | Louch |
| 2008/0077489 A1 | 3/2008 | Gilley |
| 2008/0086365 A1 | 4/2008 | Zollino |
| 2008/0091553 A1 | 4/2008 | Koski |
| 2008/0091616 A1 | 4/2008 | Helwin |
| 2008/0097856 A1 | 4/2008 | Blagg |
| 2008/0097871 A1 | 4/2008 | Williams |
| 2008/0104496 A1 | 5/2008 | Williams |
| 2008/0114737 A1 | 5/2008 | Neely |
| 2008/0120194 A1 | 5/2008 | Juras |
| 2008/0126145 A1 | 5/2008 | Racklet, III |
| 2008/0133351 A1 | 6/2008 | White |
| 2008/0140568 A1 | 6/2008 | Henry |
| 2008/0147480 A1 | 6/2008 | Sarma |
| 2008/0147883 A1 | 6/2008 | Philyaw |
| 2008/0148283 A1 | 6/2008 | Allen |
| 2008/0154915 A1 | 6/2008 | Flake |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0181463 A1 | 7/2008 | Error |
| 2008/0195510 A1 | 8/2008 | Olliphant |
| 2008/0195664 A1 | 8/2008 | Maharajh |
| 2008/0208704 A1 | 8/2008 | Wang |
| 2008/0208712 A1 | 8/2008 | Yerkes |
| 2008/0222170 A1 | 9/2008 | Farnham |
| 2008/0223918 A1 | 9/2008 | Williams |
| 2008/0235123 A1 | 9/2008 | Olliphant |
| 2008/0244509 A1 | 10/2008 | Buchs |
| 2008/0263460 A1 | 10/2008 | Altberg |
| 2008/0270300 A1 | 10/2008 | Jones |
| 2008/0272188 A1 | 11/2008 | Keithley |
| 2008/0319905 A1 | 12/2008 | Carlson |
| 2009/0006181 A1 | 1/2009 | Ghosh |
| 2009/0024452 A1 | 1/2009 | Martinez |
| 2009/0024527 A1 | 1/2009 | Sellen |
| 2009/0031228 A1 | 1/2009 | Buchs |
| 2009/0037255 A1 | 2/2009 | Chiu |
| 2009/0048934 A1 | 2/2009 | Haddad |
| 2009/0055757 A1 | 2/2009 | Chaney |
| 2009/0061884 A1 | 3/2009 | Rajan |
| 2009/0063261 A1 | 3/2009 | Scribner |
| 2009/0064056 A1 | 3/2009 | Anderson |
| 2009/0076934 A1 | 3/2009 | Shahbazi |
| 2009/0076953 A1 | 3/2009 | Saville |
| 2009/0076966 A1 | 3/2009 | Bishop |
| 2009/0089176 A1 | 4/2009 | Mccabe |
| 2009/0089193 A1 | 4/2009 | Paintin |
| 2009/0096812 A1 | 4/2009 | Boixel |
| 2009/0099925 A1 | 4/2009 | Mehta |
| 2009/0099961 A1 | 4/2009 | Ogilvy |
| 2009/0104888 A1 | 4/2009 | Cox |
| 2009/0106151 A1 | 4/2009 | Nelsen |
| 2009/0119176 A1 | 5/2009 | Johnson |
| 2009/0119211 A1 | 5/2009 | Johnson |
| 2009/0132347 A1 | 5/2009 | Anderson |
| 2009/0132395 A1 | 5/2009 | Lam |
| 2009/0132403 A1 | 5/2009 | Titus |
| 2009/0132435 A1 | 5/2009 | Titus |
| 2009/0138525 A1 | 5/2009 | Mattox |
| 2009/0144104 A1 | 6/2009 | Johnson |
| 2009/0150388 A1 | 6/2009 | Roseman |
| 2009/0164315 A1 | 6/2009 | Rothman |
| 2009/0164344 A1 | 6/2009 | Shiftan |
| 2009/0171760 A1 | 7/2009 | Aarnlo |
| 2009/0171778 A1 | 7/2009 | Powell |
| 2009/0182664 A1 | 7/2009 | Trombley |
| 2009/0182762 A1 | 7/2009 | Chang |
| 2009/0182837 A1 | 7/2009 | Roberts |
| 2009/0210300 A1 | 8/2009 | Cansler |
| 2009/0222302 A1 | 9/2009 | Higgins |
| 2009/0222347 A1 | 9/2009 | Whitten |
| 2009/0222511 A1 | 9/2009 | Hays |
| 2009/0233579 A1 | 9/2009 | Castell |
| 2009/0234751 A1 | 9/2009 | Chan |
| 2009/0241159 A1 | 9/2009 | Campagna |
| 2009/0248996 A1 | 10/2009 | Mandyam |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271265 A1 | 10/2009 | Lay |
| 2009/0271283 A1 | 10/2009 | Fosnacht |
| 2009/0288012 A1 | 11/2009 | Hertel |
| 2009/0307135 A1 | 12/2009 | Gupta |
| 2009/0313132 A1 | 12/2009 | McKenna |
| 2009/0327040 A1 | 12/2009 | McInerny |
| 2009/0327045 A1 | 12/2009 | Olives |
| 2009/0327088 A1 | 12/2009 | Puthupparambil |
| 2010/0004989 A1 | 1/2010 | Bonalle |
| 2010/0005025 A1 | 1/2010 | Kumar |
| 2010/0009663 A1 | 1/2010 | Chang |
| 2010/0010964 A1 | 1/2010 | Skowronek |
| 2010/0017501 A1 | 1/2010 | Yen |
| 2010/0023386 A1 | 1/2010 | Avisar |
| 2010/0023455 A1 | 1/2010 | Dispensa |
| 2010/0036741 A1 | 2/2010 | Cleven |
| 2010/0036775 A1 | 2/2010 | Edens |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0063873 A1 | 3/2010 | McGucken |
| 2010/0063903 A1 | 3/2010 | Whipple |
| 2010/0076873 A1 | 3/2010 | Taylor |
| 2010/0076987 A1 | 3/2010 | Schreiner |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0094730 A1 | 4/2010 | Koski |
| 2010/0100480 A1 | 4/2010 | Altman |
| 2010/0121707 A1 | 5/2010 | Goeldi |
| 2010/0125492 A1 | 5/2010 | Lin |
| 2010/0125495 A1 | 5/2010 | Smith |
| 2010/0125803 A1 | 5/2010 | Johnson |
| 2010/0130853 A1 | 5/2010 | Chandonnet |
| 2010/0131347 A1 | 5/2010 | Sarptipi |
| 2010/0131415 A1 | 5/2010 | Sartipi |
| 2010/0131569 A1 | 5/2010 | Lawyer |
| 2010/0131589 A1 | 5/2010 | Lawyer |
| 2010/0155470 A1 | 6/2010 | Woronec |
| 2010/0161433 A1 | 6/2010 | White |
| 2010/0174599 A1 | 7/2010 | Rosenblatt |
| 2010/0185505 A1 | 7/2010 | Sprogoe |
| 2010/0185531 A1 | 7/2010 | Van |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D |
| 2010/0211499 A1 | 8/2010 | Zanzot |
| 2010/0211863 A1 | 8/2010 | Jones |
| 2010/0216542 A1 | 8/2010 | Van Luchene |
| 2010/0217682 A1 | 8/2010 | Chan |
| 2010/0218128 A1 | 8/2010 | Bonat |
| 2010/0223119 A1 | 9/2010 | Klish |

(56) References Cited

U.S. PATENT DOCUMENTS

| | | |
|---|---|---|
| 2010/0227675 A1 | 9/2010 | Luxton |
| 2010/0241499 A1 | 9/2010 | Crispo |
| 2010/0241507 A1 | 9/2010 | Quinn |
| 2010/0250351 A1 | 9/2010 | Gillenson |
| 2010/0268648 A1 | 10/2010 | Wiesman |
| 2010/0276484 A1 | 11/2010 | Banerjee |
| 2010/0303230 A1 | 12/2010 | Taveau |
| 2010/0305848 A1 | 12/2010 | Stallman |
| 2010/0306075 A1 | 12/2010 | Drance |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0332262 A1 | 12/2010 | Horvitz |
| 2010/0332283 A1 | 12/2010 | Ng |
| 2011/0020129 A1 | 1/2011 | Petri Larrea |
| 2011/0022482 A1 | 1/2011 | Florek |
| 2011/0035594 A1 | 2/2011 | Fox |
| 2011/0047075 A1 | 2/2011 | Fourez |
| 2011/0059784 A1 | 3/2011 | Lutnick |
| 2011/0060663 A1 | 3/2011 | McPhie |
| 2011/0071843 A1 | 3/2011 | Gilvar |
| 2011/0078082 A1 | 3/2011 | Gupta |
| 2011/0082789 A1 | 4/2011 | Boyd |
| 2011/0085667 A1 | 4/2011 | Berrios |
| 2011/0087534 A1 | 4/2011 | Strebinger |
| 2011/0099057 A1 | 4/2011 | Tenyer |
| 2011/0105183 A1 | 5/2011 | Hsiao |
| 2011/0106698 A1 | 5/2011 | Issacson |
| 2011/0137742 A1 | 6/2011 | Parikh |
| 2011/0161882 A1 | 6/2011 | Dasgupta |
| 2011/0178896 A1 | 7/2011 | Nakajima |
| 2011/0184827 A1 | 7/2011 | Hubert |
| 2011/0191210 A1 | 8/2011 | Blackhurst |
| 2011/0196724 A1 | 8/2011 | Fenton |
| 2011/0201299 A1 | 8/2011 | Kamdar |
| 2011/0202406 A1 | 8/2011 | Suomela |
| 2011/0208629 A1 | 8/2011 | Benefieid |
| 2011/0209049 A1 | 8/2011 | Ghosh |
| 2011/0212762 A1 | 9/2011 | Ocko |
| 2011/0215146 A1 | 9/2011 | Shams |
| 2011/0218838 A1 | 9/2011 | Byce |
| 2011/0218846 A1 | 9/2011 | Fieldman |
| 2011/0218849 A1 | 9/2011 | Rutigliano |
| 2011/0218870 A1 | 9/2011 | Shams |
| 2011/0246290 A1 | 10/2011 | Howard |
| 2011/0258031 A1 | 10/2011 | Valin |
| 2011/0258123 A1 | 10/2011 | Dawkins |
| 2011/0276507 A1 | 11/2011 | OMalley |
| 2011/0296508 A1 | 12/2011 | Os |
| 2011/0320250 A1 | 12/2011 | Gemmell |
| 2011/0320344 A1 | 12/2011 | Faith |
| 2012/0005030 A1 | 1/2012 | Valin |
| 2012/0011063 A1 | 1/2012 | Killian |
| 2012/0020973 A1 | 1/2012 | Crowe |
| 2012/0022943 A1 | 1/2012 | Howard |
| 2012/0022981 A1 | 1/2012 | Morgenstern |
| 2012/0023026 A1 | 1/2012 | Chen |
| 2012/0030101 A1 | 2/2012 | Boyd |
| 2012/0036071 A1 | 2/2012 | Fulton |
| 2012/0054049 A1 | 3/2012 | Hayes |
| 2012/0078735 A1 | 3/2012 | Bauer |
| 2012/0084135 A1 | 4/2012 | Nissan |
| 2012/0084204 A1 | 4/2012 | Castell |
| 2012/0089446 A1 | 4/2012 | Gupta |
| 2012/0095895 A1 | 4/2012 | Aston |
| 2012/0101881 A1 | 4/2012 | Taylor |
| 2012/0116966 A1 | 5/2012 | Tan |
| 2012/0118950 A1 | 5/2012 | Belk |
| 2012/0123838 A1 | 5/2012 | Sparks |
| 2012/0130853 A1 | 5/2012 | Petri |
| 2012/0136780 A1 | 5/2012 | El-Awady |
| 2012/0150598 A1 | 6/2012 | Griggs |
| 2012/0158580 A1 | 6/2012 | Eram |
| 2012/0158584 A1 | 6/2012 | Behren |
| 2012/0166333 A1 | 6/2012 | von Behren |
| 2012/0173431 A1 | 7/2012 | Ritchie |
| 2012/0190386 A1 | 7/2012 | Anderson |
| 2012/0197756 A1 | 8/2012 | Stacker |
| 2012/0209677 A1 | 8/2012 | Mehta |
| 2012/0215640 A1 | 8/2012 | Ramer |
| 2012/0215650 A1 | 8/2012 | Oba |
| 2012/0215701 A1 | 8/2012 | Mehta |
| 2012/0221421 A1 | 8/2012 | Hammad |
| 2012/0221502 A1 | 8/2012 | Jerram |
| 2012/0231844 A1 | 9/2012 | Coppinger |
| 2012/0259763 A1 | 10/2012 | Pessin |
| 2012/0304273 A1 | 11/2012 | Bailey |
| 2012/0310826 A1 | 12/2012 | Chatterjee |
| 2012/0323664 A1 | 12/2012 | Klems |
| 2013/0030922 A1 | 1/2013 | Shalabi |
| 2013/0041811 A1 | 2/2013 | Vazquez |
| 2013/0090750 A1 | 4/2013 | Herrman |
| 2013/0095910 A1 | 4/2013 | Chu |
| 2013/0151417 A1 | 6/2013 | Gupta |
| 2013/0185135 A1 | 7/2013 | Mason |
| 2013/0246943 A1 | 9/2013 | Goodman |
| 2013/0268763 A1 | 10/2013 | Sweet |
| 2013/0290203 A1 | 10/2013 | Purves |
| 2013/0304637 A1 | 11/2013 | McCabe |
| 2013/0346302 A1 | 12/2013 | Purves |
| 2014/0052617 A1 | 2/2014 | Chawla |
| 2014/0172472 A1 | 6/2014 | Florimond |
| 2014/0207662 A1 | 7/2014 | Isaacson |
| 2014/0282371 A1 | 9/2014 | Hirsch |
| 2014/0351048 A1 | 11/2014 | Fordyce |
| 2015/0221316 A1 | 8/2015 | Mufti |
| 2015/0262168 A1 | 9/2015 | Armstrong |
| 2015/0347989 A1 | 12/2015 | Kumar |
| 2016/0117780 A1 | 4/2016 | Semlani |
| 2016/0232515 A1 | 8/2016 | Jhas |
| 2016/0328693 A1 | 11/2016 | Mao |
| 2017/0185989 A1 | 6/2017 | Bozovich, Jr. |
| 2017/0193475 A1 | 7/2017 | Mercille |
| 2017/0193490 A1 | 7/2017 | Mercille |
| 2017/0221062 A1 | 8/2017 | Katz |
| 2017/0228711 A1 | 8/2017 | Chawla |
| 2017/0278085 A1 | 9/2017 | Anderson |
| 2018/0096321 A1 | 4/2018 | Haldenby |

FOREIGN PATENT DOCUMENTS

| | | |
|---|---|---|
| KR | 100432430 B1 | 5/2004 |
| KR | 20060117177 A | 11/2006 |
| KR | 20070104087 A | 10/2007 |
| WO | 0165502 A2 | 9/2001 |
| WO | 03023674 A1 | 3/2003 |
| WO | 2010148737 A1 | 12/2010 |

OTHER PUBLICATIONS

International Search Report and Written Opinion for PCT/US09/54921 dated Oct. 21, 2009. (2 pages).

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.

International Search Report and Written Opinion for PCT/US2010/048344 dated Nov. 15, 2010. (9 pages).

International Search Report and Written Opinion for PCT/US2010/041860 dated Feb. 1, 2011. (9 pages).

Jones, Peter, "SAP Business Information Warehouse Reporting: Building Better BI with SAP BI 7.0," Jan. 18, 2008, McGraw-Hill Osborne Media, Sections 3.1, 13.1, 15.2.

International Search Report for PCT/US11/49393 dated Dec. 5, 2011, (2 pages).

International Search Report and Written Opinion for PCT/US11/57179 dated Jan. 5, 2012. (7 pages).

(56) References Cited

OTHER PUBLICATIONS

International Search Report and Written Opinion for PCT/US11/57173 dated Mar. 15, 2012. (11 pages).
International Search Report and Written Opinion for PCT/US2012/026205, dated May 29, 2012. 8 pages.
International Search Report for PCT/US11/65305 dated Apr. 16, 2012. 2 pages.
International Search Report for PCT/US12/23856 dated Jun. 6, 2012. 3 pages.
International Search Report for PCT/US12/24772 dated Jul. 24, 2012. 3 pages.
International Search Report for PCT/US12/25530 dated Aug. 7, 2012. 4 pages.
International Search Report PCT/US12/27620 dated Aug. 10, 2012. 3 pages.
International Search Report and Written Opinion for PCT/US12/41437 dated Aug. 24, 2012. (11 pages).
International Search Report and Written Opinion for PCT/US12/37597 dated Sep. 21, 2012 (11 pages).
International Search Report for PCT/US12/39638 dated Sep. 24, 2012. 4 pages.
International Search Report for PCT/US12/45875 dated Nov. 16, 2012. 4 pages.
International Search Report for PCT/US12/47092 dated Nov. 26, 2012. 11 pages.
International Search Report for PCT/US12/57577 dated Nov. 29, 2012. 2 pages.
International Search Report for PCT/US12/57528 dated Dec. 17, 2012. 8 pages.
International Search Report and Written Opinion for PCT/US12/66898 dated Feb. 11, 2013. 14 pages.
International Search Report for PCT/US12/56759 dated Feb. 25, 2013. 12 pages.
International Search Report and Written Opinion for PCT/US2013/020411 dated May 21, 2013. 18 pages.
International Search Report and Written Opinion for PCT/US2013/024538, dated May 31, 2013. 15 pages.
Wikipedia, modified Aug. 26, 2010, "Social Graph"; http://web.archive.Org/web/20100914055833/http://en.wikipedia.org/wiki/Social_Graph, Accessed Aug. 29, 2013. 3 pages.
International Search Report and Written Opinion forPCT/US2013/031084, dated Jun. 4, 2013. 9 pages.
International Search Report and Written Opinion for PCT/US2010/033229 dated Dec. 29, 2010, 8 pages.
Written Opinion for PCT/US12/27620 dated Aug. 10, 2012. 5 pages.
David Breitkopf, "ACS to Take Over Mich. WC Distribution Program", American Banker, New York, NY: Jul. 20, 2006, vol. 171. Issue 138, p. 6.
International Search Report and Written Opinion for PCT/US2010/033861 dated Dec. 9, 2010 (7 pages).
International Search Report and Written Opinion for PCT/US2010/033547 dated Dec. 14, 2010 (3 pages).
International Search Report and Written Opinion for PCT/US2010/045445 dated Feb. 24, 2011 (3 pages).
International Search Report and Written Opinion for PCT/US2010/045500 dated Mar. 29, 2011 (3 pages).
International Search Report and Written Opinion for PCT/US2011/024941 dated Apr. 19, 2011 (6 pages).
International Search Report and Written Opinion for PCT/US2010/046833 dated Apr. 26, 2011 (8 pages).
PCT International Preliminary Report on Patentability dated Mar. 6, 2012 corresponding to application PCT/US2010/046833. 6 pages.
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion for PCT/US2011/035268 dated Aug. 5, 2011 (3 pages).
International Search Report and Written Opinion for PCT/US2011/032093 dated Aug. 24, 2011 (11 pages).
International Search Report and Writtten Opinion for PCT/US2011/039178 dated Sep. 16, 2011 (7 pages).
International Search Report and Written Opinion issued in connection with PCT/US11/42062 dated Sep. 29, 2011 (8 pages).
International Search Report and Written Opinion for PCT/US11/57180 dated Mar. 15, 2012 (11 pages).
International Search Report for PCT/US12/21000 dated May 15, 2012. 2 pages.
International Search Report and Written Opinion for PCT/US2012/027043 dated Jul. 13, 2012. 15 pages.
International Search Report and Written Opinion for PCT/US12/55636 dated Nov. 30, 2012. 2 pages.
International Search Report and Written Opinion for PCT/US2012/045601 dated Feb. 1, 2013. 11 pages.
International Search Report and Written Opinion for PCT/US2012/069557 dated Feb. 22, 2013. 8 pages.
International Search Report and Written Opinion for PCT/US12/65738 dated Apr. 19, 2013. 9 pages.
International Preliminary Report on Patentability for PCT/US2010/033229 dated Dec. 29, 2010. (8 pages).
Office Action dated Mar. 28, 2018 for U.S. Appl. No. 13/278,173 (pp. 1-22).
Office Action dated Apr. 3, 2018 for U.S. Appl. No. 14/230,327 (pp. 1-35).
Office Action dated May 8, 2018 for U.S. Appl. No. 13/278,166 (pp. 1-17).
Notice ofAllowanace dated May 18, 2018 for U.S. Appl. No. 13/714,090 (pp. 1-7).
Notice of Allowability dated May 31, 2018 for U.S. Appl. No. 13/714,090 (pp. 1-2).
Office Action dated Jun. 15, 2018 for U.S. Appl. No. 13/966,098 (pp. 1-8).
Office Action dated Jun. 20, 2018 for U.S. Appl. No. 14/037,131 (pp. 1-20).
Office Action dated Aug. 24, 2018 for U.S. Appl. No. 13/278,173 (pp. 1-19).
Office Action dated Sep. 17, 2018 for U.S. Appl. No. 13/278,166 (pp. 1-15).
Han, Hui and Trimi, Silvana; "Social Commerce Design: A Framework and Application", May 27, 2017, Journal of Theoretical and Applied Electronic Commerce Research, vol. 12, Issue 3; www.jtaer.com (Year: 2017) 20 pages.
Notice of Allowance dated Jan. 24, 2019 for U.S. Appl. No. 13/966,098 (pp. 1-10).
Office Action dated Apr. 2, 2019 for U.S. Appl. No. 13/278,173 (pp. 1-18).
Office Action dated Apr. 18, 2019 for U.S. Appl. No. 13/278,166 (pp. 1-13).
Notice of Allowance dated Jun. 12, 2019 for U.S. Appl. No. 14/230, (pp. 1-20).
Office Action dated Jun. 28, 2019 for U.S. Appl. No. 14/037,131 (pp. 1-6).

Example: Flexible Monetization Service ("FMS")

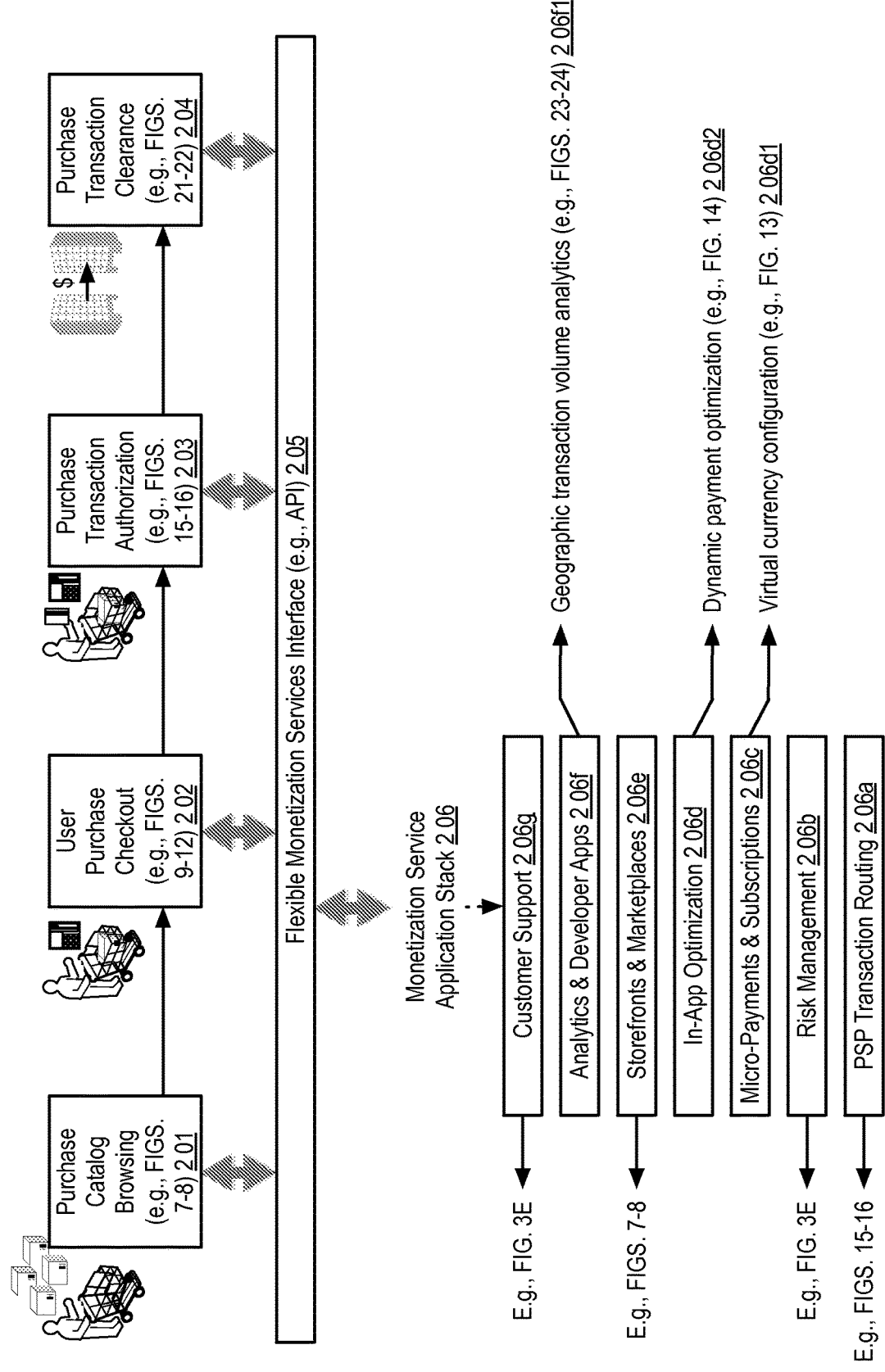
FIGURE 2    Example: Flexible Monetization Service Module Components & Configuration Example: Flexible Monetization Service - Web App Example: Flexible Monetization Service - Web App Example: Flexible Monetization Service - Web App

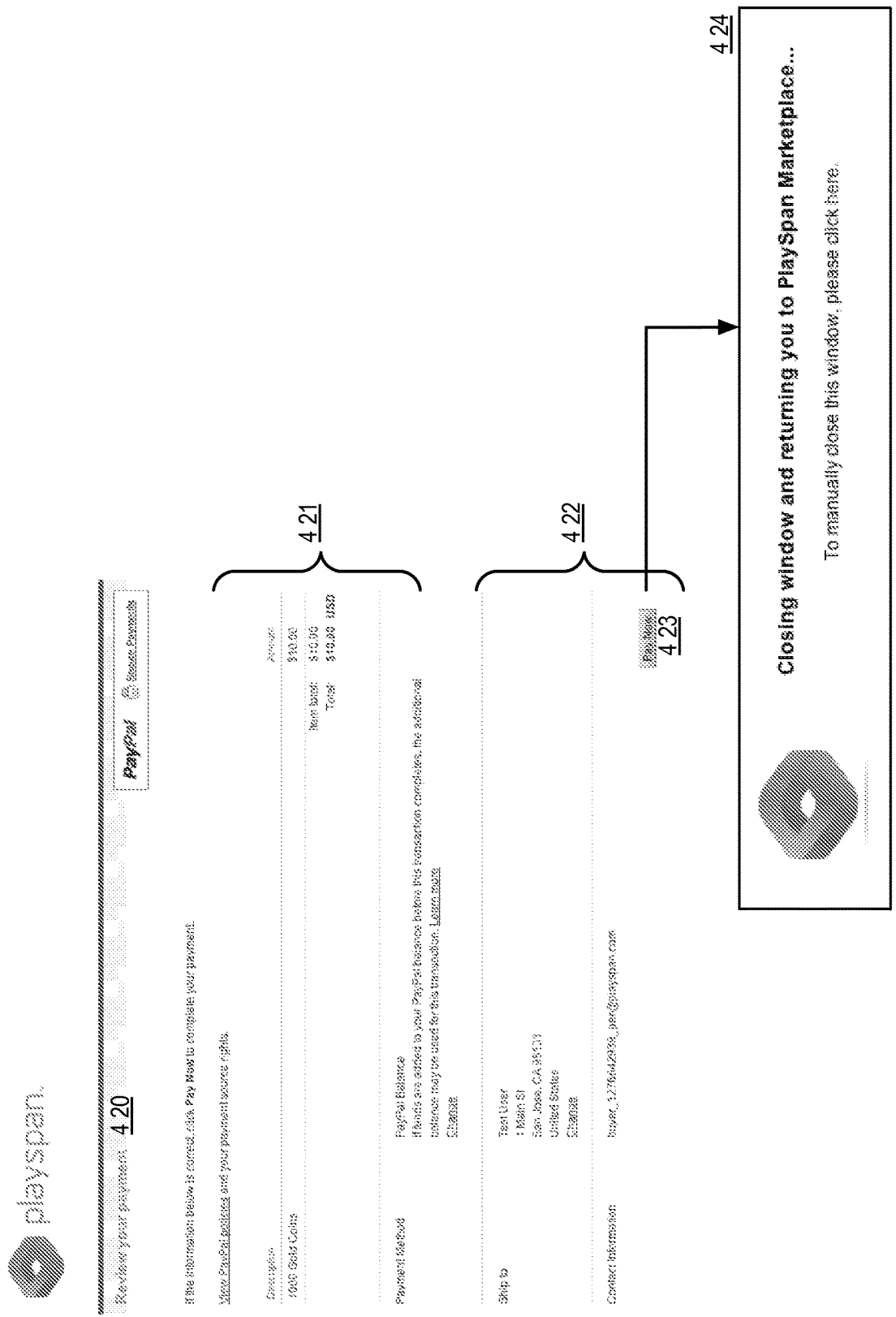
FIGURE 4D   Example: Flexible Monetization Service - Web App

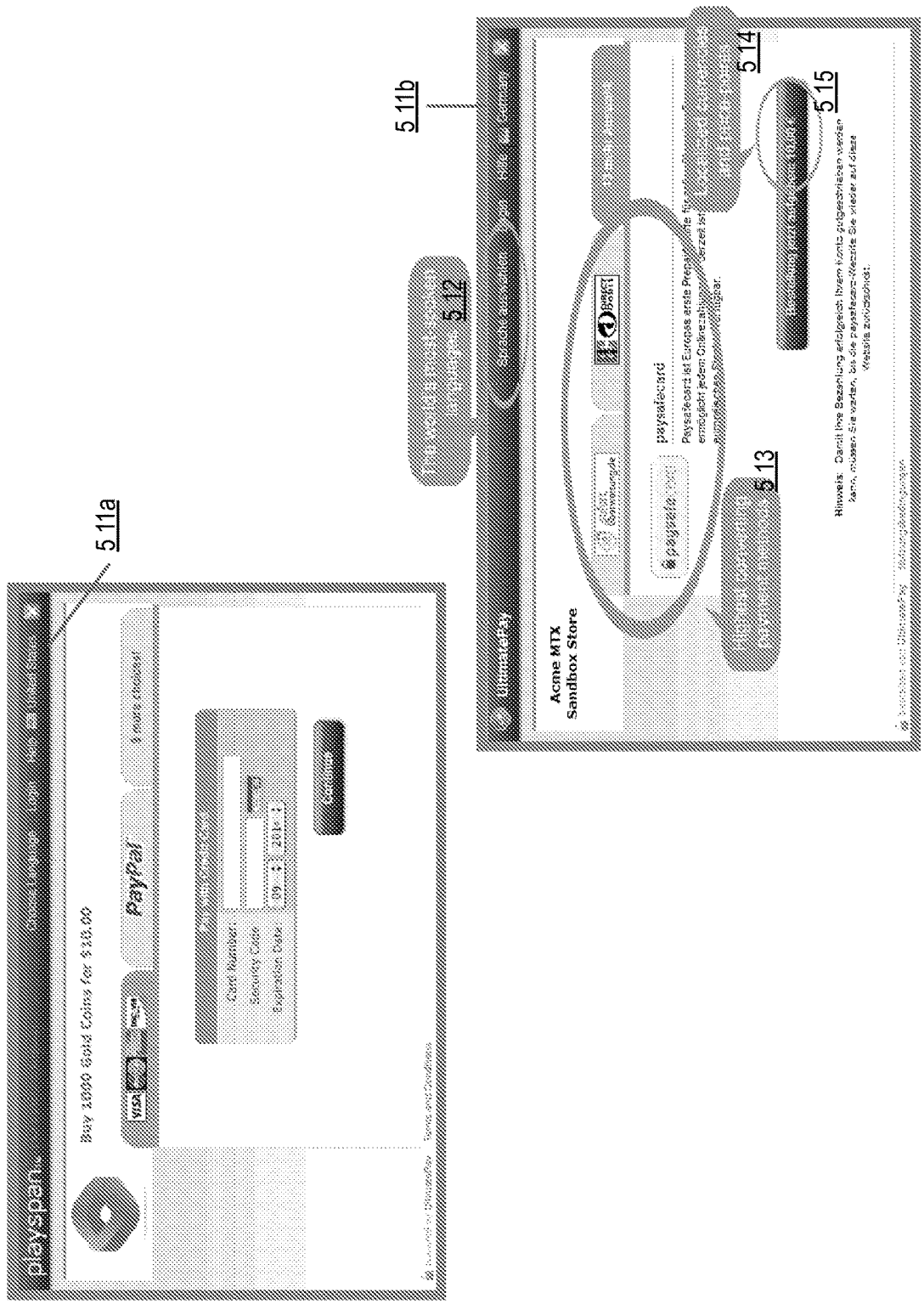
FIGURE 5A    Example: Dynamic Payment Optimization - Web App

Example: Dynamic Payment Optimization - Web App

Example: Dynamic Payment Optimization - Mobile App

FIGURE 5D
Example: Virtual Currency Configuration - Mobile App Example: Geographic Transaction Volume Analytics Example: Geographic Transaction Volume Analytics Example: Geographic Transaction Volume Analytics

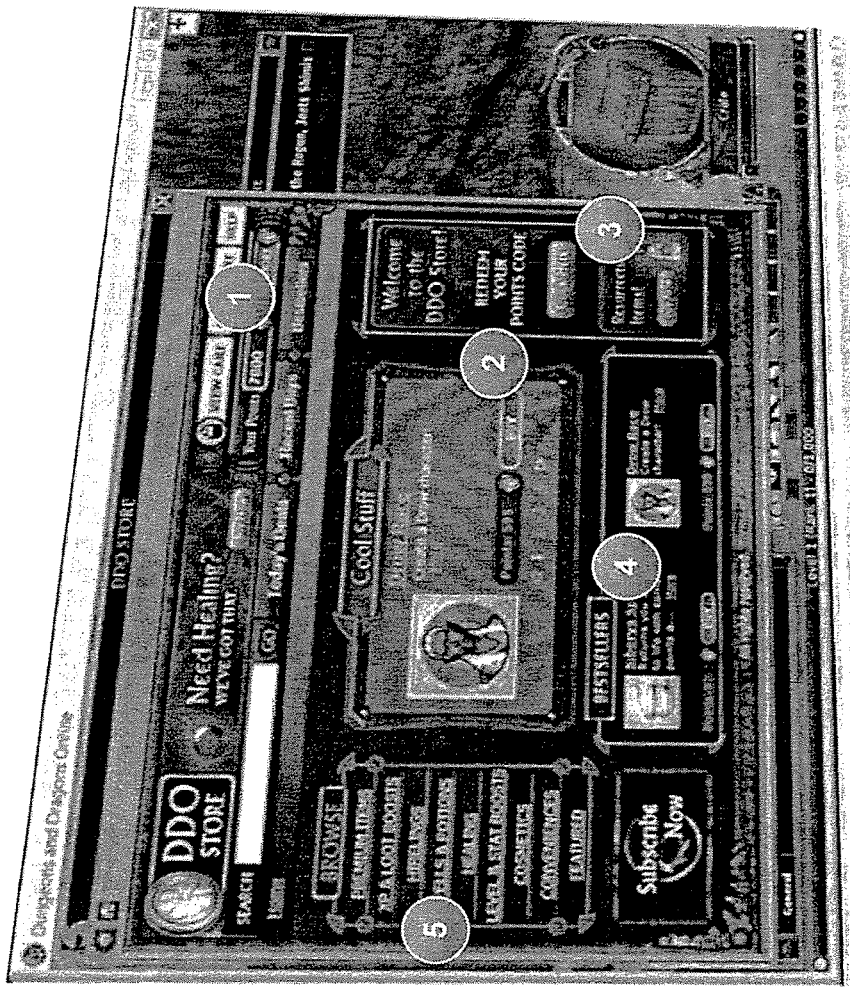
FIGURE 7A  Example: Purchase Catalog Browsing

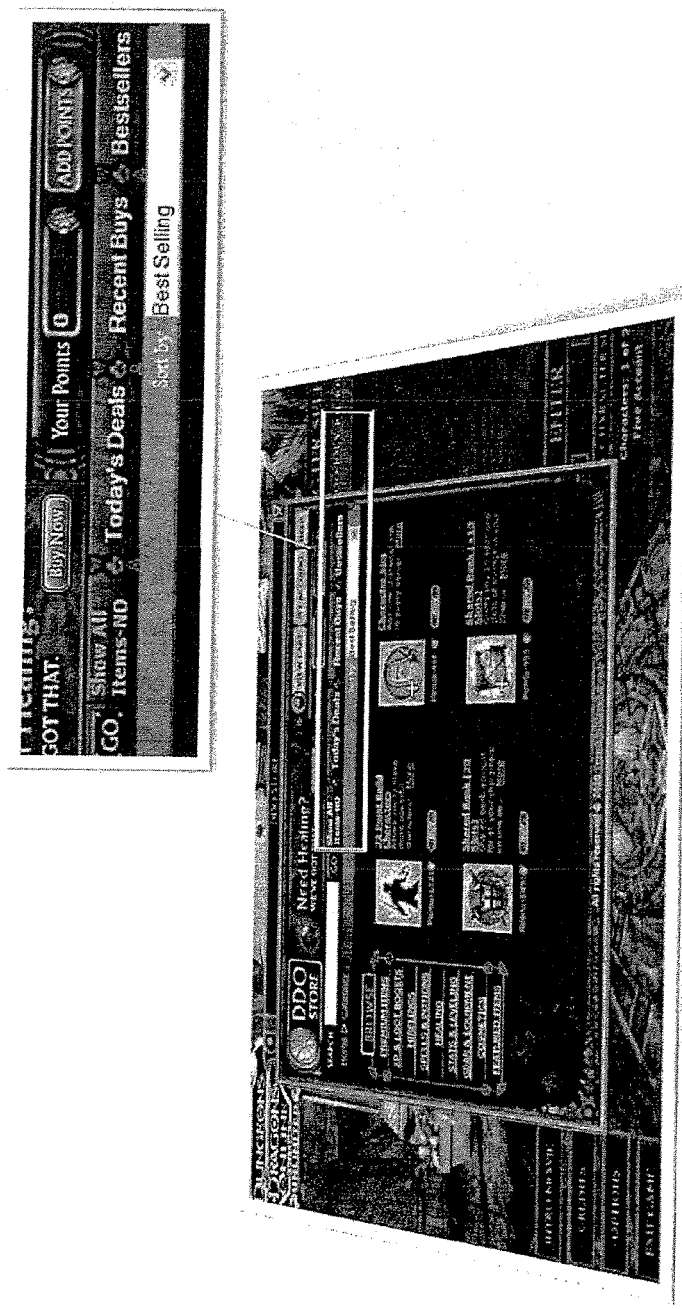
FIGURE 7B    Example: Purchase Catalog Browsing

Example: Purchase Catalog Browsing ("PCB") component 800

FIGURE 9 — Example Data Flow: User Purchase Checkout

| Dashboard | Analytics | Customer Service | Manage Systems | Internal Reports |

Manage Currencies

Decide how your virtual currencies should be presented and how much currency your users should be awarded for different price points, real world currencies, and different types of payment methods.

[Add a new currency]

| Currency Code ▼ | Currency Name |
|---|---|
| 2000 | Playfish Cash |
| 2001CR | orange cash |
| 2007 | Hotel City Game Coins |
| 2010AP | apple |
| BANA1 | Bananas |

Example: Virtual Currency Configuration ("VCC") component 1300

FIGURE 13B

Manage System > Manage Currencies > Add Currency

Currency Code
[ ]

Currency Name
[ ]

Short Name
[ ]

Ratio
1.0 [ USD ▷ ] = 100.0

Copy From
[ ▷ ]

[ Submit ]  [ Cancel ]

Currencies at a Glance

Please use page to add your virtual currencies. You can add as many as you like, have currencies per game, or global currencies which go across games.

The currency Code is the code you pass in your API calls to UltimatePay. The currency code uniquely identifies the virtual currency.

The currency Name and Short Name are the name of the currency we'll show to end users in the LightBox as well as in your reports.
Hint: Keep it short and simple.

An example of a currency name is Poker Chips and a short name is chips. It's ok if both of these are the same.

The ratio is an initial ratio of how much your virtual currency is worth in real whorl currency. This is an initial settings and can be changed later.

Quick tip: You can also copy your currency from another currency you've already setup.

Example: Virtual Currency Configuration ("VCC") component 1300

FIGURE 13C

| Dashboard | Analytics | Customer Service | Manage Systems | Internal Reports |

Manage System > Manage Currencies > Pricing Bundles

Bananas (BANA1)

| Payment Type | Currency | Ratio Pricing | Discrete Pricing |
|---|---|---|---|
| Type1 | USD | 1.0 = 100.0 | 1.0=100; 2.0=200; 5.0=500;10.0=1000 |
| Type2 | EUR | 1.0 = 100.0 | 5.0=700; 10.0=1900; 20.0=5000; 50.0=15000 |
| Type3 | USD | 1.0 = 80.0 | 1.0=80.0 |
| Type4 | USD | 1.0 = 75.0 | 1.0=75.0 |

Add a new bundle

FIGURE 13D

Example: Virtual Currency Configuration ("VCC") component 1300

Manage System > Manage Currencies > Pricing Bundles > Edit Bundle

Bananas (BANA1)

Ratio Pricing
1.0 USD = 100.0 Bananas

Smart Pricing
Disabled    ▷

Discrete Pricing
1.0  USD =   100.0  Bananas
2.0  USD =   200.0  Bananas
5.0  USD =   500.0  Bananas
10.0 USD = 1000.0  Bananas
⊕

[ Submit ]  [ Cancel ]

Bundles at a Glance

Ratio Pricing allows you to specify a currency ratio, for example, $1 is worth 100 points. This means that $2 is 200 points, and so on. In certain cases we may need to round, but who wants to buy 237 points? Smart pricing allows you to round up or round down, and by how much. For example, rounding up by 2 digits turns 237 to 300.

Discrete Pricing allows you to set specific points, for example $10 gives a user 100 points, but $20 gives a user 250 points.

You can add as many bundles as you want. We find that it's best practice to keep it simple and make large round numbers for consumers.

Example: Virtual Currency Configuration ("VCC") component 1300

FIGURE 13E

Example: Person-2-Person (P2P) Social Network Marketing

Example: Person-2-Person (P2P) Social Network Marketing

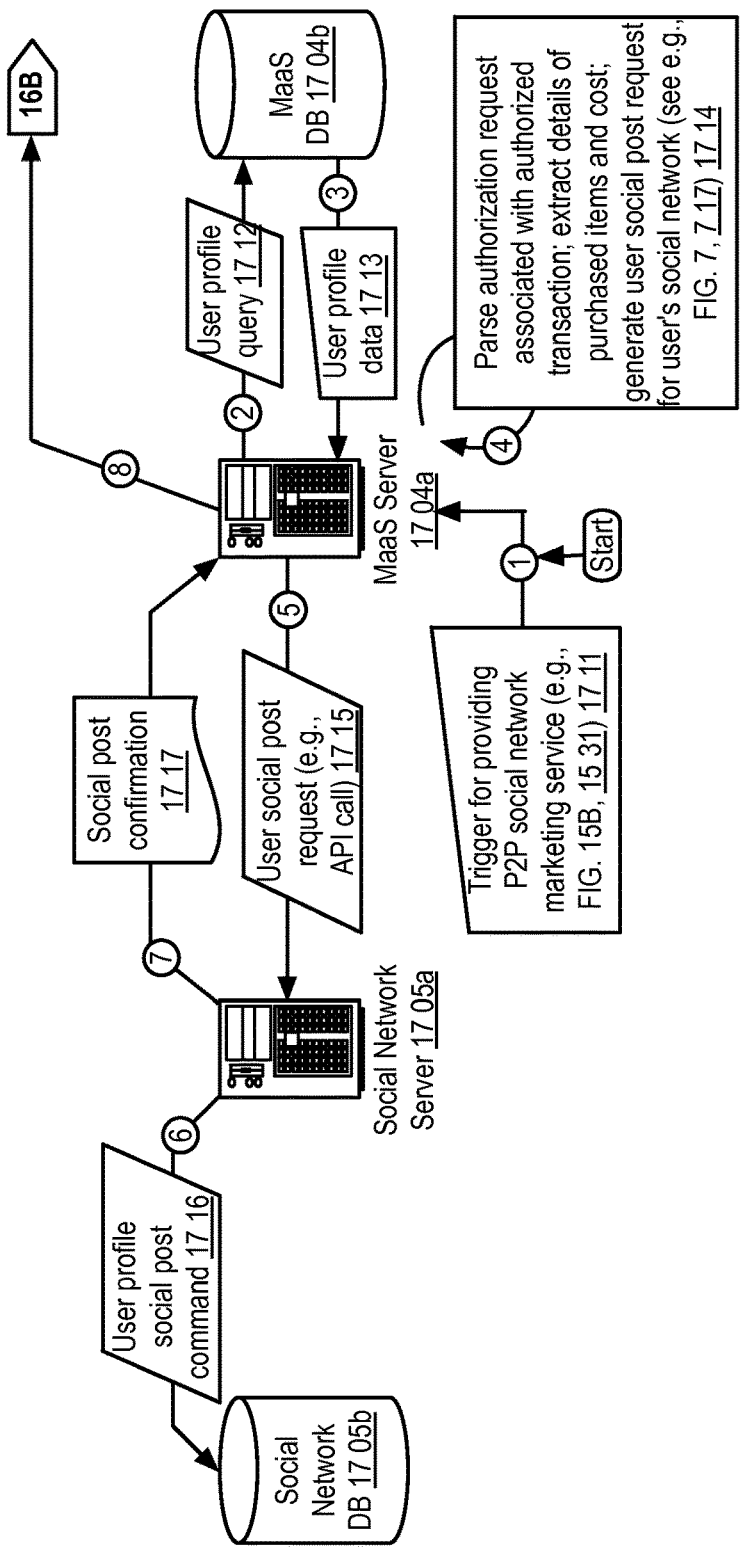
FIGURE 17C   Example Data Flow: Person-2-Person (P2P) Social Network Marketing

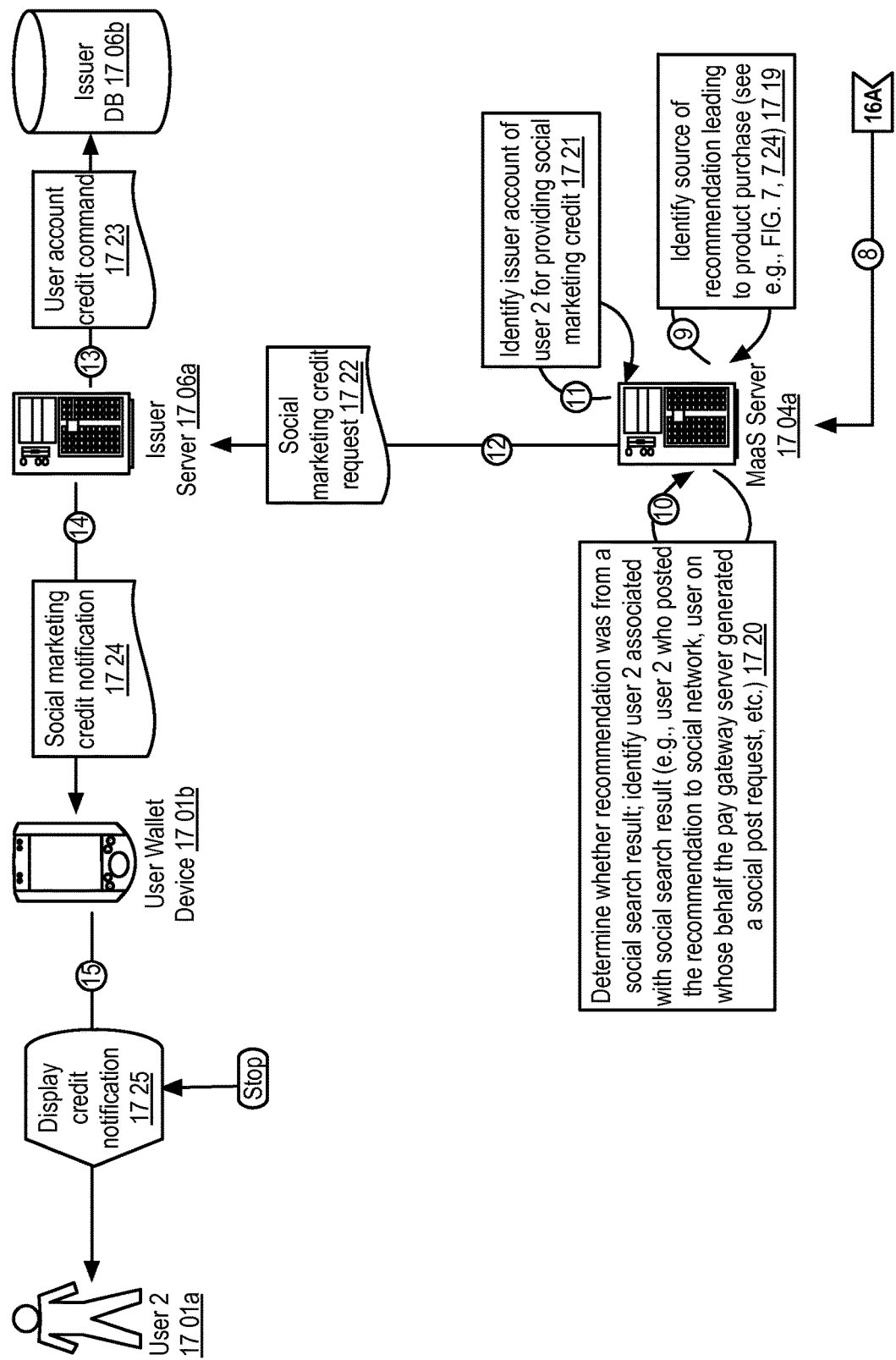
FIGURE 17D  Example Data Flow: Person-2-Person (P2P) Social Network Marketing Example Data Flow: Geographic Transaction Volume Analytics

DYNAMIC PAYMENT OPTIMIZATION APPARATUSES, METHODS AND SYSTEMS

PRIORITY CLAIM

This application is a continuation of and claims priority under 35 USC § 120 to U.S. patent application Ser. No. 14/036,562 filed on Sep. 25, 2013, U.S. Pat. No. 9,757,644, which is a continuation of and claims priority under 35 USC § 120 to U.S. patent application Ser. No. 13/278,171 filed on Oct. 20, 2011, U.S. Pat. No. 8,571,937, which claims priority under 35 USC § 119 to: U.S. provisional patent application Ser. No. 61/455,378 filed Oct. 20, 2010, entitled "SOFTWARE AND METHOD FOR CONFIGURATION OF VIRTUAL CURRENCIES AND VIRTUAL CURRENCY PRICING FOR GLOBAL ONLINE MERCHANTS," U.S. provisional patent application Ser. No. 61/455,379 filed Oct. 20, 2010, entitled "TRACKING AND DISPLAY METHOD AND SOFTWARE FOR REPRESENTATION OF PAYMENT PROCESSING AND VOLUMES BY GEOGRAPHIC REGION," U.S. provisional patent application Ser. No. 61/455,383 filed Oct. 20, 2010, entitled "SYSTEM AND METHOD FOR PERSON-2-PERSON (P2P) ECOMMERCE AFFILIATE MARKETING UTILIZING SOCIAL NETWORKS," U.S. provisional patent application Ser. No. 61/455,454 filed Oct. 21, 2010, entitled "DYNAMIC OPTIMIZATION AND DISPLAY OF PAYMENT METHOD FOR GLOBAL, ON-LINE COMMERCE WEBSITES," U.S. provisional patent application Ser. No. 61/456,118 filed Nov. 2, 2010, entitled "SOFTWARE, METHOD AND SYSTEM FOR MONETIZATION AS A SERVICE," and U.S. provisional patent application Ser. No. 61/506,425 filed Jul. 11, 2011, entitled "HOSTED ORDER PAGE PAYMENT TYPE SELECTION".The entire contents of the aforementioned applications are expressly incorporated by reference herein.

This document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for electronic commerce, and more particularly, include DYNAMIC PAYMENT OPTIMIZATION APPARATUSES, METHODS AND SYSTEMS ("DPO").

BACKGROUND

Consumers engaging in transactions typically select a product from a store shelf or website, and then check them out at a checkout counter or webpage. Product information is typically selected from a webpage catalog or entered into a point-of-sale terminal device. The consumer utilizes a payment option, such as cash, check, credit card, or debit card, to pay for the transaction. Once payment is made, the point-of-sale terminal device memorializes the transaction in the merchant's computer system, and a receipt is generated indicating satisfactory consummation of the transaction.

BRIEF DESCRIPTION OF THE DRAWINGS

The accompanying appendices and/or drawings illustrate various non-limiting, example, inventive aspects in accordance with the present disclosure:

FIG. 2 shows a block diagram illustrating an example DPO component configuration in some embodiments of the DPO;

FIGS. 4A-E show user interface diagrams illustrating example features of a flexible monetization service web browser interface in some embodiments of the DPO;

FIGS. 5A-D show user interface diagrams illustrating example features of dynamic payment optimization and virtual currency configuration, as part of providing flexible monetization services, in some embodiments of the DPO;

FIG. 7A-C show block and data flow diagrams illustrating an example purchase catalog browsing procedure in some embodiments of the DPO;

FIGS. 13A-F show block and logic flow diagrams illustrating example aspects of virtual currency configuration in some embodiments of the DPO, e.g., a Virtual Currency Configuration ("VCC") component 1300;

FIGS. 17A-D show block and data flow diagrams illustrating an example person-2-person social network marketing procedure in some embodiments of a the DPO;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Dynamic Payment Optimization (DPO)

The DYNAMIC PAYMENT OPTIMIZATION APPARATUSES, METHODS AND SYSTEMS (hereinafter "DPO") transform requests for on-demand and flexible monetization and related services, via DPO components, into currency transfers, purchase receipt notifications, social networking communications and transaction analytics reports.

Business-to-consumer (B2C) companies may build their customer billing operations through a mix of in-house software development, third-party payment processor integrations and various third-party software products for subscription, fraud management and commerce systems depending on the business models they adopt. As the cost for customer acquisition and retention increases, more and more sophisticated monetization models may be required to drive higher conversion rates and Average Revenue Per User (ARPUs) from paying users.

In some embodiments, the DPO implements a flexible monetization platform based on a completely new way of thinking about how to monetize different types of users at various price points and at different life cycle stages of customers' engagement with the content offered. It calls for a 360-degree view of a customer who is looking to access and consume content across devices, platforms and networks. For example, when a lot of AAA content is available for free, merely setting a $14.99 monthly subscription price point and up-sell buckets may limit revenue generation capabilities. Consumers may want to pay at their own pace and at the price point they can afford. Thus, in some embodiments, the DPO enables a disruptive business model of micro transactions, which unlocks a massive consumer base that could become paying customers. Moreover the operational costs, and overheads with operating customer billing operations in-house, or through a mix of in-house and third party solutions may become unnecessarily expensive for the B2C companies since their payment volumes do not justify the investment needed. Furthermore, billing teams may not be able to keep up with the need for updates, improvements, or inclusion of new technologies or new payment methods.

Figure 1:
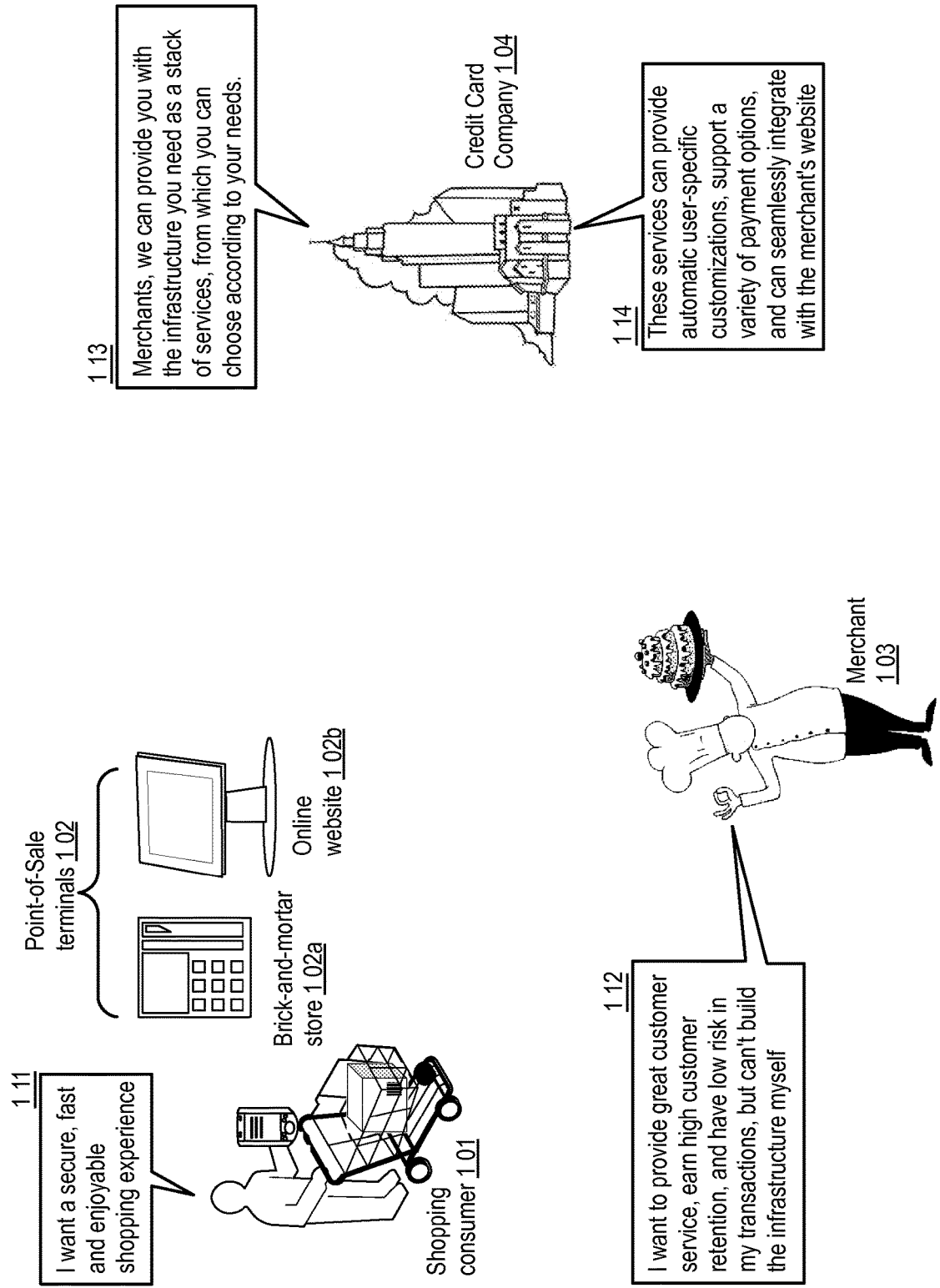
FIG. 1 shows a block diagram illustrating example aspects of flexible monetization services in some embodiments of the DPO.

FIG. 1 shows a block diagram illustrating example aspects of flexible monetization services in some embodiments of the DPO. In some embodiments, the DPO may provide merchants and/or users with a variety of features to facilitate an expedited shopping experience. For example, a user, e.g., 101, may desire a secure, fast, and enjoyable shopping experience in, either at a physical brick-and-mortar store 102a, or an online website (e.g., a gaming site, a gaming application, an eCommerce website, etc.) 102b. A merchant, e.g., 102, may desire to provide services and a shopping experience to match the user's desires, e.g., to maximize customer retention and/or ensure that the customers complete their purchase transactions when they are at a point-of-sale, e.g., 112. In some embodiments, a payment network, e.g., a credit card company, may be able to provide the merchants and/or user with infrastructure to facilitate such provision of shopping experiences, so that the merchant need not recreate the infrastructure for their business, e.g., 113. For example, the DPO may provide a stack of application services, from which the merchant can select according to the merchant's needs. In some embodiments, the DPO may provide applications that can be customized by the merchants to provide the appearance that the provided service is seamlessly integrated with the merchant's systems, while outsourcing the processing associated with those services provided by the DPO. In some embodiments, the DPO may provide application services that can automatically customize themselves according to the needs of the user, e.g., as adjudged by transaction analytics and/or the like user behavior analysis, e.g., 114.

FIG. 2 shows a block diagram illustrating an example DPO component configuration in some embodiments of the DPO. In some embodiments, the DPO may enable online commerce sites to utilize a third party solution as a service to manage, operate and maintain the various components used in conducting and facilitating online transactions. In some embodiments, the DPO may provide merchants with a variety of application services to enhance the consumer shopping experience during purchase product catalog browsing, e.g., 201, user purchase checkout, e.g., 202, purchase transaction authorization, e.g., 203, and/or purchase transaction clearance, e.g., 204. In some embodiments, the merchant may make requests for such services to the DPO via a flexible monetization services interface, e.g., 205. For example, the DPO may provide an application programming interface (API) for the merchant to request such services.

In some embodiments, a service provided by the DPO may include, e.g., 206a, the ability to select from a plurality of payment service providers (PSP) for routing the transaction, but from the same user interface, see e.g., FIGS. 4A-E. In some embodiments, the DPO may offer a large variety of payment methods to users, and determine what methods to offer to what segment of the user base in specific countries to maximize conversion. In some embodiments, the DPO may manage a vast amount of technical integrations with PSPs, but obfuscate the differences by presenting the merchant with a single integration. Each PSP may have its own interfaces and APIs and so the complexity in providing a unified customer experience may be large. In some embodiments, the DPO may handle this complexity to present a unified consistent experience to consumers making purchasing transactions. This unified integration may take the form of either API integration in some embodiments, or the use of widgets or front end pages that manage the payments on behalf of the merchant in other embodiments. In order to create the single integration touch point for the merchant, in some embodiments, the DPO may have a translation module that repurposes all the various integration, settlement, and use of third party PSPs into a common infrastructure. Because of this unified User Interface and unified integration APIs, the DPO may allow the continued addition or updating of payment customers without requiring that the merchants make updates or changes to their integration or billing systems.

In some embodiments, a service provided by the DPO may include, e.g., 206b, risk management services for the user and/or merchant, including fraud detection and prevention, identity theft, and/or the like. For example, the DPO may manage risk by using a comprehensive fraud engine to monitor and prevent and minimize the number of fraudulent transactions that occur. The Fraud Engine may gather information from multiple sources such as third party fraud services such as negative file databases, AVS matching services, device fingerprinting services and/or the like. The Fraud Engine may combine these various data points as well as analyzes historical data to create heuristics and rules to prevent fraudulent transactions from occurring. The DPO, in some embodiments, may also provide a number of on-demand reports that help merchants gain insight into the incidence of fraud on their site and tune and configure their detection rules to better prevent fraud while maintaining a positive customer experience.

In some embodiments, a service provided by the DPO may include, e.g., 206c, micro-payment and subscription services. In some embodiments, the DPO may include an electronic wallet that maintains stored value balances for user accounts either in the form of real world balances or virtual currency balances. These balances may be broken down and tracked according to the method of payment made to create the balance such that the merchants can gain visibility into the actual cost basis for any user's balance. The DPO may further include subscription, and recurring billing engines and related features such as automatic entitlement delivery, overdue bill collection and event notifications. As another example, the DPO may include tracking of account balances, spend tracking, billing and/or product subscriptions, product offers and/or recommendations, event notifications, and/or the like.

In some embodiments, a service provided by the DPO may include in-app optimization, e.g., 206d. In order to collect payments, the front end user experience around the presentation of purchasing options may be optimized by the DPO for the individual user in order to maximize the likelihood of a user completing a transaction. One such method that may be used by the DPO in some embodiments is lightbox (pop-up) front end UI that is embedded on the merchants site through the use of for example, javascript. Users who click the Buy button may experience a pop-up window that is seamlessly integrated into the merchant site, with a look and feel that is customized to the merchant site. This lightbox experience may allow the user to stay within the payment window experience and the transaction may be completed within this same experience and not require that the user be redirected to an alternate website to transact a payment. In some embodiments, the Lightbox may have a dynamic user interface that reorders the payment methods in the order that is most likely to have a user complete a transaction based on the users demographic information as well as historic data around users purchasing activity and payment method preferences. For example, users in country A may see payment option X and Y listed first, because those methods convert highly in country A, whereas a user in Country B may see payment options Z listed first because that method converts highly in country B. In general, the DPO may provide features to modify the front-end user experience of a user purchasing a product to maximize the likelihood of the user completing the purchase and/or returning to the merchant's site for additional purchases. For example, the DPO may allow for configuration of the user interface according to the user's demographics, behavior, location, language, payment preferences (either specific to the user, or generally for the user's demographic), and/or the like.

In some embodiments, the DPO may provide storefronts and/or marketplaces for users to browse products for purchase. Before a user can make a payment, they need to see which items they desire to purchase. The DPO may include a presentation layer and front end user interface in the form of a storefronts (app stores/marketplace) where items are presented to users. The DPO may further provide the necessary backend infrastructure to enable storefronts to function such as inventory management modules, catalog and offer management modules, merchandizing modules, coupon code and discount promotion modules, inclusion of virtual currency wallet across games, one-click purchases, recommendation engine, search engine. In general, DPO may provide back-end services for the merchants, including inventory management, product search, advertisement placement, offer managements, consumer purchase incentives such as rewards or discounts, and/or the like.

In some embodiments, the DPO may provide analytics for the merchant based on card transaction data obtained from users purchasing products from the merchant, e.g., 206f. In some embodiments, the DPO may also allow developers to develop third-party apps that may be provided by the DPO to merchants via an application service store for the merchants. For example, the DPO may provide a Developer Console that gives clients the information they need in a unified fashion for all aspects of the MaaS stack. Reports and data include products, pricing or revenue by payment method and/or country, spending patterns, free-to-paid conversion and ARPU metrics.

In some embodiments, the DPO may provide customer support services, such as on-demand live video/text chat, and/or the like services, for the users, e.g., 206g. For example, in some embodiments, the DPO may facilitate a Developer Console that provides role based permissions to allow users of different levels to access different parts of the platform. One such level may be a customer support representative who can gain access to user transaction data to assist them with any issues, but would not gain access to other information such as revenue reports. The customer support tools may include ability for CS reps to issue refunds, look up pending transactions as well as whitelist or black list users.

Figure 3A:
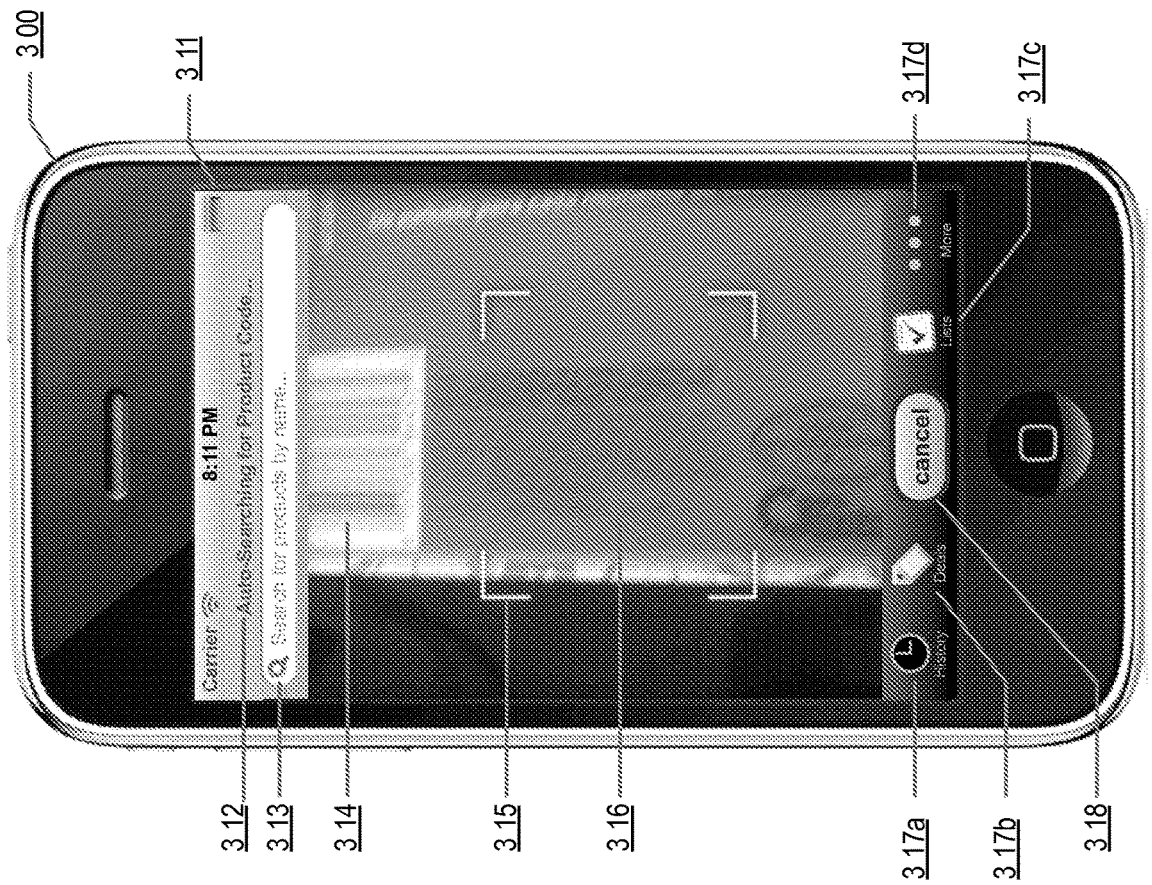
FIGS. 3A-E show user interface diagrams illustrating example features of standalone app and web interfaces for a virtual wallet application in some embodiments of the DPO.

FIGS. 3A-E show user interface diagrams illustrating example features of standalone app and web interfaces for a virtual wallet application in some embodiments of the DPO. With reference to FIG. 3A, in some embodiments, a virtual wallet mobile app, e.g., 311, executing on a device, e.g., 300, of a user may include an app interface providing various features for the user. For example, the device may include a camera via which the app may acquire image frames, video data, live video, and/or the like, e.g., 316. The app may be configured to analyze the incoming data, and search, e.g., 312, for a product identifier, e.g., 314, such as barcodes, QR codes and/or the like.

In some embodiments, the app may be configured to automatically detect, e.g., 312, the presence of a product identifier within an image or video frame grabbed by the device (e.g., via a webcam, in-built camera, etc.). For example, the app may provide a "hands-free" mode of operation wherein the user may move the device to bring product identifiers within the field of view of the image/video capture mechanism of the device, and the app may perform image/video processing operations to automatically detect the product identifier within the field of view. In some embodiments, the app may overlay cross-hairs, target box, and/or like alignment reference markers, e.g., 315, so that a user may align the product identifier using the reference markers to facilitate product identifier recognition and interpretation.

In some embodiments, the detection of a product identifier may trigger various operations to provide products, services, information, etc. for the user. For example, the app may be configured to detect and capture a QR code having embedded merchant and/or product information, and utilize the information extracted from the QR code to process a transaction for purchasing a product from a merchant. As other examples, the app may be configured to provide information on related products, quotes, pricing information, related offers, (other) merchants related to the product identifier, rewards/loyalty points associated with purchasing the product related to the product identifier, analytics on purchasing behavior, alerts on spend tracking, and/or the like.

In some embodiments, the app may include user interface elements to allow the user to manually search, e.g., 313, for products (e.g., by name, brand, identifier, etc.). In some embodiments, the app may provide the user with the ability to view prior product identifier captures (see, e.g., 317*a*) so that the user may be able to better decide which product identifier the user desires to capture. In some embodiments, the app may include interface elements to allow the user to switch back and forth between the product identification mode and product offer interface display screens (see, e.g., 317*b*), so that a user may accurately study deals available to the user before capturing a product identifier. In some embodiments, the user may be provided with information about products, user settings, merchants, offers, etc. in list form (see, e.g., 317*c*) so that the user may better understand the user's purchasing options. Various other features may be provided for in the app (see, e.g., 317*d*). In some embodiments, the user may desire to cancel product purchasing; the app may provide the user with a user interface element (e.g., 318) to cancel the product identifier recognition procedure and return to the prior interface screen the user was utilizing.

Figure 3B:

With reference to FIG. 3B, in some embodiments, the app may include an indication of the location (e.g., name of the merchant store, geographical location, information about the aisle within the merchant store, etc.) of the user, e.g., 321. The app may provide an indication of a pay amount due for the purchase of the product, e.g., 322. In some embodiments, the app may provide various options for the user to pay the amount for purchasing the product(s). For example, the app may utilize GPS coordinates associated with the device to determine the merchant store within which the user is present, and direct the user to a website of the merchant. In some embodiments, the app may be configured to make an application programming interface ("API") call to participating merchants to directly facilitate transaction processing for purchases. In some embodiments, a merchant-branded app may be developed with an in-app purchasing mode, which may directly connect the user into the merchant's transaction processing system. For example, the user may choose from a number of cards (e.g., credit cards, debit cards, prepaid cards, etc.) from various card providers, e.g., 323*a*. In some embodiments, the app may provide the user the option to pay the purchase amount using funds included in a bank account of the user, e.g., a checking, savings, money market, current account, etc., e.g., 323*b*. In some embodiments, the user may have set default options for which card, bank account, etc. to use for the purchase transactions via the app. In some embodiments, such setting of default options may allow the user to initiate the purchase transaction via a single click, tap, swipe, and/or other remedial user input action, e.g., 323*c*. In some embodiments, when the user utilizes such an option, the app may utilize the default settings of the user to initiate the purchase transaction. In some embodiments, the app may allow the user to utilize other accounts (e.g., Google™ Checkout, Paypal™ account, etc.) to pay for the purchase transaction, e.g., 323*d*. In some embodiments, the app may allow the user to utilize rewards points, airline miles, hotel points, electronic coupons, printed coupons (e.g., by capturing the printed coupons similar to the product identifier) etc., to pay for the purchase transaction, e.g., 323*e*. In some embodiments, the app may provide an option to provide express authorization before initiating the purchase transaction, e.g., 324. In some embodiments, the app may provide a progress indicator provide indication on the progress of the transaction after the user has selected an option to initiate the purchase transaction, e.g., 325. In some embodiments, the app may provide the user with historical information on the user's prior purchases via the app, e.g., 327*a*. In some embodiments, the app may provide the user with an option to share information about the purchase (e.g., via email, SMS, wall posting on Facebook®, tweet on Twitter™, etc.) with other users and/or control information shared with the merchant, acquirer, payment network etc., to process the purchase transaction, e.g., 327*b*. In some embodiments, the app may provide the user an option to display the product identification information captured by the client device (e.g., in order to show a customer service representative at the exit of a store the product information), e.g., 327*c*. In some embodiments, the user, app, device and or purchase processing system may encounter an error in the processing. In such scenarios, the user may be able to chat with a customer service representative (e.g., VerifyChat 327*d*) to resolve the difficulties in the purchase transaction procedure.

In some embodiments, the user may select to conduct the transaction using a one-time anonymized credit card number, see e.g., 323*f*. For example, the app may utilize a pre-designated anonymized set of card details (see, e.g., "AnonCard1," "AnonCard2"). As another example, the app may generate, e.g., in real-time, a one-time anonymous set of card details to securely complete the purchase transaction (e.g., "Anon It 1X"). In such embodiments, the app may automatically set the user profile settings such that the any personal identifying information of the user will not be provided to the merchant and/or other entities. In some embodiments, the user may be required to enter a user name and password to enable the anonymization features.

Figure 3C:

With reference to FIG. 3C, in some embodiments, the user interface elements of the app may be advantageously arranged to provide the user the ability to process a purchase with customized payment parameters with a minimum number of user inputs applied to the user's device. For example, if the user has a QR pay code, e.g., 332, within the viewing angle of a camera included in the user's mobile device, the user may activate a user interface element to snap the QR code. In some embodiments, the user may control the field of view of the camera using a user interface zoom element, e.g., 333. In some embodiments, the user interface may be designed such that the user may touch an image of a QR code displayed on the screen to capture the QR code (see e.g., 334). For example, the position of the user's touch may be utilized as an input by an image processing module executing on the user's device to process the displayed video frame (and/or adjacent video frames), and extract the QR code from the frame(s) based on the user's input. For example, the user's touch may provide an approximate center point of the QR code. Using this information, the image processing module may be able to better perform an automated QR code image recognition, and accordingly capture the correct QR code (e.g., if portions of many QR codes are displayed within the video frame(s)) selected by the user for capture and processing.

In some embodiments, the app may utilize predetermined default settings for a particular merchant, e.g., 331, to process the purchase based on the QR code (e.g., in response to the user touching an image of a QR code displayed on the screen of the user device). However, if the user wishes to customize the payment parameters, the user may activate a user interface element 335 (or e.g., press and continue to hold the image of the QR code 332). Upon doing so, the app may provide a pop-up menu, e.g., 337, providing a variety of payment customization choices, such as those described with reference to FIG. 3B. The user may, e.g., drag the user's finger to the appropriate settings the user prefers, and release the user's finger from the touchscreen of the user's mobile device to select the setting for payment processing. In alternate embodiments, the payment settings options, e.g., 337, and QR capture activation button, e.g., 336 may be included in the user interface along with a window for capturing the QR code via the mobile device's camera. In alternate embodiments, the user's mobile device may generate a hybrid QR code-payment settings graphic, and the POS terminal (or user's trusted computing device) may capture the entire graphic for payment processing. In some embodiments, the app may provide a user interface element 338 for the user to minimize the payment options settings user interface elements. In some embodiments, the app may provide additional user interface elements, e.g., 339, to display previous purchases, data shared about those purchases, purchase receipts (e.g., via barcodes) and customer support options (e.g., VerifyChat).

Figure 3D:
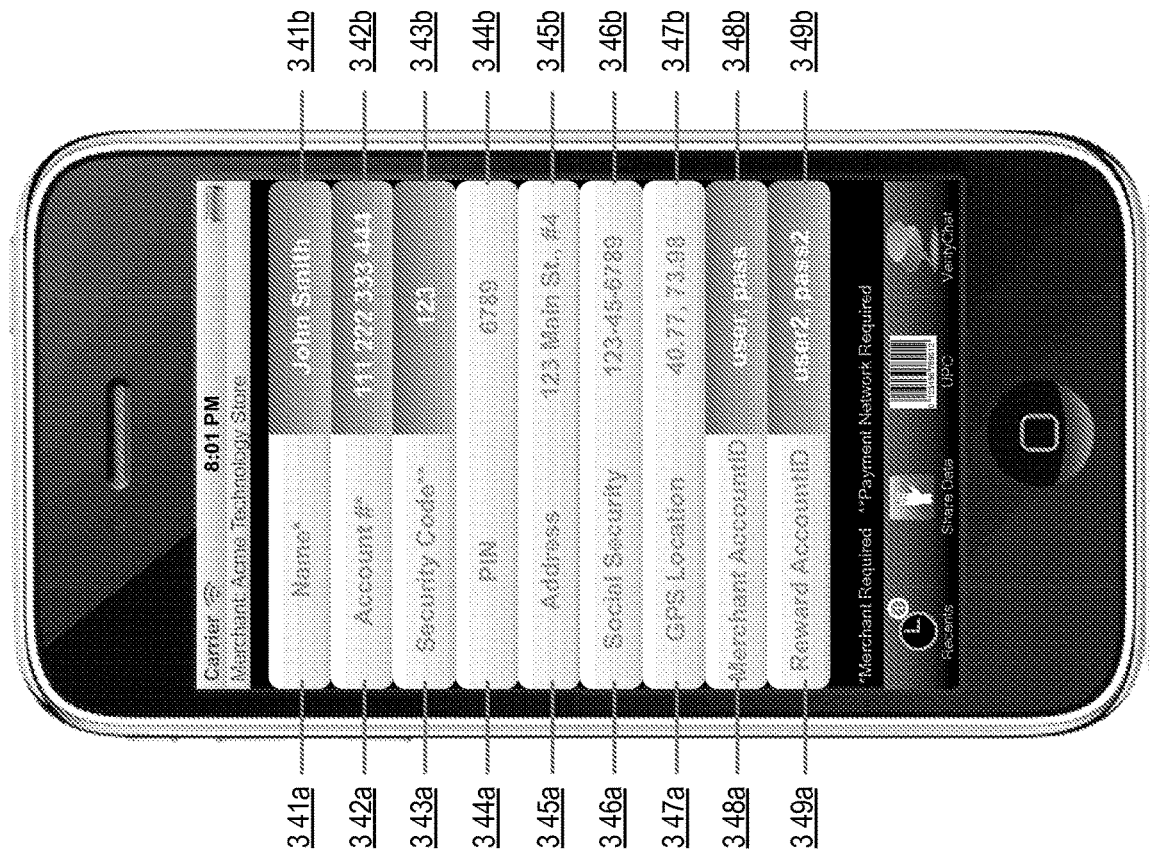

With reference to FIG. 3D, in some embodiments, the user may be able to view and/or modify the user profile and/or settings of the user, e.g., by activating user interface element 322 (of FIG. 3B). For example, the user may be able to view/modify a user name (e.g., 341*a-b*), account number (e.g., 342*a-b*), user security access code (e.g., 343*a-b*), user pin (e.g., 344*a-b*), user address (e.g., 345*a-b*), social security number associated with the user (e.g., 346*a-b*), current device GPS location (e.g., 347*a-b*), user account of the merchant in whose store the user currently is (e.g., 348*a-b*), the user's rewards accounts (e.g., 349*a-b*), and/or the like. In some embodiments, the user may be able to select which of the data fields and their associated values should be transmitted to facilitate the purchase transaction, thus providing enhanced data security for the user. For example, in the example illustration in FIG. 3D, the user has selected the name 341*a*, account number 342*a*, security code 343*a*, merchant account ID 348*a* and rewards account ID 349*a* as the fields to be sent as part of the notification to process the purchase transaction. In some embodiments, the user may toggle the fields and/or data values that are sent as part of the notification to process the purchase transactions. In some embodiments, the app may provide multiple screens of data fields and/or associated values stored for the user to select as part of the purchase order transmission. In some embodiments, the app may obtain the GPS location of the user. Based on the GPS location of the user, the app may determine the context of the user (e.g., whether the user is in a store, doctor's office, hospital, postal service office, etc.). Based on the context, the app may present the appropriate fields to the user, from which the user may select fields and/or field values to send as part of the purchase order transmission.

For example, a user may go to doctor's office and desire to pay the co-pay for a doctor's appointment. In addition to basic transactional information such as account number and name, the app may provide the user the ability to select to transfer medical records, health information, which may be provided to the medical provider, insurance company, as well as the transaction processor to reconcile payments between the parties. In some embodiments, the records may be sent in a Health Insurance Portability and Accountability Act (HIPAA)-compliant data format and encrypted, and only the recipients who are authorized to view such records may have appropriate decryption keys to decrypt and view the private user information.

Figure 3E:

With reference to FIG. 3E, in some embodiments, the app executing on the user's device may provide a "VerifyChat" feature for fraud prevention (e.g., by activating UI element 327*d* in FIG. 3B). For example, the DPO may detect an unusual and/or suspicious transaction. The DPO may utilize the VerifyChat feature to communicate with the user, and verify the authenticity of the originator of the purchase transaction. In various embodiments, the DPO may send electronic mail message, text (SMS) messages, Facebook® messages, Twitter™ tweets, text chat, voice chat, video chat (e.g., Apple FaceTime), and/or the like to communicate with the user. For example, the DPO may initiate a video challenge for the user, e.g., 351*a*. For example, the user may need to present him/her-self via a video chat, e.g., 352*a*. In some embodiments, a customer service representative, e.g., agent 355*a*, may manually determine the authenticity of the user using the video of the user. In some embodiments, the DPO may utilize face, biometric and/or like recognition (e.g., using pattern classification techniques) to determine the identity of the user, e.g., 354*a*. In some embodiments, the app may provide reference marker (e.g., cross-hairs, target box, etc.), e.g., 353*a*, so that the user may the video to facilitate the DPO's automated recognition of the user. In some embodiments, the user may not have initiated the transaction, e.g., the transaction is fraudulent. In such embodiments, the user may cancel, e.g., 358*a*, the challenge. The DPO may then cancel the transaction, and/or initiate fraud investigation procedures on behalf of the user. In some embodiments, the app may provide additional user interface elements, e.g., to display previous session 356*a*, and provide additional customer support options (e.g., VerifyChat 357*a*).

In some embodiments, the DPO may utilize a text challenge procedure to verify the authenticity of the user, e.g., 351*b*. For example, the DPO may communicate with the user via text chat, SMS messages, electronic mail, Facebook® messages, Twitter™ tweets, and/or the like. The DPO may pose a challenge question, e.g., 352*b*, for the user. The app may provide a user input interface element(s) (e.g., virtual keyboard 353*b*) to answer the challenge question posed by the DPO. In some embodiments, the challenge question may randomly selected by the DPO automatically; in some embodiments, a customer service representative 355*b* may manually communicate with the user. In some embodiments, the user may not have initiated the transaction, e.g., the transaction is fraudulent. In such embodiments, the user may cancel, e.g., 358*b*, the text challenge. The DPO may then cancel the transaction, and/or initiate fraud investigation procedures on behalf of the user. In some embodiments, the app may provide additional user interface elements, e.g., to display previous session 356*b*, and provide additional customer support options (e.g., VerifyChat 357*b*).

Figure 4A:
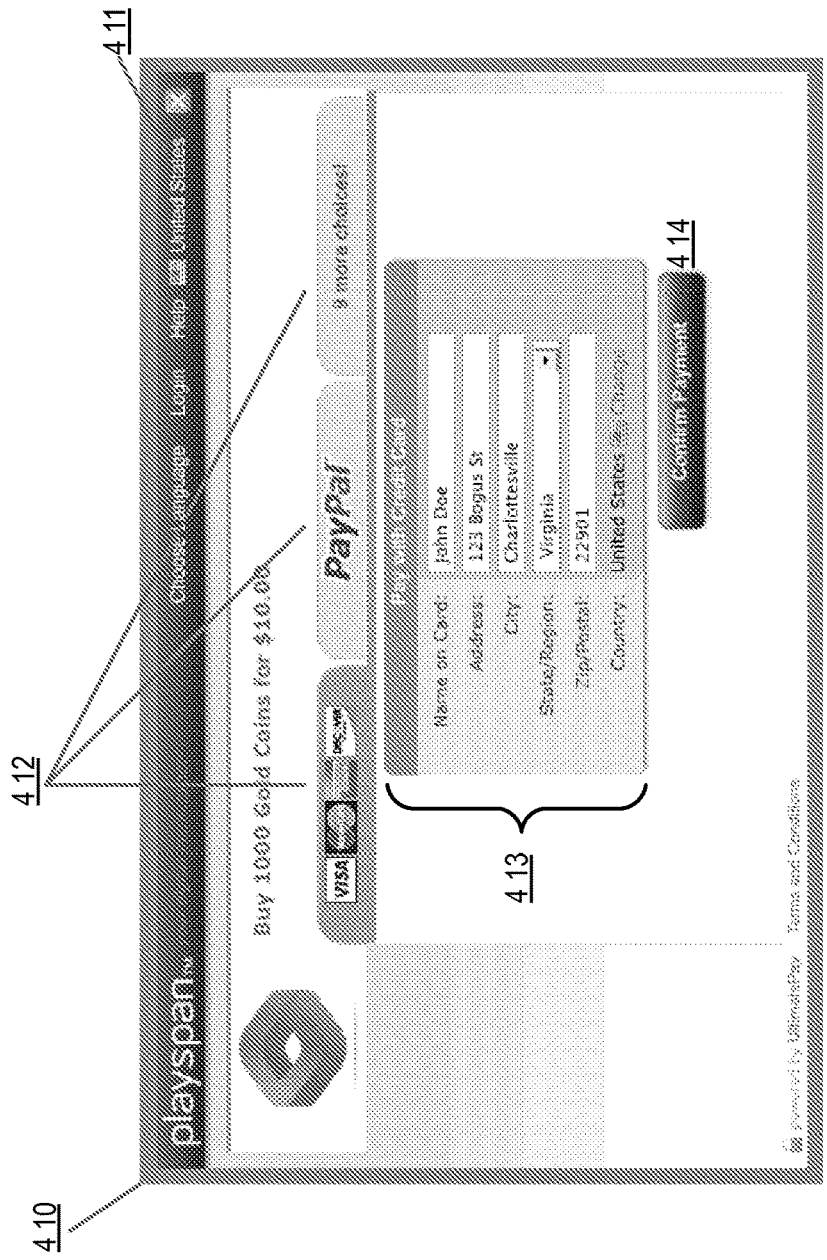

FIGS. 4A-E show user interface diagrams illustrating example features of a flexible monetization service web browser interface in some embodiments of the DPO. As shown in FIG. 4A, in some embodiments, a light box 410 may be instantiated to complete a transaction (e.g., buying 1000 Gold Coins for $10.00) between a user and a merchant. The light box web interface may include various payment options 412 for selection by the user. Non-limiting examples of the payment options include credit and/or debit cards such as VISA, MASTERCARD, AMERICAN EXPRESS and DISCOVER, PAYPAL, bank account and/or personal check information, and/or the like. In some embodiments, the payment options that may be provided may be based on the country where the transaction is conducted. The country option 411 may be pre-selected for the user or the user may change it. When the "pay with credit card" option is selected, a series of fields 413 may be provided to the user for entering credit card details. Example fields of information required for purchase with credit card include name on card, address, city, state/region, zip/postal, country, and/or the like. Once all the necessary information is entered in the provided fields 413, the user may click on the confirm payment button 414 to authorize payment and complete the transaction.

Figure 4B:
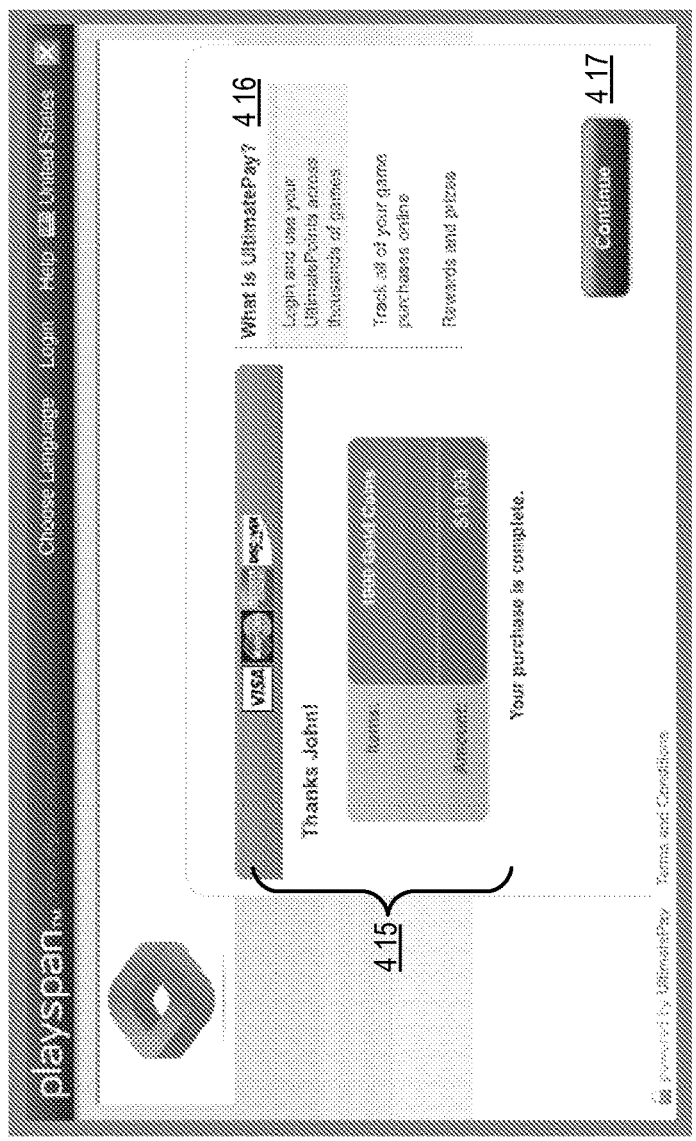

With reference to FIG. 4B, in some embodiments, after the user has confirmed payment, the light box 410 may display a confirmation page. In some embodiments, the confirmation page may provide a summary 415 of the transaction. For example, the payment option selected, the item purchased and the amount that was charged may be displayed to provide confirmation to the user that the purchase is complete. Other information such as more information on the UltimatePay 416 may also be provided on the same confirmation page view. In the confirmation page view, a continue button 417 may also be provided to allow the user to return back to the page where he or she was previously on. In this way, the light box 410 may provide an integrated way to conduct a transaction using a variety of payment options from anywhere on a website and allow the user to return back to his or activity seamlessly.

Figure 4C:
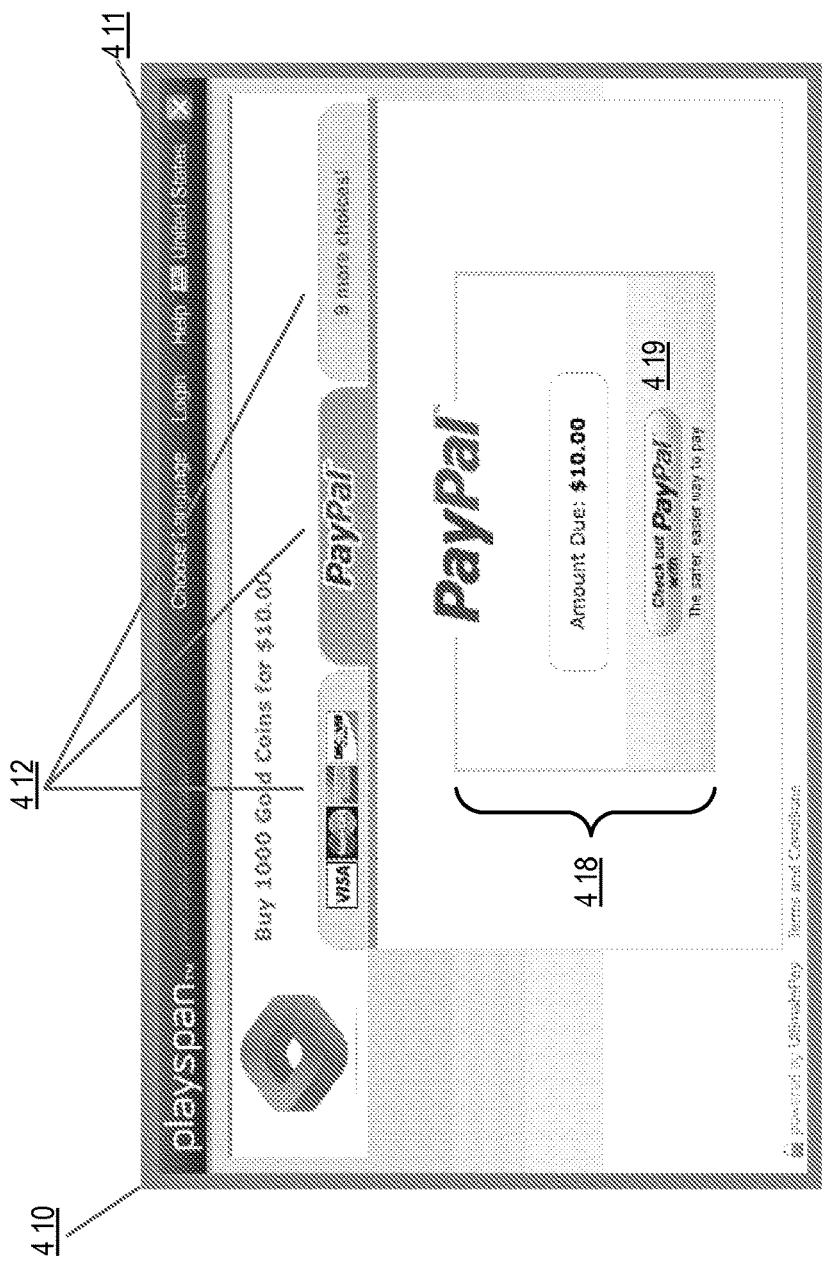

With reference to FIG. 4C, in some embodiments, the PAYPAL option may be selected by the user from the variety of payment options 412 available to conduct a transaction. When the PAYPAL option is selected, a user interface 418 customized for PAYPAL may be displayed to the user. The amount due may be pre-populated and a "check out with PAYPAL" button 419 may be provided. Once the user clicks on the button 419, a customized interface 420, as shown in FIG. 4D, may be provided within the light box showing payment information for user confirmation. The interface 420 may display purchase information 421 including description of the item(s) to be purchased, payment amount, payment method (e.g., PAYPAL balance), payment currency, applicable discounts, and/or the like. The interface 420 may also include shipping and contact information 422. Once the user reviews the displayed information and makes any necessary changes, the user may confirm payment with the "pay now" button 423. This may conclude the transaction and a message 424 may be displayed informing the user that the user will be returned to the web page he or she was previously on before initiating the transaction (e.g., the PlaySpan marketplace). The user may also have the option to manually close the window and return to the previous web page.

Figure 4E:
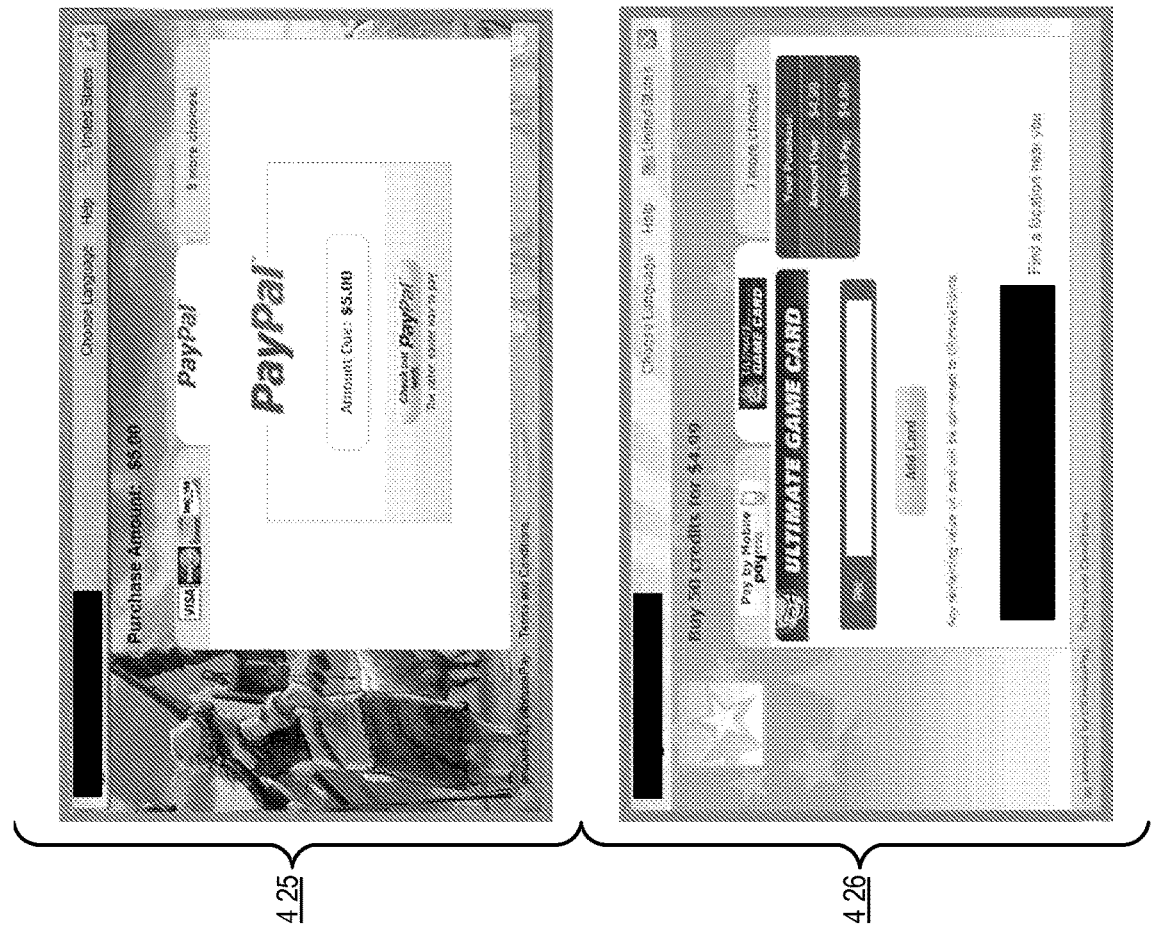

With reference to FIG. 4E, in some embodiments, facilities may be provided by customizing the payment light box with different skins, payment options, logos, advertisement, and/or the like as shown by light boxes 425 and 426. Such customizations may provide the appearance of a payment system that is seamlessly integrated with the merchant.

Figure 5B:
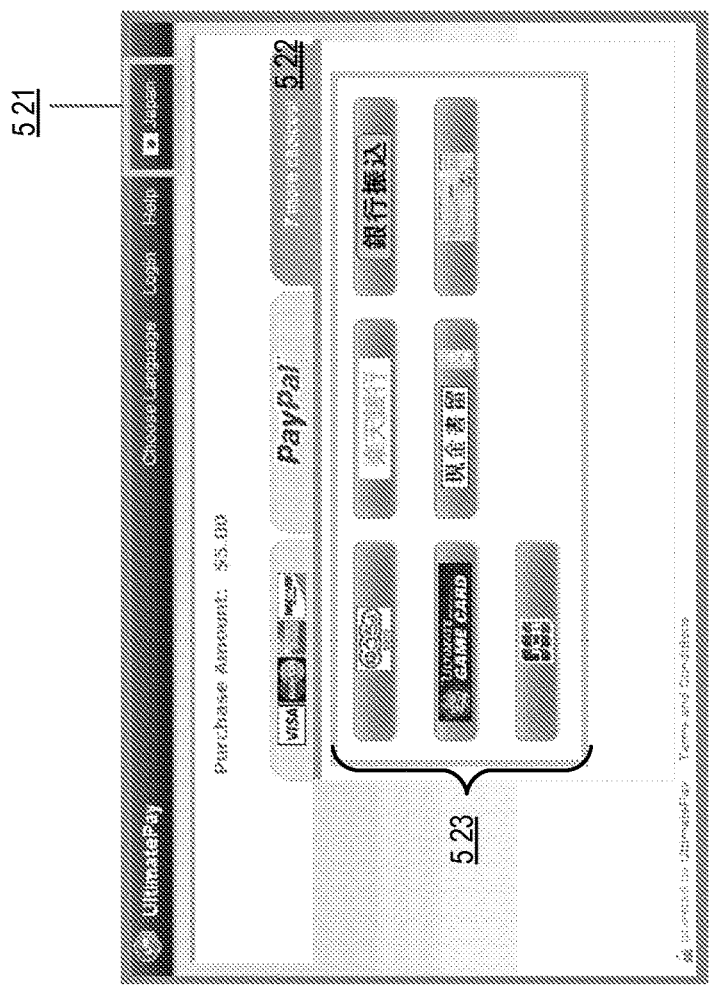
Figure 5C:
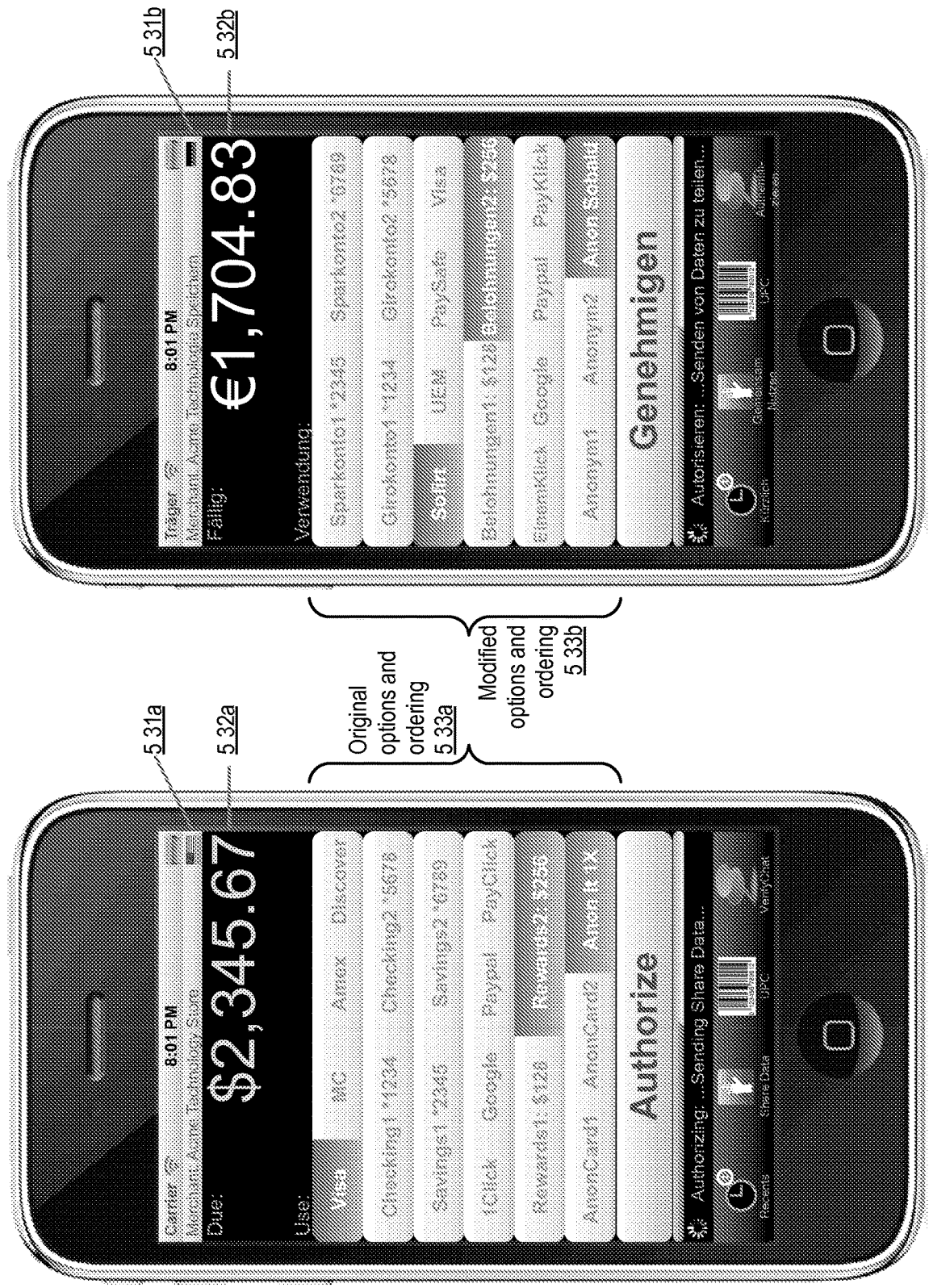

FIGS. 5A-C show user interface diagrams illustrating example features of dynamic payment optimization and virtual currency configuration, as part of providing flexible monetization services, in some embodiments of the DPO. In some embodiments, the DPO may facilitate optimization of the display and presentation of the most relevant payment options to a user based on parameters such as their country, age and purchasing behavior of users with similar transactional history. The DPO may include a selection engine that utilizes information gained from a payment gateway to get user behavior across different regions, age groups, locale, and applications (ecommerce websites, or sections of a website, or games). At an aggregate level, patterns of behavior across different applications may be used predictably by the DPO to select the most optimal payment list for a optimizing the users propensity to pay. Variety of attributes associated with a "user profile" in addition to specific regional requirements, may be used to generate simple patterns for mapping new what new users are shown. For example, the DPO may know the most optimal payment list for 18-20 year olds playing strategy games historically and therefore may present those methods to a new user in that demographic. It further may refine that with regional information for 18-20 year old users from VS playing strategy games. Feedback in the form of users' input back to the DPO in turns of purchasing activities may allow the selection engine to self-refine the component of the payments system and continually present optimal payment methods. All payment activities (anything from launching a payments application and abandoning to launching and making a payment) may be characterized by one or more attributes. Some attributes may be related to user profile information (locale, age, familiarity with the application, etc.), some may be application specific (game type, social dimensions, payment information/required, etc.), or region specific (what payment methods categorically convert better in different regions). All these attributes may be used to create patterns of behavior which ultimately result in a number of actions (abandoning application somewhere in the completion funnel, successfully finishing the payment process or starting over with some changes to the input). Mapping all of that data to the payments that were presented may give weight to accuracy of that presented selection list.

The presentation of the payment options can be displayed to the user on a merchant in a number of ways. In some embodiments, when a merchant wishes to present a user with a payment option, the merchant may send a query or API call to the payment provider that contains certain user demographic information such as age, location, item to be purchased, social networking ID or many others. The payment processing system may then compute, based on its algorithms and historic data, which payment methods are most likely to be the ones that will have the user complete a transaction. In one embodiment, the DPO may generate an API list that the merchant receives for the recommended order list of payment method to display to users. This API can further include graphics such as payment logos, or know payment methods of a user such as for example a Visa Credit card ending with the last 4 digits of ABCD. In another embodiment, the merchant may integrate a payment widget, lightbox, web-redirect or iframe to allow the payment processor to directly optimize the VI and front end user experience of the display of the methods. This could be through a simple list, or through a tabbed based approach. In the tab based approach the tabs selected and the methods that are shown by default may dynamically change based on the users demographic information. In some embodiments, the DPO can further optimize the purchasing experience by adjusting language, price points, currencies, merchandizing (such as promotions or display ads) or the user interface and look and feel of the payment experience for the user. In general, the DPO may tailor the purchasing experience dynamically for each individual user and can optimize and adjust a variety of parameters such as those listed above in order to create an experience that is most likely to have a user complete a transaction.

The DPO can also favor particular payment methods if the merchant desires them to be given prominent placement if there are economic reasons or strategic preferences for favoring particular methods. One method that might be favored is an existing account balance of stored currency that the user already has. By presenting the stored currency as a payment option ahead of other payment options, users can complete the transaction with a simple one click and the merchant can then recognize the revenues from the utilization of the stored balance.

In some embodiments, as shown in FIG. 5A, facilities may be provided for customizing payment options according to geography (e.g., continent, country, region, etc.) 511*a*, language and/or the like. For example, the country Germany 511*b* may be pre-selected or chosen by a user. Based on the selected country, payment options, language and currency information may be automatically updated to cater to the users of the selected country. For example, in the case of Germany, language may be German or any of the world's most spoken languages 512. Similarly, payment options may be updated to show most popular payment methods in Germany or the highest converting payment methods 513 in Germany. In a further implementation, the interface may also be updated to display localized currencies and price points 514.

With reference to FIG. 5B, an exemplary payment interface customized for the selected country Japan 521 is provided. While credit and/or debit card options such as VISA and AMERICAN EXPRESS and PAYPAL may be acceptable forms of payment in Japan or accepted by merchants, other country-specific payment choices 523 may also be provided under "more choices" tab 522 in the payment interface. The user may then select any of the provided choices for completing the transaction.

With reference to FIG. 5C, in some embodiments, payment options and ordering in mobile application interfaces may also be customized based on geography. When the United States is selected as the country 531, the amount due 632*a* may be displayed in the currency of the United States. Various payment options in the mobile application may displayed in an arrangement customized for (or in some instances by the user) in the region 533*a* on the mobile application interface. When the country selection is changed to Germany 531*b* from the United States, the amount due 532*b* may displayed in local or popular currency. Similarly, various payment options and orderings may be modified as shown in the region 533*b* of the mobile application interface. In some embodiments, the highest converting payment methods may be provided. In another implementation, the user may configure the settings for a country and may save it for future use.

With reference to FIG. 5D, in some embodiments, various currency configurations may also be available in mobile interfaces of the payment system. For example, a user may use Visa 542*a* to pay for an amount due 541*a* in United States currency. In a further implementation, the user may also have the option to pay for the amount (or a portion thereof) using rewards points 542*b*. The corresponding amount due may be displayed in currency points at 541*b*.

FIGS. 6A-D show user interface diagrams illustrating example features of geographic transaction volume analytics in some embodiments of the DPO. The DPO, in some embodiments, may provide online merchant with services to visualize the geographic payment volumes through the display of a country heat map graph with configurable parameters to highlight different features of the payment distribution.

In some embodiments, the DPO may enable users to view their payments from users on a country-by-country basis, understanding market share for countries, e.g. US is 10% and Canada is 3%, total users, total payments and average payment size. These analytics and insights may give merchants clues that they need to increase revenue streams in their commerce activities. Additionally this data may be provided graphically showing a global heat map with countries having more payments with a darker color and payments with few payments with a lighter color (or no color for no payments). The levels, color contrast and granularity of the map can be configured and may provide merchants with simple and quick ways to visualize the effectiveness of their commerce activities across geographic regions.

In some embodiments, the geographies shown are country maps and the levels of payments are segmented into five spectrums based on an exponential scale such that each darker color level represents twice the payment volume than the next level. In some embodiments, the map may be divided into states, cities or districts and the color gradient can be a linear spectrum from light to dark and normalized to from the lowest paying location to the highest paying location, The graphical display may be populated, in one example, as follows: Each order and payment transaction may be tagged with an IP address and country stamp. Geopayments reports then created by the payment network by filtering all transactions for a given merchant, then aggregated by country, and counting the sum of users and transactions and calculating the country market share and average payment size. Graphic charts may be created by taking a map of the globe, aggregating payment volume and coloring different countries based on the market share of payments in that specific country.

Figure 6A:
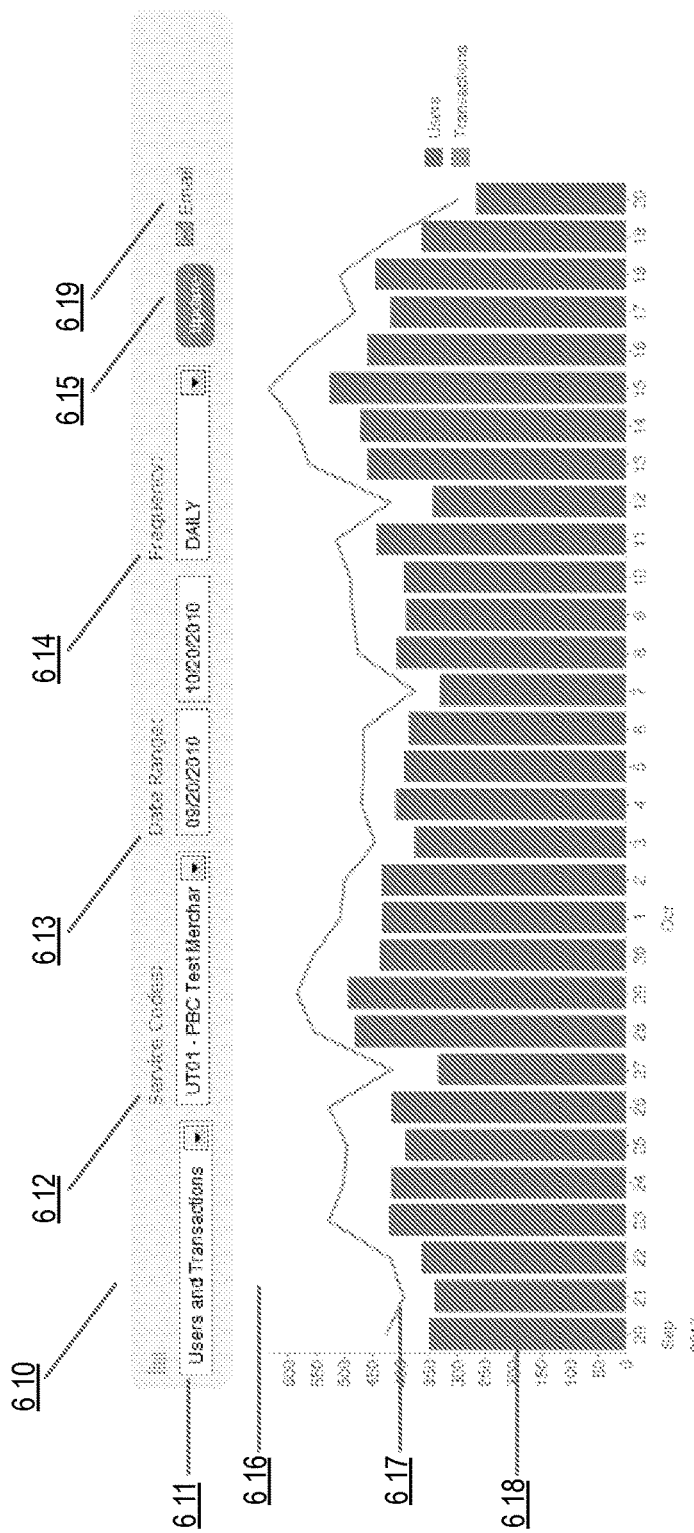
FIGS. 6A-D show user interface diagrams illustrating example, features of geographic transaction volume analytics in some embodiments of the DPO.

Various analytics facilities may be available for merchants having the payment application integrated with their websites. An example merchant analytics dashboard 610, as shown in FIG. 6A, may include various options for generating graphical and other representations 616 of analytics such as geographic transaction volume. Example options available for configuration include, without limitation, type of data 611 (e.g., users and transactions), service codes 612 (e.g., UT01—PBC Test Merchant), date range 613 (e.g., Sep. 20, 2010 to Oct. 20, 2010), frequency (e.g., daily, weekly, monthly, etc.), and/or the like to observe trends for users and transactions over time. The graphical display area 616 may further display the trends for transactions 617 and users 618 in graphical charts such as trend line and bar chart among others. The merchant may also change any of the parameters on the dashboard 610 on the fly, and click on update button 615 to generate a graphics for the updated parameters. In a further implementation, email 619, download or export facilities may also be available for the merchant to download raw or processed data in EXCEL, text, WORD, .CSV and other formats, as well as graphics in various graphic formats such as .bmp, .jpg, .jpeg/, .png, . gif, .DF, and/or the like.

Figure 6B:
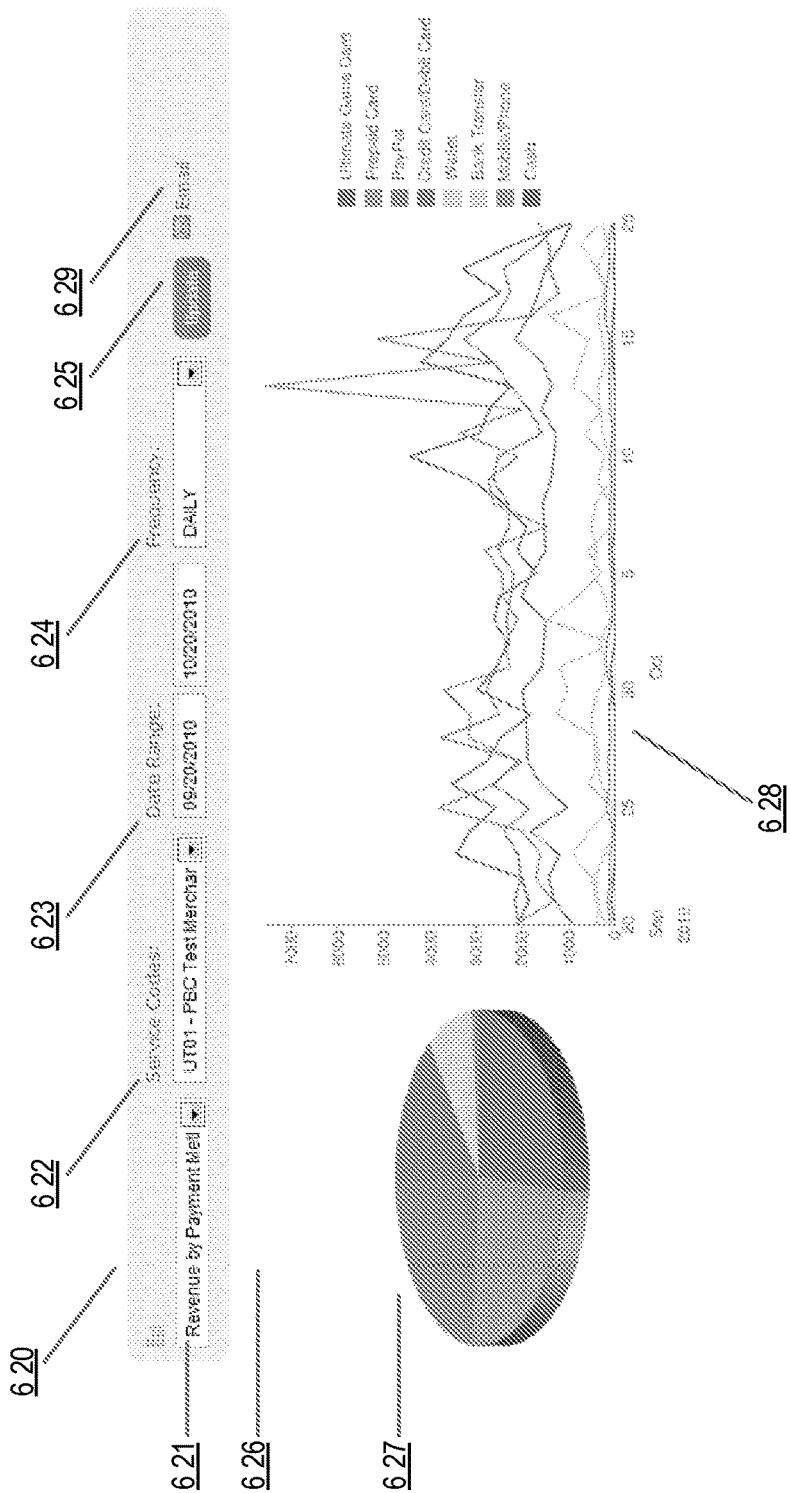

With reference to FIG. 6B, in some embodiments, the merchant may reconfigure his or her dashboard to select other data types such as revenue by payment method 621. The merchant may also select another service code 622, data range 623 and frequency 624. When the merchant clicks on the update button 625, updated graphical charts may be displayed on the graphical display area 626. For example, for the revenue for payment method data 621, a pie chart 627 may be displayed showing a percentage breakdown of revenue for each payment method. Further a line chart 628 may also be displayed showing the daily revenue amount (y-axis) for each payment method over a period of time (x-axis) defined by the date range 623. As in FIG. 6A, raw and/or processed data and graphics may be available for email 629, export or download.

Figure 6C:
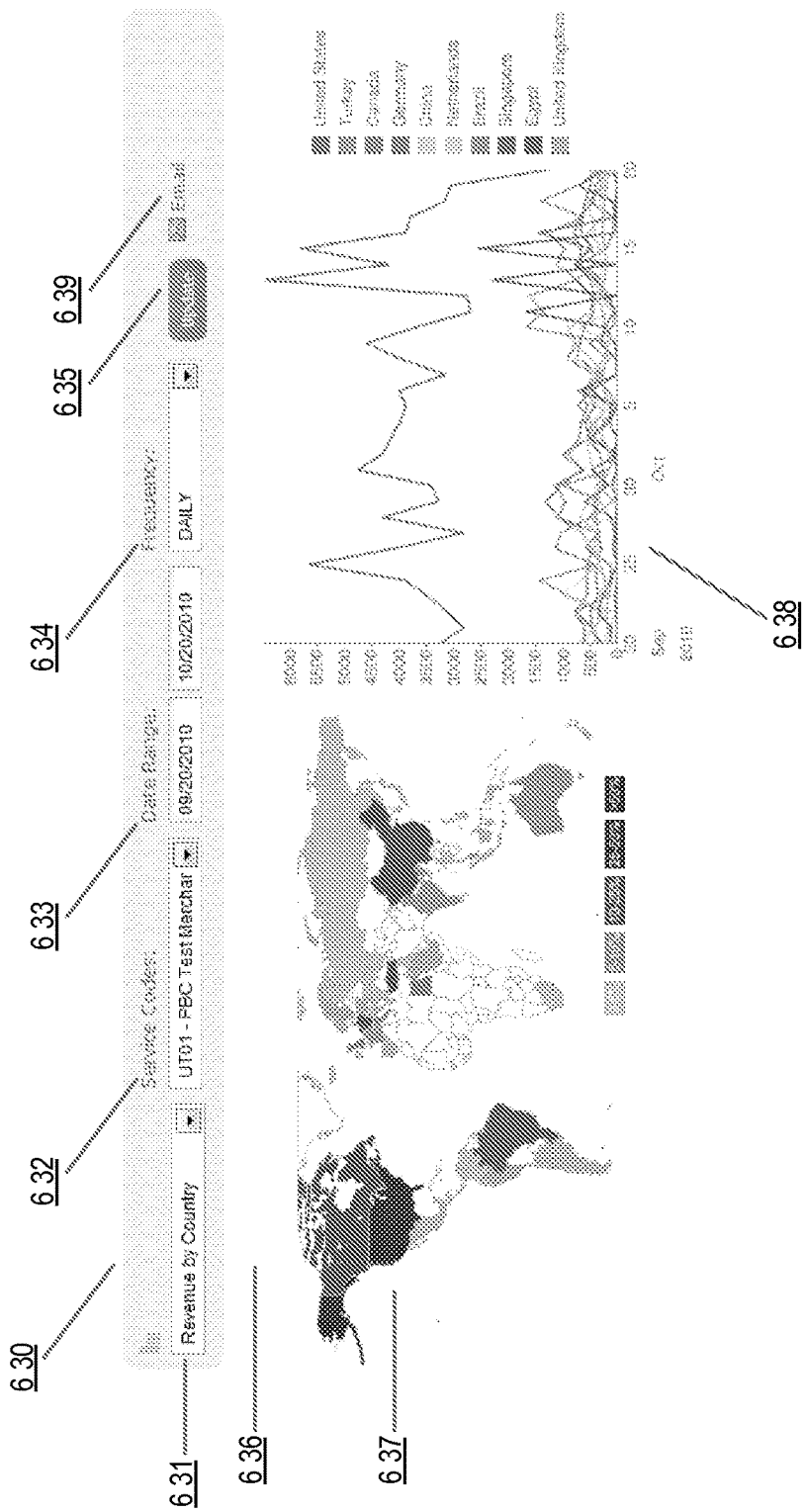

With reference to FIG. 6C, in some embodiments, a merchant may select revenue by country 631 data analysis. The merchant may also specify service codes 632, date range 633 and frequency 634. Once the update button 635 is clicked, the graphical display area may display various graphical charts and maps showing revenue breakdown by country. For example, the heat map 637 may identify, using color or other indicators, each country which produced a revenue in the range of 0-5%, 5-10%, 10-25%, 25-50% and higher than 50% during the defined time period. Other percentage ranges for revenue breakdown are contemplated and are within the scope of the payment system analytics. As another example, the graphical chart 638 may show the revenue amount (y-axis) over a period of time (x-axis) for each revenue producing country.

Figure 6D:

With reference to FIG. 6D, in some embodiments, various dashboard 640, analytics 641, customer service 642, manage systems 643 and mobile apps 644 facilities may be integrated together in a single console. The merchant (or service user in general) may log in and select any one of the tabs 640-644 to obtain analytics and information and manage various services, systems and mobile applications. For example, when the dashboard tab is selected, an overview of various analyses, data and charts may be provided. For example, sub-windows such as geopayments 645, revenue 646, conversion 647 and summary 648 may be displayed. The summary table 648, as shown, may include various columns of data such as date 648*a*, revenue 648*b*, users 648*c*, transactions 648*d*, average spending per user 648*e*, average amount per transaction 648*f*, conversion rate 648*g*, and/or the like. In one implementation, the summary table may include data for a predefined time period (e.g., current month, current week). The data from the summary table may then be displayed using graphical charts in sub-windows such as the geopayments sub-window 645, revenue 646 sub-window and conversion sub-window 647. The geopayments sub-window 646 may display geographical heat maps of revenue described in FIG. 6C. The revenue window may display a column chart of revenue amount 648*b* (y-axis) plotted against date 648*a* (x-axis). Similarly, the conversion sub-window 647 may display a column chart that shows revenue 648*b* on the left y-axis and conversion rate on the right y-axis plotted again date 648*a* on the x-axis. In addition to the heat maps and column charts a described above, other types of graphical display techniques may be used. In a further implementation, the "view reports" option on any of the sub-windows may be selected for further data analysis and/or reconfiguration of one or more parameters.

Figure 7C:
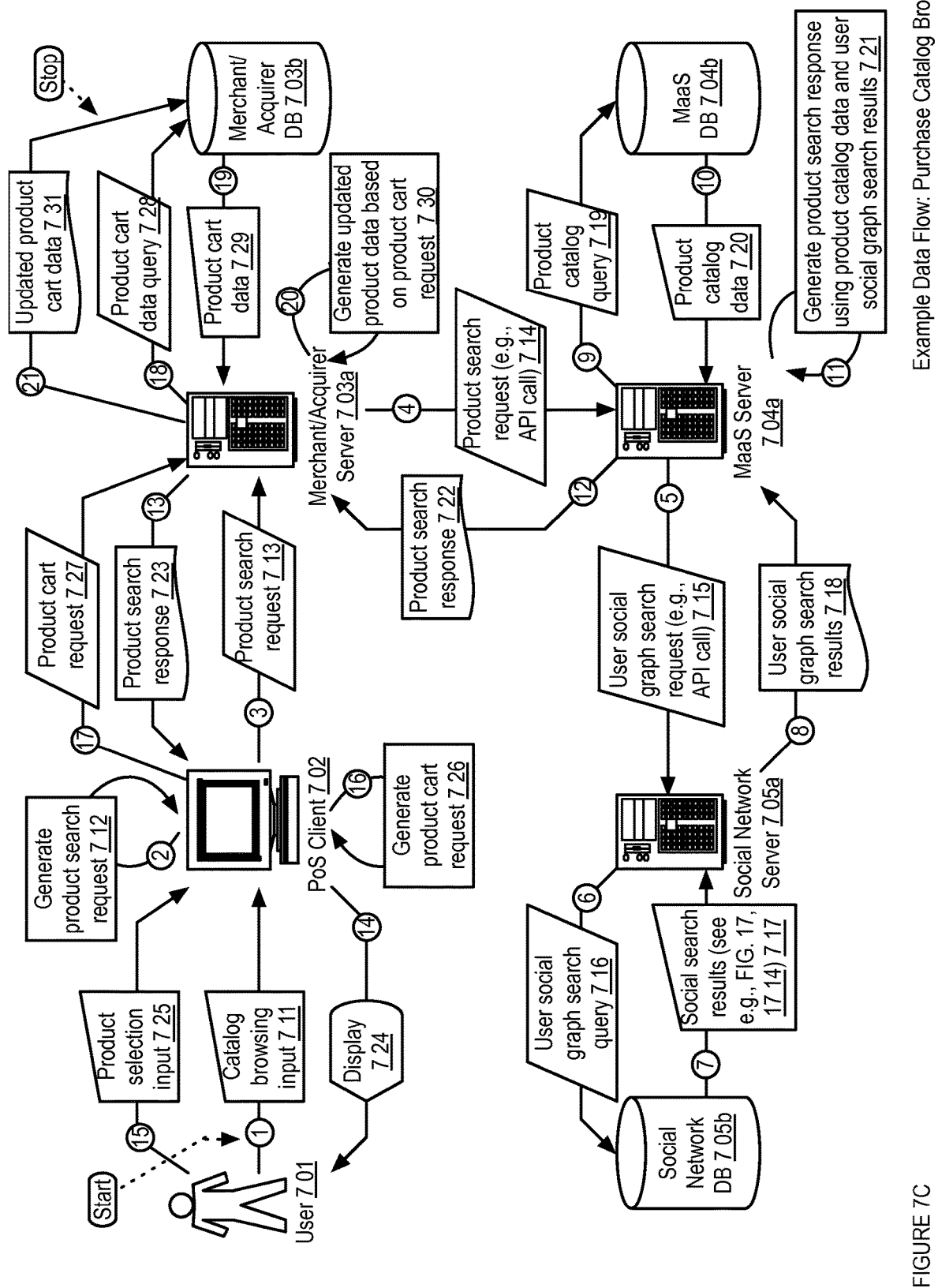

FIG. 7A-C show block and data flow diagrams illustrating an example purchase catalog browsing procedure in some embodiments of the DPO. In some embodiments, the DPO may provide a foundation for merchandising items, subscriptions and other offers via a comprehensive and robust storefront component that supports a global universal catalog. The DPO may enable a merchant to manage multiple offerings, across multiple properties (online and/or mobile) in multiple formats (in-game, widgets, social network-based applications, etc.). Within this context, merchants may be able to manage up to thousands of items, price promotions, up-sell and cross-sell opportunities in a global setting with payment and support in all areas. The DPO may provide a unique turn-key offering that leverages contextual offer management to drive higher conversion. The marketplace may be implemented in-game, on social networks and the web or across all three. The full suite of merchandising tools, coupons, custom offers, bundles, promotional pricing, analytics, etc., provided by the DPO, may enable the merchant to maximize sales while providing a high quality experience to its customers. The DPO may provide features such as, but limited to: Virtual currency wallet across games; One-click purchases; Recommendation engine; Catalog and offer management; Comprehensive customer service and analytical tools; and/or the like. In some embodiments. The DPO may also enable merchants to profit from additional revenue streams as users transact among each other in an official and organized manner. These marketplaces may serve not only as additional revenue streams, but also may increase stickiness to the site by adding the social dimension of transaction and the promise of profiting from customer loyalty.

With reference to FIG. 7C, in some embodiments, a user, e.g., 701, may desire to browse through a product catalog of a merchant managed by the DPO. The user may provide a catalog browsing input, e.g., 711, into a point-of-sale (PoS) client, e.g., 702, to browse through a product catalog. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In response, the PoS client may generate a product search request, e.g., 712, and provide the product search request, e.g., 713, to a merchant/acquirer ("merchant") server, e.g., 703*a*. For example, the client may provide a product search request to the merchant server as a HTTP(S) POST message including XML-formatted data. An example listing of a product search request 713, substantially in the form of a HTTP(S) POST message including XML-formatted data, is provided below:

TABLE-US-00001

```
POST /productsearchrequest.php HTTP/1.1 Host:
www.merchant.com Content-Type: Application/XML Content-Length: 229 <?XML
version = "1.0" encoding = "UTF-8"?> <product_search_request>
<request_ID>PT456</request_ID> <session_ID>ASDF3245678</session_ID>
<user_ID>john.q.public</user_ID> <timestamp>2010-09-09 21:21:21</timestamp>
<search_keys>type:virtual genre:action brand:sony</search_keys>
</product_search_request>
```

In some embodiments, the merchant server may utilize the DPO to search through the merchant's inventory to respond to the user's product catalog browse request. The merchant server may provide a product search request, e.g., 714, to a Monetization-as-a-Service ("MaaS") server, e.g., 704*a*. For example, the merchant server may generate an application programming interface call to request the MaaS server to provide product catalog search results. For example, the client may provide a product search request to the MaaS server as a HTTP(S) POST message including XML-formatted data. An example listing of a product search request 714, substantially in the form of a HTTP(S) POST message including XML-formatted data, is provided below:

TABLE-US-00002

```
POST /productsearchrequest.php HTTP/1.1 Host:
www.paygateway.com Content-Type: Application/XML Content-Length: 328 <?XML
version = "1.0" encoding = "UTF-8"?> <product_search_request>
<request_ID>YTUERWTQRT</request_ID> <session_ID>ASDF3245678</session_ID>
<timestamp>2010-09-09 21:21:21</timestamp> <search_keys>type:virtual genre:action
brand:sony</search_keys> <!--optional data--> <user_ID>john.q.public</user_ID>
<merchant_ID>DFSG43564</merchant_ID> </product_search_request>
```

In some embodiments, the MaaS server may utilize a social network service to determine products to recommend for the user. In some embodiments, the MaaS server may request the user 701 to log into the social networking service in order to enable the user social graph search. For example, the MaaS server may request the social networking service to provide information on the user's communications on the social networking service, the user's social graph, and/or the social networking communications of the members of the user's social graph on the social networking service, e.g., 715. For example, the MaaS server may execute a PHP script to generate an application interface programming call to the social network server. An example listing of commands to generate a user social graph search request 715, written substantially in the form of PHP commands, is provided below:

TABLE-US-00003

```
<?PHP header('Content-Type: text/plain'); // Obtain user ID(s) of
friends of the logged-in user $friends =
json_decode(file_get_contents('https://graph.facebook.com/
me/friends?access token = `$cookie['oauth_access_token']), true); $friend_ids =
array_keys($friends); // Obtain message feed associated with the profile of the logged-in
user $feed = json_decode(file_get_contents('https:llgraph.facebook.com/me/
feed?access_token = '$cookie['oauth_access_token']), true); // Obtain messages by the
user's friends $result = mysql_query('SELECT * FROM content WHERE uid IN
('.implode($friend_ids, ',') . ')'); $friend_content = array( ); while ($row =
mysql_fetch_assoc($result)) $friend_content [ ] $row;
```

In response, the social networking server may query, e.g., 716, its own database (e.g., social network database 705*b*), and obtain the requested social search results, e.g., 717, from its database. The social networking server may provide the retrieved information for the MaaS server, e.g., user social graph search results 718. For example, the social networking server may provide a JavaScript Object Notation format ("JSON")-encoded data structure embodying the requested information. An exemplary JSON-encoded data structure embodying social data (e.g., user ID(s) of friends of the logged-in user) is provided below:

TABLE-US-00004

```
[ "data": [ { "name": "Tabatha Orloff", "id": "483722"}, { "name":
"Darren Kinnaman", "id": "86S743"}, { "name": "Sharron Jutras", "id": "O91274"} ] }
```

In some embodiments, the MaaS server may query, e.g., 719, its own database, e.g., MaaS database 704*b*, for products matching the products search request key terms. In some embodiments, the merchant server may obtain product catalog data, e.g., 720, such as product information, product pricing, sales tax, offers, discounts, rewards, and/or other information to process the purchase transaction and/or provide value-added services for the user. For example, the MaaS database may be a relational database responsive to Structured Query Language ("SQL") commands. The MaaS server may execute a hypertext preprocessor ("PHP") script including SQL commands to query a database table (such as FIG. 23, Products 2319*l*) for product data. An example product catalog query 719, substantially in the form of PHP/SQL commands, is provided below:

TABLE-US-00005

```
<?PHP header('Content-Type: text/plain');
mysql_connect("254.93.179.112",$DBserver,$password); // access database server
mysql_select_db("DPO_DB.SQL"); // select database table to search //create query
$query = "SELECT product_title product_attributes_list product_price tax_info_list
related_products_list offers_list discounts_list rewards_list merchants_list
merchant_availability_list FROM ProductsTable WHERE product_ID LIKE '%' $prodID";
$result = mysql_query($query); // perform the search query
mysql_close("DPO_DB.SQL"); // close database access ?>
```

In some embodiments, the MaaS server may generate a product search response using the product catalog data and user social graph search results, e.g., 721. The MaaS server may provide the product search response, e.g., 722, to the merchant server as a response to the merchant server's product search request 714. For example, the MaaS server may provide the product search response to the merchant server as a HTTP(S) POST message including XML-formatted data. An example listing of a product search response 722, substantially in the form of a HTTP(S) POST message including XML-formatted data, is provided below:

TABLE-US-00006

```
POST /productsearchresponse.php HTTP/1.1 Host:
www.merchant.com Content-Type: Application/XML Content-Length: 1038 <?XML
version = "1.0" encoding = "UTF-8"?> <product_search_response>
<request_ID>YTUERWTQRT</request_ID> <session_ID>ASDF3245678</session_ID>
```

TABLE-US-00006-continued

```
<timestamp>2010-09-09 21:21:21</timestamp> <search_keys>type:virtual genre:action
brand:sony</search_keys> <expiry_lapse>00:03:00</expiry_lapse>
<response_details> <num_products>1</num_products> <product>
<product_type>book</product_type> <product_params> <product_title>XML for
dummies </product_title> <ISBN>938-2-14-168710-0</ISBN> <edition>2nd
ed.</edition> <cover>hardbound</cover> <seller>bestbuybooks</seller>
</product_params> <quantity>1</quantity> </product> </purchase_details>
<offers_details> <num_offers>1</num_offers> <product>
<product_type>book</product_type> <product_params> <product_title>Here's more
XML </product_title> <ISBN>922-7-14-165720-1</ISBN> <edition>1nd ed.</edition>
<cover>hardbound</cover> <seller>digibooks</seller> </product_params>
<quantity>1</quantity> </product> </offers_details> </product_search_response>
```

In some embodiments, the merchant server may provide the product search response, e.g., 723, to the PoS client, which may display, e.g., 724, the product search results to the user. In some embodiments, the user may select a product from among the displayed products for purchase. The user may provide a product selection input, e.g., 725, to indicate the user's desire to obtain the product. The PoS client may generate a product cart request, e.g., 726, and provide the product cart request, e.g., 727, to the merchant server, in response to obtaining the user's product selection input. For example, the PoS client may generate a HTTP(S) POST message similar to the example above, and provide it to the merchant server. The merchant server may query its database, e.g., 728, for prior product cart data, e.g., 729. For example, it may execute a hypertext preprocessor ("PHP") script including SQL commands to query a database table (such as FIG. 23, Products 2319*l*) for product cart data. An example product cart data query 728, substantially in the form of PHP/SQL commands, is provided below:

TABLE-US-00007

```
<?PHP header('Content-Type: text/plain');
mysql_connect("254.93.179.112",$DBserver,$password); // access database server
mysql_select_db("DPO_DB.SQL"); // select database table to search //create query
$query = "SELECT product_title product_attributes_list product_price tax_info_list
merchants_list merchant_availability_list FROM ProductsTable WHERE session_ID
LIKE `%` $sessionID"; $result = mysql_query($query); // perform the search query
mysql_close("DPO_DB.SQL"); // close database access ?>
```

In some embodiments, upon obtaining the product cart data, e.g., 729, the merchant server may generate updated product data based on the product cart request, e.g., 730, and store the updated product cart data in the merchant database, e.g., 731. For example, the merchant server may issue PHP/SQL commands to store the data to a database table (such as FIG. 23, Products 2319*l*). An example updated product cart store command 731, substantially in the form of PHP/SQL commands, is provided below:

TABLE-US-00008

```
<?PHP header('Content-Type: text/plain');
mysql_connect("254.92.185.103",$DBserver,$password); // access database server
mysql_select("DPO_DB.SQL"); // select database to append mysql_query("INSERT
INTO ProductsTable (session_id, product_title, product_attributes_list, product_price,
tax_info_list, merchants_list, merchant_availability_list) VALUES ($session_id
$product_title $product_attributes_list $product_price $tax_info_list $merchants_list
$merchant_availability_list)"); // add data to table in database
mysql_close("DPO_DB.SQL"); // close connection to database ?>
```

Figure 8:
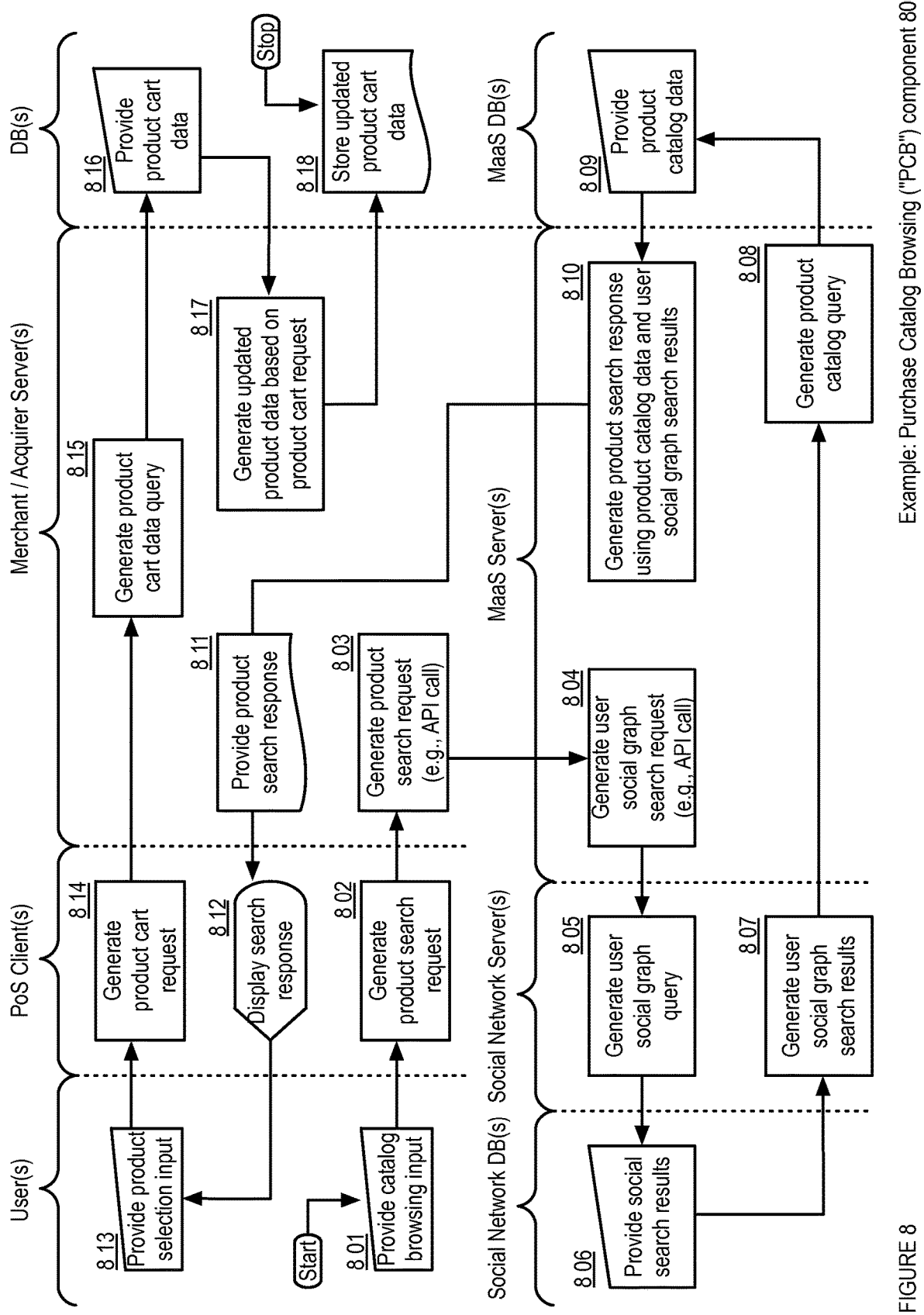
FIG. 8 shows a logic flow diagram illustrating example aspects of purchase catalog browsing in some embodiments of the DPO, e.g., a Purchase Catalog Browsing ("PCB") component 800.

FIG. 8 shows a logic flow diagram illustrating example aspects of purchase catalog browsing in some embodiments of the DPO, e.g., a Purchase Catalog Browsing ("PCB") component 800. In some implementations, a user may desire to browse through a product catalog of a merchant managed by the DPO. The user may provide a catalog browsing input, e.g., 801, into a point-of-sale (PoS) client to browse through a product catalog. In various embodiments, the user input may include, but not be limited to: a single tap (e.g., a one-tap mobile app purchasing embodiment) of a touch-screen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In response, the PoS client may generate a product search request, e.g., 802, and provide the product search request to a merchant/acquirer ("merchant") server. In some embodiments, the merchant server may utilize the DPO to search through the merchant's inventory to respond to the user's product catalog browse request. The merchant server may provide a product search request to a MaaS server. For example, the merchant server may generate an application programming interface call to request the MaaS server to provide product catalog search results, e.g., 803. In some embodiments, the MaaS server may utilize a social network service to determine products to recommend for the user. In some embodiments, the MaaS server may request the user to log into the social networking service in order to enable the user social graph search. For example, the MaaS server may request the social networking service to provide information on the user's communications on the social networking service, the user's social graph, and/or the social networking communications of the members of the user's social graph on the social networking service, e.g., 804. In response, the social networking server may query its own database, e.g., 805, and obtain the requested social search results from its database, e.g., 806. The social networking server may provide the retrieved information for the MaaS server, e.g., 807.

In some embodiments, the MaaS server may query its own database for products matching the products search request key terms, e.g., 808. In some embodiments, the merchant server may obtain product catalog data, such as product information, product pricing, sales tax, offers, discounts, rewards, and/or other information to process the purchase transaction and/or provide value-added services for the user. In some embodiments, the MaaS server may generate a product search response using the product catalog data and user social graph search results, e.g., 810. The MaaS server may provide the product search response to the merchant server as a response to the merchant server's product search request.

In some embodiments, the merchant server may provide the product search response to the PoS client, e.g., 811, which may display the product search results to the user, e.g., 812. In some embodiments, the user may select a product from among the displayed products for purchase, e.g., 813. The user may provide a product selection input to indicate the user's desire to obtain the product. The PoS client may generate a product cart request, e.g., 814, and provide the product cart request to the merchant server, in response to obtaining the user's product selection input. In some embodiments, upon obtaining the product cart data, the merchant server may generate updated product data based on the product cart request, e.g., 815-817, and store the updated product cart data in the merchant database, e.g., 818.

Figure 9:
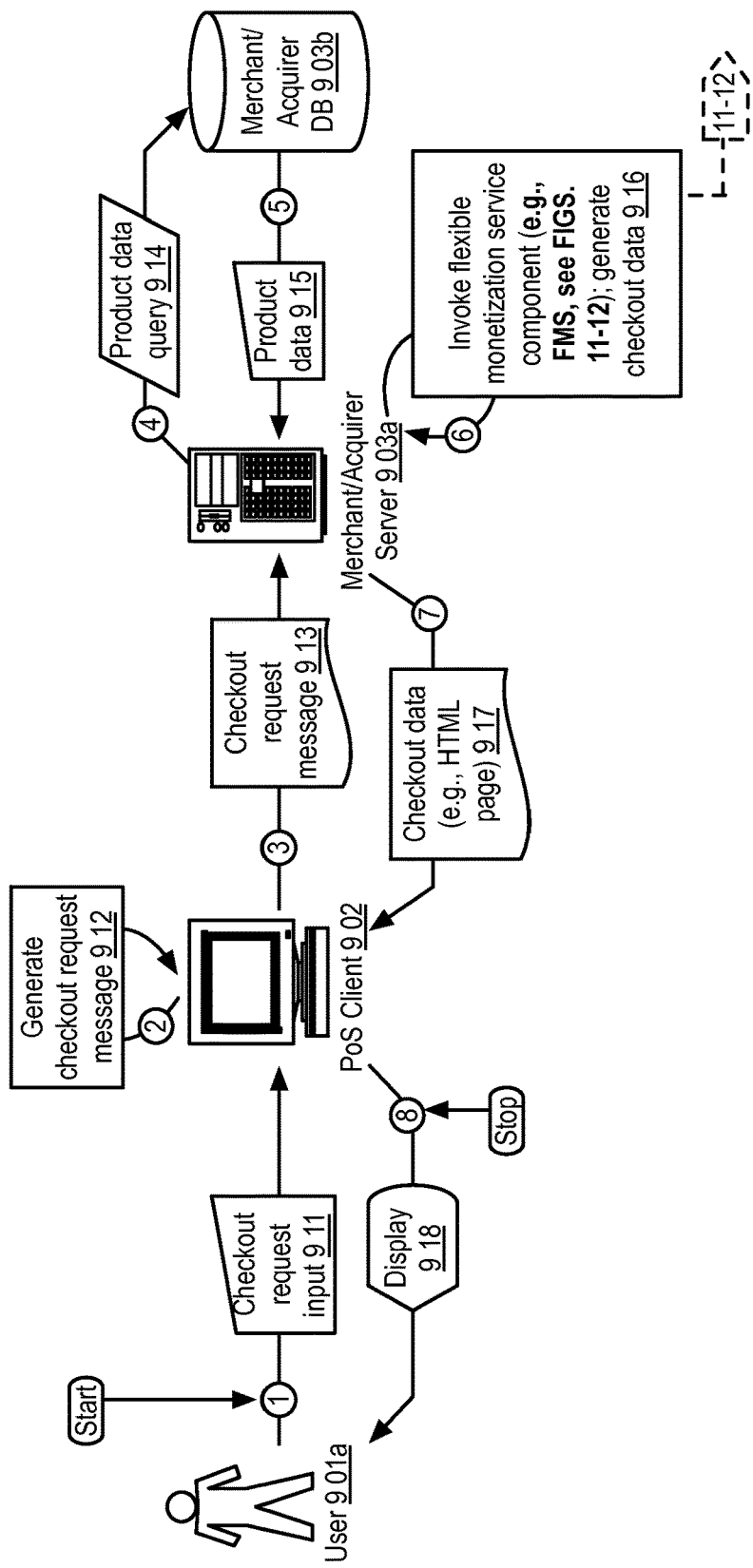
FIG. 9 shows a data flow diagram illustrating an example user purchase checkout procedure in some embodiments of the DPO.

FIG. 9 shows a data flow diagram illustrating an example user purchase checkout procedure in some embodiments of the DPO. In some embodiments, a user, e.g., 901a, may desire to purchase a product, service, offering, and/or the like ("product"), from a merchant via a merchant online site or in the merchant's store. The user may communicate with a merchant/acquirer ("merchant") server, e.g., 903a, via a client such as, but not limited to: a personal computer, mobile device, television, point-of-sale terminal, kiosk, ATM, and/or the like (e.g., 902). For example, the user may provide user input, e.g., checkout input 911, into the client indicating the user's desire to purchase the product. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 912, and provide the checkout request, e.g., 913, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 912, substantially in the form of a HTTP(S) POST message including XML-formatted data, is provided below:

TABLE-US-00009

POST /checkoutrequest.php HTTP/1.1 Host: www.merchant.com
Content-Type: Application/XML Content-Length: 667 <?XML version = "1.0" encoding =
"UTF-8"?> <checkout_request> <checkout_ID>4NFU4RG94</checkout_ID>
<timestamp>2011-02-22 15:22:43</timestamp> <purchase_detail>
<num_products>5</num_products> <product_ID>AE95049324</product_ID>
<product_ID>MD09808755</product_ID> <product_ID>OC12345764</product_ID>
<product_ID>KE76549043</product_ID> <product_ID>SP27674509</product_ID>
</purchase_detail> <!--optional parameters-->
<user_ID>john.q.public@gmail.com</user_ID> <PoS_client_detail>
<client_IP>192.168.23.126</client_IP> <client_type>smartphone</client_type>
<client_model>HTC Hero</client_model> <OS>Android 2.2</OS>
<app_installed_flag>true</app_installed_flag> </PoS_client_detail>
</checkout_request>

In some embodiments, the merchant server may obtain the checkout request from the client, and extract the checkout detail (e.g., XML data) from the checkout request. For example, the merchant server may utilize a parser such as the example parsers described below in the discussion with reference to FIG. 23. Based on parsing the checkout request 912, the merchant server may extract product data (e.g., product identifiers), as well as available PoS client data, from the checkout request. In some embodiments, using the product data, the merchant server may query, e.g., 914, a merchant/acquirer ("merchant") database, e.g., 903b, to obtain product data, e.g., 915, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 23, Products 2319*l*) for product data. An example product data query 914, substantially in the form of PHP/SQL commands, is provided below:

TABLE-US-00010

```
<?PHP header('Content-Type: text/plain');
mysql_connect("254.93.179.112",$DBserver,$password); // access database server
mysql_select_db("DPO_DB.SQL"); // select database table to search //create query
$query = "SELECT product_title product_attributes_list product_price tax_info_list
related_products_list offers_list discounts_list rewards_list merchants_list
merchant_availability_list FROM ProductsTable WHERE product_ID LIKE `%` $prodID";
$result = mysql_query($query); // perform the search query
mysql_close("DPO_DB.SQL"); // close database access ?>
```

In some embodiments, in response to obtaining the product data, the merchant server may generate, e.g., 916, checkout data to provide for the PoS client. In some embodiments, such checkout data, e.g., 917, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. In some embodiments, the checkout data may In some implementations, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 917, substantially in the form of XML-formatted data, is provided below:

TABLE-US-00011

```
<?XML version = "1.0" encoding = "UTF-8"?> <checkout_data>
<session_ID>4NFU4RG94</session_ID> <timestamp>2011-02-22
15:22:43</timestamp> <expiry_lapse>00:00:30</expiry_lapse>
<transaction_cost>$34.78</transaction_cost>
<alerts_URL>www.merchant.com/shopcarts.php?sessionID=
4NFU4RG94</alerts_URL> <!--optional data-->
<user_ID>john.q.public@gmail.com</user_ID> <client_details>
<client_IP>192.168.23.126</client_IP> <client_type>smartphone</client_type>
<client_model>HTC Hero</client_model> <OS>Android 2.2</OS>
<app_installed_flag>true</app_installed_flag> </client_details> <purchase_details>
<num_products>1</num_products> <product> <product_type>book</product_type>
<product_params> <product_title>XML for dummies </product_title> <ISBN>938-2-14-
168710-0</ISBN> <edition>2nd ed.</edition> <cover>hardbound</cover>
<seller>bestbuybooks</seller> </product_params> <quantity>1</quantity> </product>
</purchase_details> <offers_details> <num_offers>1</num_offers> <product>
<product_type>book</product_type> <product_params> <product_title>Here's more
XML </product_title> <ISBN>922-7-14-165720-1</ISBN> <edition>1nd ed.</edition>
<cover>hardbound</cover> <seller>digibooks</seller> </product_params>
<quantity>1</quantity> </product> </offers_details>
<secure_element>www.merchant.com/securedyn/0394733/123.png </secure_element>
<merchant_params> <merchant_id>3FBCR4INC</merchant_id>
<merchant_name>Books & Things, Inc.</merchant_name>
<merchant_auth_key>1NNF484MCP59CHB27365 </merchant_auth_key>
</merchant_params> <checkout_data>
``` be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 15-16. The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network.

In alternate embodiments, the merchant server may invoke a component to generate checkout data, such as the example flexible monetization service component discussed below with reference to FIGS. 11-12. Upon obtaining the checkout data, e.g., 917, the PoS client may render and display, e.g., 918, the checkout data for the user.

Figure 10:
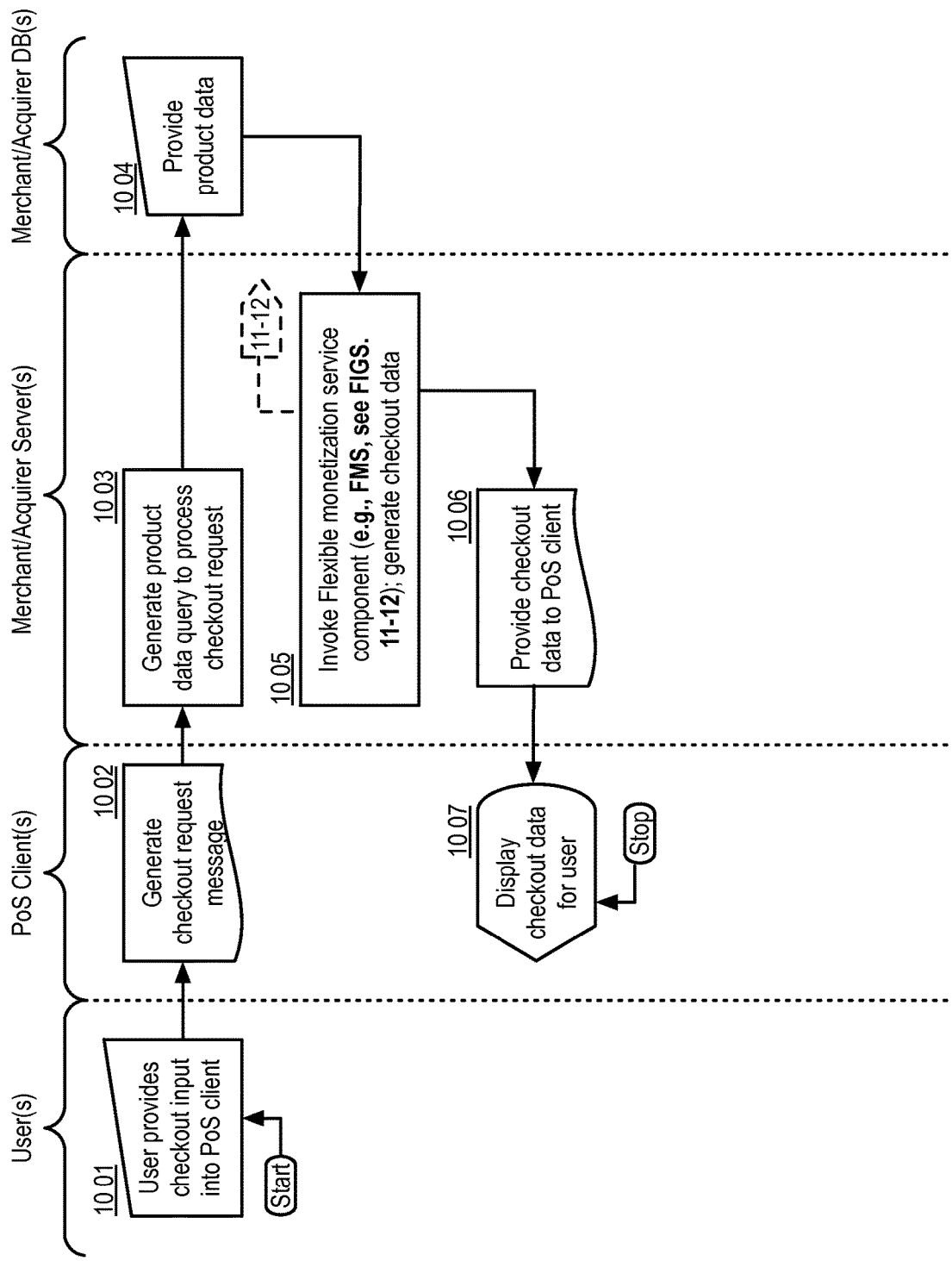
FIG. 10 shows a logic flow diagram illustrating example aspects of user purchase checkout in some embodiments of the DPO, e.g., a User Purchase Checkout ("UPC") component 1000.

FIG. 10 shows a logic flow diagram illustrating example aspects of user purchase checkout in some embodiments of the DPO, e.g., a User Purchase Checkout ("UPC") component 1000. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 1001, into the client indicating the user's desire to purchase the product. The client may generate a checkout request, e.g., 1002, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 23. Based on parsing the checkout request, the merchant server may extract product data (e.g., product identifiers), as well as available PoS client data, from the checkout request. In some embodiments, using the product data, the merchant server may query, e.g., 1003, a merchant/acquirer ("merchant") database to obtain product data, e.g., 1004, such as product information, product pricing, sales tax, offers, discounts, rewards, and/or other information to process the purchase transaction and/or provide value-added services for the user. In some embodiments, in response to obtaining the product data, the merchant server may generate, e.g., 1005, checkout data to provide, e.g., 1006, for the PoS client. In some embodiments, the merchant server may invoke a component to generate checkout data, such as the example flexible monetization service component discussed below with reference to FIGS. 11-12. Upon obtaining the checkout data, the PoS client may render and display, e.g., 1007, the checkout data for the user.

Figure 11A:
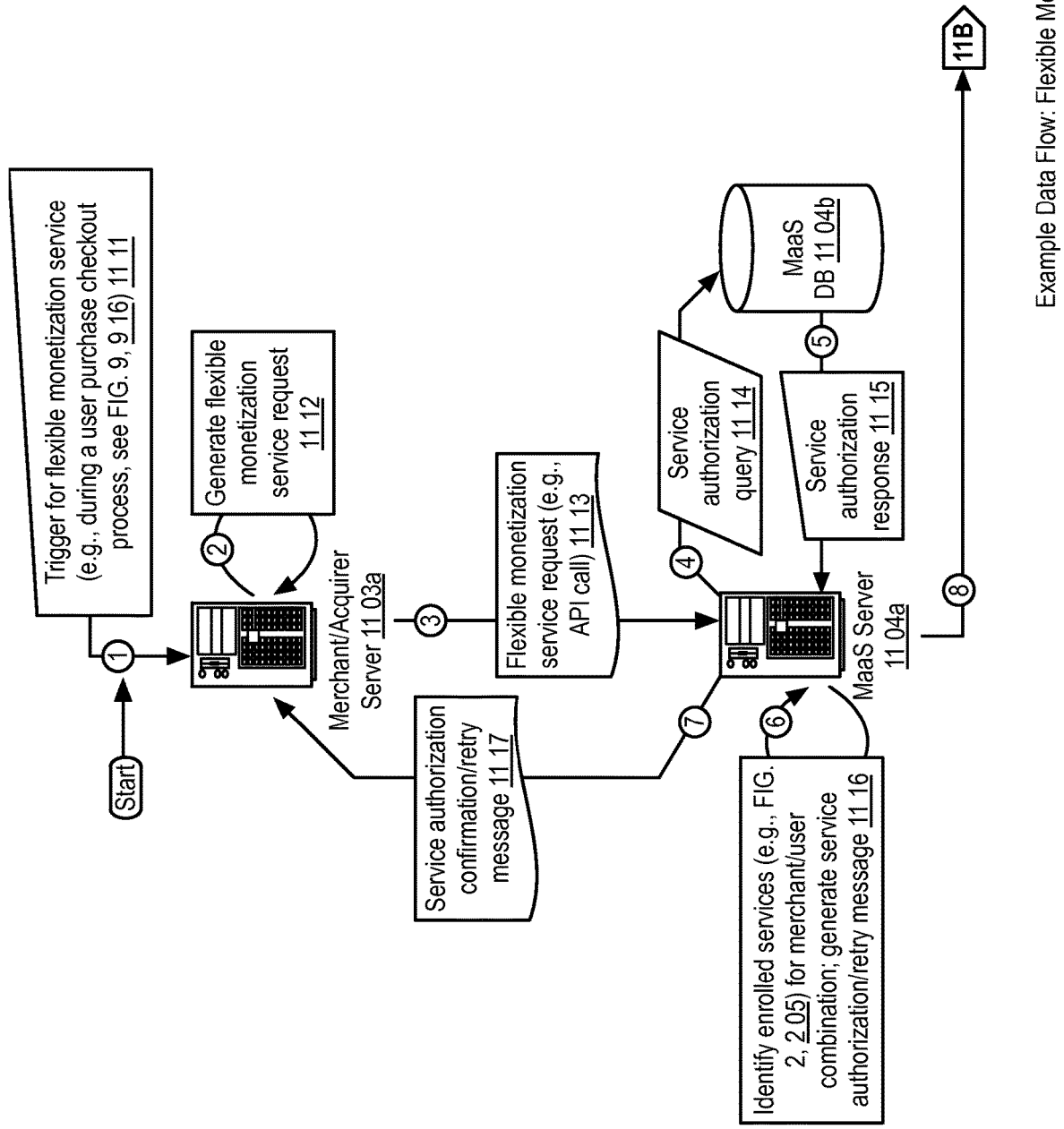
FIGS. 11A-B show data flow diagrams illustrating an example flexible monetization service procedure in some embodiments of the DPO.
Figure 11B:
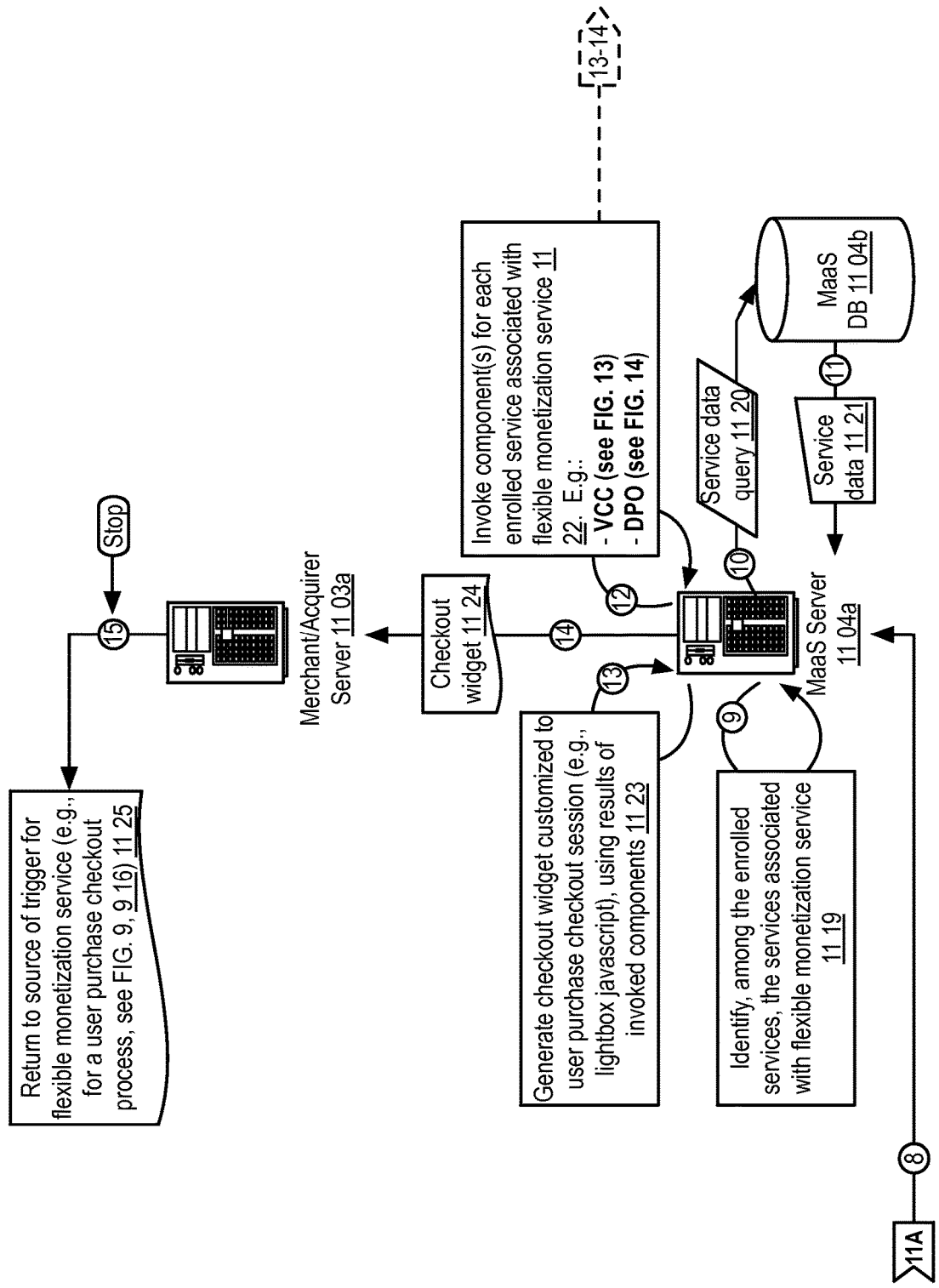

FIGS. 11A-B show data flow diagrams illustrating an example flexible monetization service procedure in some embodiments of the DPO. In some embodiments, a merchant server or other entity or component within the DPO may obtain a trigger, e.g., 1111, to provide flexible monetization services (see, e.g., FIG. 9, 916). In some embodiments, the merchant server may parse the obtained trigger for providing P2P social network marketing service, and extract details of services required by the merchant to service the trigger. For example, the merchant may require to provide checkout services, including configuration the UI of the checkout page for the user, configuring the currency in which the purchase price is displayed in currencies available to the user, and/or the like. The merchant server may identify the services required to be performed to service the flexible monetization service trigger, and generate, e.g., 1112, a flexible monetization service request based on identifying the required services. The merchant server may provide, e.g., 1113, the flexible monetization service request to a MaaS server, e.g., 1104*a*, for processing. For example, the merchant server may provide a flexible monetization service request to the MaaS server as a HTTP(S) POST message including XML-formatted data. An example listing of a flexible monetization service request 1113, substantially in the form of a HTTP(S) POST message including XML-formatted data, is provided below:

In some embodiments, the MaaS server may, in response to obtaining the flexible monetization service request, determine whether the merchant-user combination is authorized to utilize flexible monetization services. For example, the MaaS server may query, e.g., 1114, a MaaS database, e.g., 1104*b*, to determine whether the merchant and/or user are authorized to receive its services, e.g., 1115. For example, the MaaS server may utilize PHP/SQL commands similar to those described previously to determine service authorization. In some embodiments, the MaaS server may utilize the service authorization response, e.g., 1115, to identify, e.g., 1116, the services in which the merchant is enrolled which can be provided for the particular user shopping session for which the merchant obtained the flexible monetization service request. Upon determining whether the user-merchant combination is authorized to receive its services, the MaaS server may provide a service authorization confirmation message (or retry message, if the MaaS server determines that the session is not authorized for services), e.g., 1117, to the merchant server.

Figure 13A:
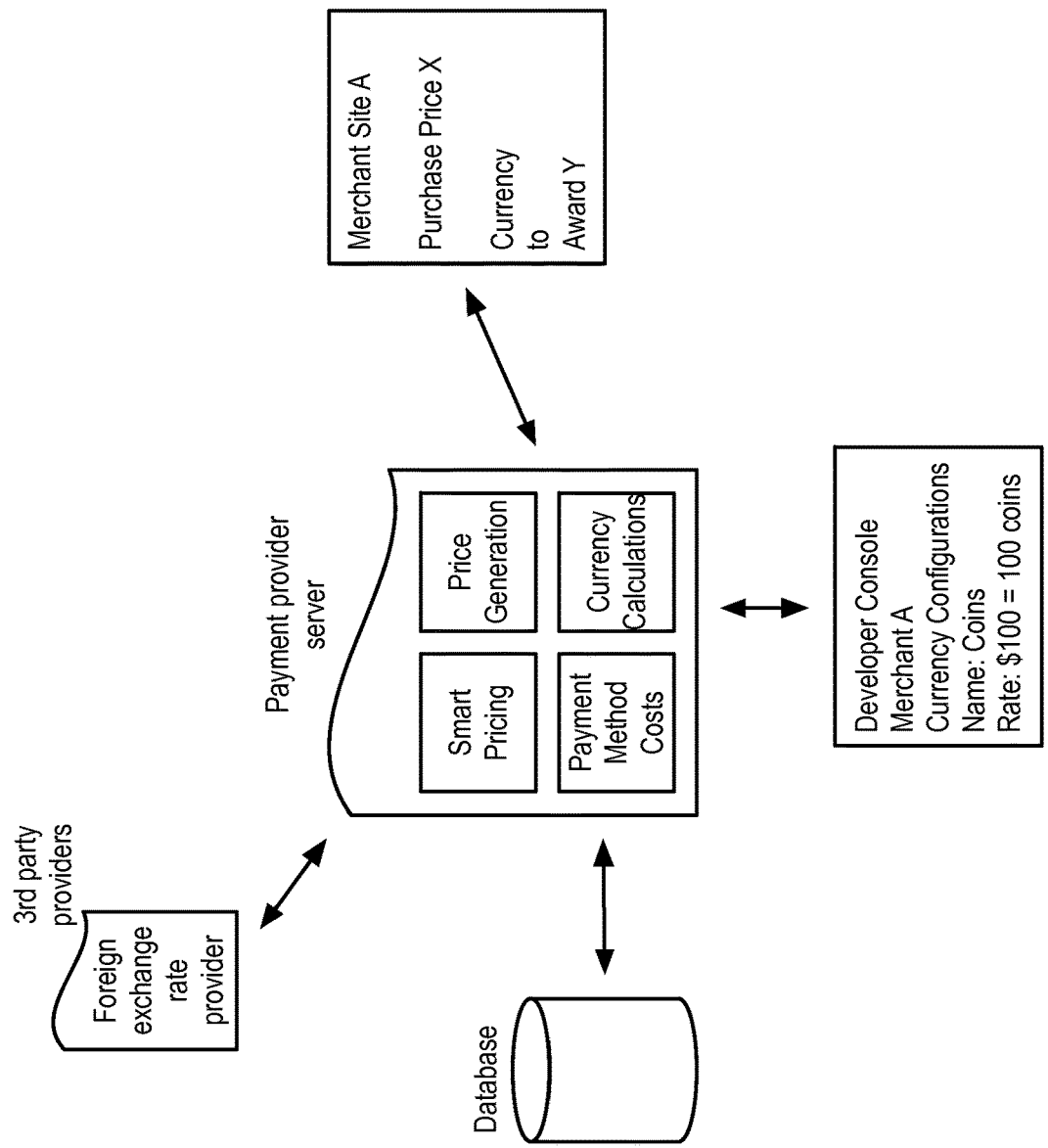

With reference to FIG. 11 B, in some embodiments, the MaaS server may identify, among the enrolled services, the services associated with PoS notification/offer generation, e.g., 1119. The MaaS server may obtain any service data, e.g., via PHP/SQL commands to its database as described previously, to obtain the data necessary to perform the services. The MaaS server may invoke components for each enrolled service associated with PoS notification/offer generation, e.g., 1112. For example, the MaaS server may invoke the VCC 1300 and DPO 1400 components described further below with reference to FIGS. 13 and 14 respectively. Using the results of the invoked components, the MaaS server may generate, e.g., 1123 a checkout widget customized to a user purchase checkout session (e.g., a javascript or AJAX lightbox). For example, the MaaS server may generate a code listing similar to the example code listing provided below as the checkout widget 1124:

TABLE-US-00012

POST /monetizationservicerequest.php HTTP/1.1 Host:
www.paygateway.com Content-Type: Application/XML Content-Length: 1126 <?XML
version = "1.0" encoding = "UTF-8"?> <flexible_monetization_service_request>
<session_ID>4NFU4RG94</order_ID> <timestamp>2011-02-22 15:22:43</timestamp>
<expiry>00:00:30</expiry>
<alerts_URL>www.merchant.com/shopcarts.php?sessionID = AEBB4356</alerts_URL>
<!--optional data--> <user_ID>john.q.public@gmail.com</user_ID> <PoS_details>
<PoS_IP>192.168.23.126</client_IP> <PoS_type>smartphone</client_type>
<PoS_model>HTC Hero</client_model> <OS>Android 2.2</OS>
<app_installed_flag>true</app_installed_flag> </PoS_details> <purchase_details>
<num_products>1</num_products> <product> <product_type>book</product_type>
<product_params> <product_title>XML for dummies </product_title> <ISBN>938-2-14-
168710-0</ISBN> <edition>2nd ed.</edition> <cover>hardbound</cover>
<seller>bestbuybooks</seller> </product_params> <quantity>1</quantity> </product>
</purchase_details> <merchant_params> <merchant_id>3FBCR4INC</merchant_id>
<merchant_name>Books & Things, Inc.</merchant_name>
<merchant_auth_key>1NNF484MCP59CHB27365 </merchant_auth_key>
</merchant_params> <flexible_monetization_service_request>

TABLE-US-00013

```
<html> <body> <script type="text/javascript"
src="http://static.pay.Com/js/ ultimatepay-api.js"></script> <script type="text/javascript">
var ultimatePayParams = { "sn" : "ACME", "userid" : "131827", "currency" : "USD",
"sepamount" : "6.99", "amountdesc" : "Gold Membership", "hash" :
"df659d502af5151a2edd18e2ebb50ba3", "xdurl" : "http://www.mydomain.com/xd.html" }
// Merchant-defined function to display Lightbox. function showLightbox( )
{ ulp.ultimatePay = true; ulp.displayUltimatePay( ); } </script> <a
href="javascript:showLightbox( );">Pay Now</a> <div id="div_b"
style="display:none;padding:10px;position:absolute; top: 50%;left: 50%; margin-top: -
212px; margin-left: -351px;"></div> </body> </html>
```

In some embodiments, the MaaS server may provide the checkout widget, e.g., 1124, to the merchant server, which may provide the widget back to the source of the trigger for flexible monetization services.

Figure 12A:
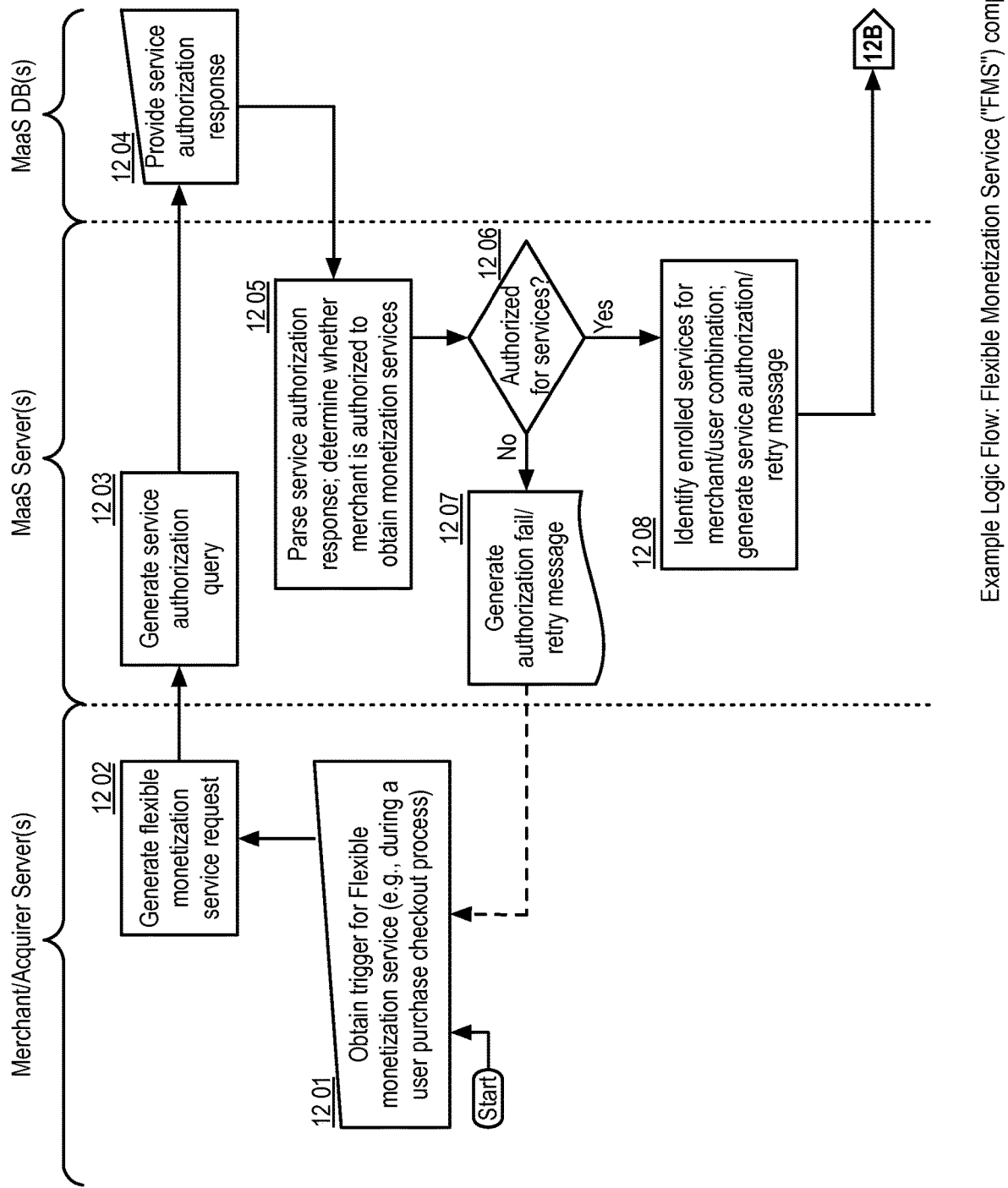
FIGS. 12A-B shows logic flow diagrams illustrating example aspects of flexible monetization service in some embodiments of the DPO, e.g., a Flexible Monetization Service ("FMS") component 1200.
Figure 12B:
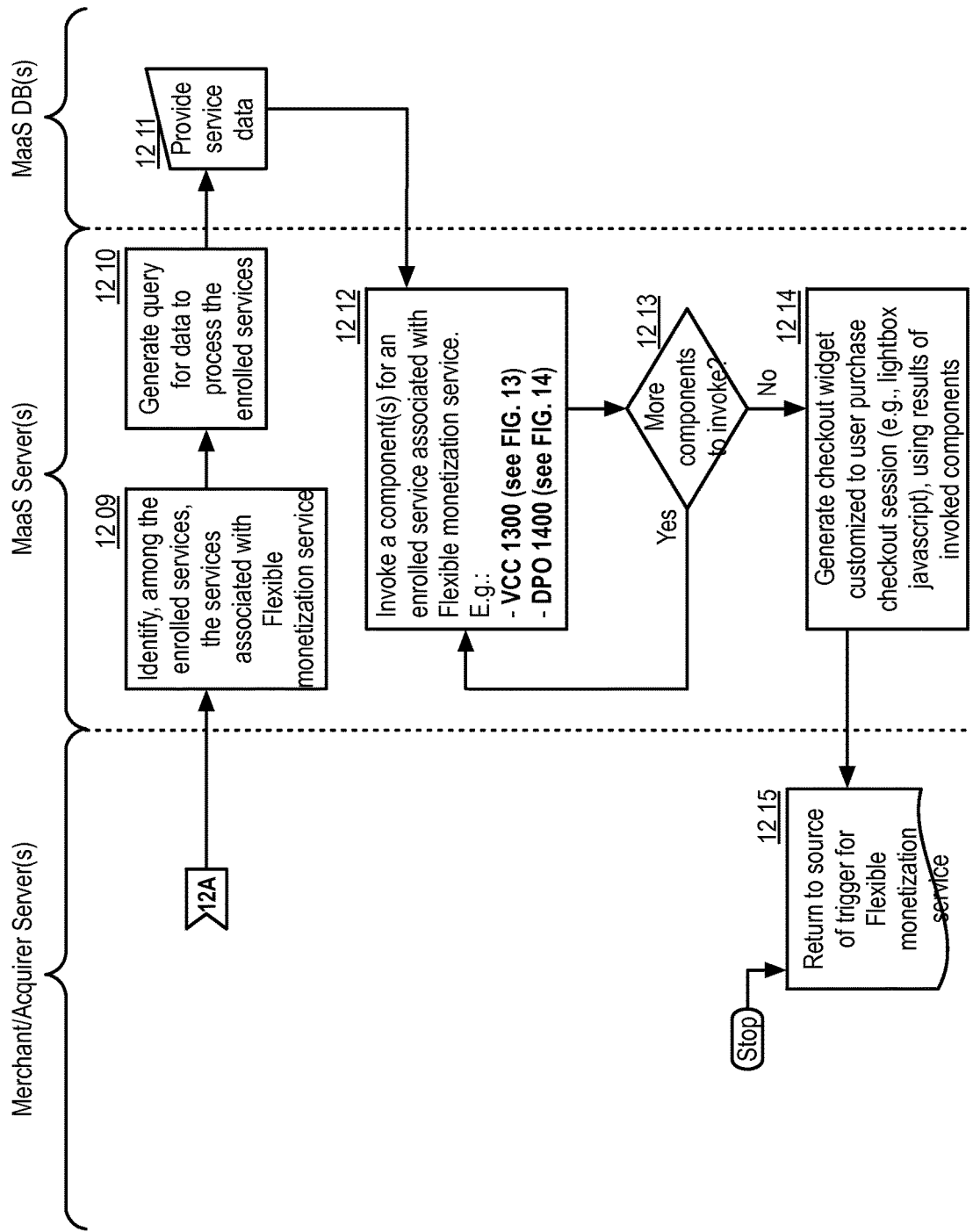

FIGS. 12A-B shows logic flow diagrams illustrating example aspects of flexible monetization service in some embodiments of the DPO, e.g., a Flexible Monetization Service ("FMS") component 1200. In some embodiments, a merchant server or other entity or component within the DPO may obtain a trigger, e.g., 1201, to provide flexible monetization services (see, e.g., FIG. 9, 916). In some embodiments, the merchant server may parse the obtained trigger for providing P2P social network marketing service, and extract details of services required by the merchant to service the trigger. For example, the merchant may require to provide checkout services, including configuration the UI of the checkout page for the user, configuring the currency in which the purchase price is displayed in currencies available to the user, and/or the like. The merchant server may identify the services required to be performed to service the flexible monetization service trigger, and generate, e.g., 1202, a flexible monetization service request based on identifying the required services. The merchant server may provide the flexible monetization service request to a MaaS server for processing. In some embodiments, the MaaS server may, in response to obtaining the flexible monetization service request, determine whether the merchant-user combination is authorized to utilize flexible monetization services. For example, the MaaS server may query, e.g., 1203, a MaaS database to determine whether the merchant and/or user are authorized to receive its services, e.g., 1204. For example, the MaaS server may utilize PHP/SQL commands similar to those described previously to determine service authorization. In some embodiments, the MaaS server may utilize the service authorization response to identify, e.g., 1206, the services in which the merchant is enrolled which can be provided for the particular user shopping session for which the merchant obtained the flexible monetization service request. Upon determining whether the user-merchant combination is authorized to receive its services, the MaaS server may provide a service authorization confirmation message (or retry message, if the MaaS server determines that the session is not authorized for services), e.g., 1207, to the merchant server.

With reference to FIG. 12B, in some embodiments, the MaaS server may identify, among the enrolled services, the services associated with PoS notification/offer generation, e.g., 1209. The MaaS server may obtain any service data, e.g., via PHP/SQL commands to its database as described previously, to obtain the data necessary to perform the services, e.g., 1210-1211. The MaaS server may invoke components for each enrolled service associated with PoS notification/offer generation, e.g., 1212-1213. For example, the MaaS server may invoke the VCC 1300 and DPO 1400 components described further below with reference to FIGS. 13 and 14 respectively. Using the results of the invoked components, the MaaS server may generate, e.g., 1214, a checkout widget customized to a user purchase checkout session (e.g., a javascript or AJAX lightbox). In some embodiments, the MaaS server may provide the checkout widget, e.g., 1214, to the merchant server, which may provide the widget back to the source of the trigger for flexible monetization services.

FIGS. 13A-F show block and logic flow diagrams illustrating example aspects of virtual currency configuration in some embodiments of the DPO, e.g., a Virtual Currency Configuration ("VCC") component 1300. In some embodiments, the DPO may allow for game developers to price and package their virtual currencies in multiple currencies and multiple payment methods. Price packaging may allow game developers the ability to specify ratios, discreet pricing and even "smart pricing"—which auto rounds virtual currency bundles. For example, game developers may configure virtual currency bundles. For example, one or more virtual currencies and/or currency management rules may be included in a virtual currency bundle, and wherein a discount level for any virtual currency bundle may vary based on a user-selected payment method, and a device type from where the user procures the virtual currency bundle. For example, a user purchasing using a preferred payment method such as a Visa credit card may be offered a currency bundle of $1 to 1000 virtual game gold pieces, but only gold pieces were they to select a check as a payment mechanism. Also, merchants may incentivize or decentivize users to obtain gold pieces through certain devices, applications, and/or other mechanisms. For example, when purchasing gold pieces within a virtual game, for instant in-game availability, a premium may be added, and the currency bundle may result in providing only 900 gold pieces instead of 1000 gold pieces in the above example. In another example where a merchant wishes to incentivize users to purchase virtual currency bundles on mobile devices, the merchant may provide 1250 gold pieces for the same $1. These virtual currency bundles may be specified by the merchant and/or other components and/or entities within the DPO.

In some embodiments, the DPO may manage ratios. For example, let's say that a game wants to see virtual currency for a ratio of $1 to 100. The DPO may automatically calculate virtual currency amounts, so that if you enter a payment for $5, then 500 points is automatically created.

In some embodiments, the DPO may manage Discreet Pricing. For example, let's say that a game wants to give away more coins for money invested. Discreet pricing allows game developers to enter discreet point packages for different prices points. For example, the user might get 500 coins for $5, but 1,100 coins for $10 (a 100 coin bonus).

In some embodiments, the DPO may utilize Smart Pricing. For example, let's say that a game sets a ratio of $1=1,000 coins. However, the user is in Germany and prefers to pay in Euros. Instead of just doing a simple conversion and showing 1 EUR=793 Coins, Game Developers can round either up or down, from 1-3 significant digits. This means that the user might see 800 coins (rounded up to two significant digits) which is a much better number than 793 (from a consumer marketing perspective). In some embodiments, a setting for each country, merchant, and/or product may specify the number of threshold digits that may be rounded. For example, in the US, aggregate analysis of consumer behavior may show that two-digit rounding to enhance and increase transaction throughput for 4-digit point levels. For example, if a strict conversion ratio for $10 would 1237 virtual coins, having a two-digit rounding for the 4-digit value may result in an amount of 1250 coins, with "50" being the last two digits allowed for threshold rounding.

In some embodiments, the DPO may adapt virtual currencies according to the costs of the payment method employed by the user. As one example, the DPO may manage a high cost payment method such as Mobile Pricing. For example, let's say that a game sets a ratio of $1=1,000 coins for standard payments, e.g. credit card or PayPal. What if the user wants to pay in mobile? Mobile payments tend to charge 50% or more. The game developer can specify different ratios for different payment methods or different payment cost types. In this example, the game developer might want to give the user $1=750 coins (25% less coins) to help cover the economic costs of the mobile payment. As another example, the game developer may utilize different discrete mobile price points across multiple carriers, and set ratios (or discrete points) so that the DPO can automatically calculate a discrete number of price points per carrier for each country and show the appropriate pricing to the user. In general, it is contemplated that a DPO may facilitate dividing up the available price points to maximize the range of payment options provided to the user, and then provide a set number of payment choices, and calculating the applicable virtual currency to display.

In some embodiments, the DPO may accommodate the above mentioned virtual currency use cases as follows: Virtual Currencies may be created by the game developer on a Developer Console. Virtual currencies may be configured with names, like "Coins" and virtual currency codes, which reference the virtual currency during API calls. Once a virtual currency has been created, the game developer may create pricing rules for the virtual currency.

In some embodiments, once a base set of rules is created—the virtual currency is ready for use. The game developer may sell the virtual currency on their service, and when the user clicks on "buy"; then the game developer may also pass a virtual currency code, to let the DPO know that the purchase is for a virtual currency configured in the DPO. The payment interface on the game developer's site may then allow the user to make the payment. The interface may show price packages in drop downs and buttons according to the rules set up in the developer console. When the payment is complete, the DPO may send a postback communication to the game developer that the payment is complete. As part of the payment complete notification, the DPO may also pass the virtual currency code (so the game developer knows to credit the user with virtual currency), as well as the amount of virtual currency to credit. For security both the virtual currency code and the virtual currency amount may be MD5 hashed, so that users can't tamper with or grant themselves extra virtual currency.

Figure 13F:
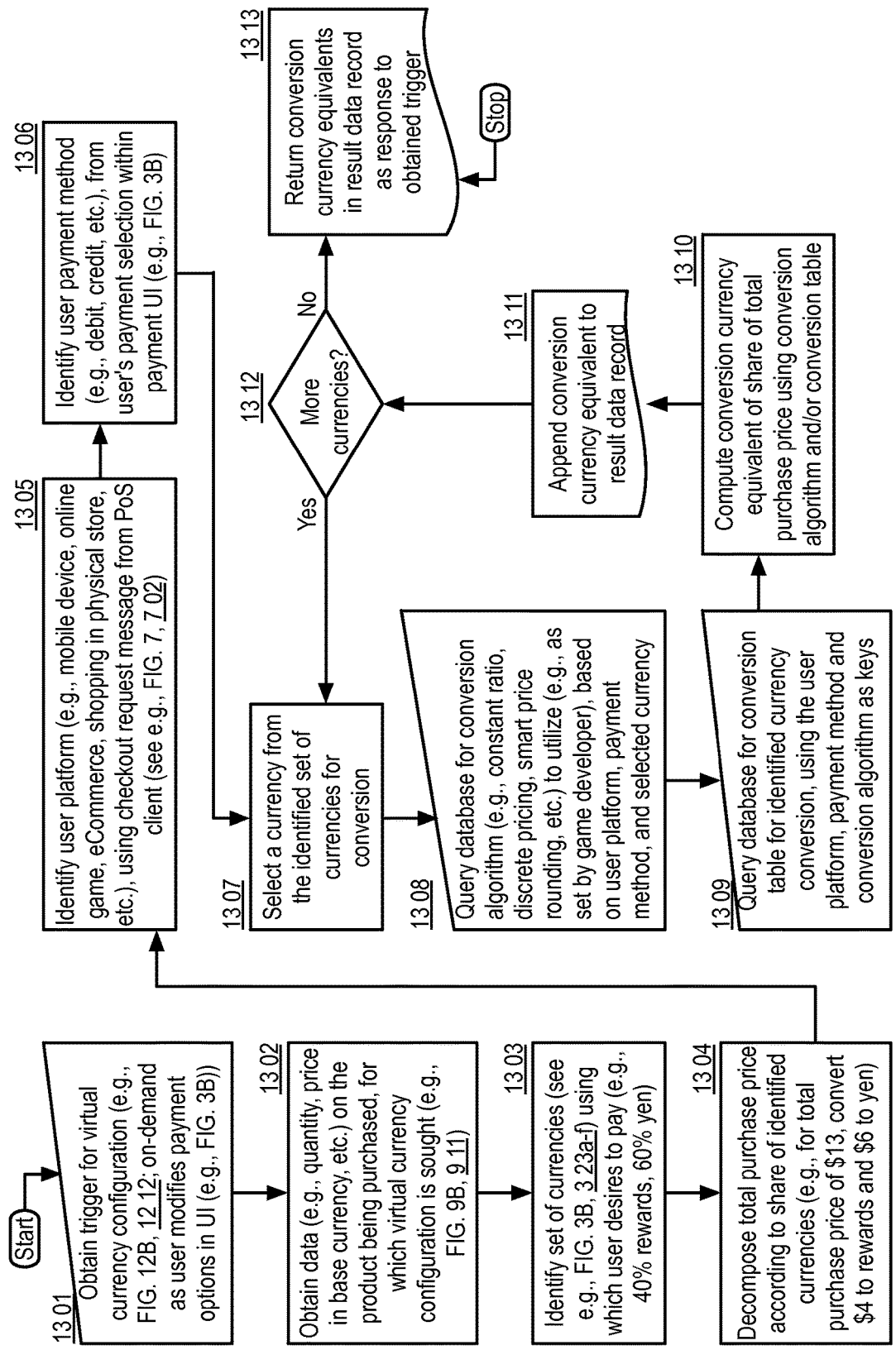

With reference to FIG. 13F, in some embodiments, an entity and/or component of the DPO may obtain a trigger for virtual currency configuration (e.g., MaaS server 1104a in FIG. 11A), e.g., 1301. As an example, the DPO may obtain the trigger when a user requires on-demand modification of payment options in a UI (see e.g., FIG. 3B). The DPO may obtain data on the product being purchased for which virtual currency configuration is sought, e.g., 1302. The DPO may identify a set of currencies using which the user desires to pay for the product purchase, e.g., 1303. For example, if the user desires to pay 40% of the purchase price using rewards points, and 60% using Japanese yen, then the DPO may identify the specific type of rewards points and Japanese yen as the set of currencies to convert the purchase price into, from the present currency(ies) in which the pricing information is available. Based on identifying the set of currencies, the DPO may decompose the purchase price according to the share of identified currencies, e.g., 1304. For example, if the purchase price is $10, for the example set of currencies above, the DPO may decompose the purchase prices into $4 for payment through rewards points, and $6 for payment through Japanese yen.

In some embodiments, the DPO may determine currency exchange rates for the virtual currency configuration based on one or more factors, which may include, but not be limited to: user device platform (e.g., mobile device, online game, eCommerce site, shopping in physical store, etc.), user payment method (e.g., debit, credit, etc.), and/or the like. For example, the DPO may determine the user's platform using communications forwarded to it from the PoS client where the user is engaged in the purchase transaction, e.g., 1305. The DPO may also determine the user payment method being utilized for payment, e.g., using user payment selections made by the user at the PoS client being utilized for the purchase transactions, e.g., 1306. The DPO may determine a currency conversion exchange rate for each of the set of currencies identified as being implicated in the virtual currency configuration. For example, the DPO may select a currency from the identified set of currencies for conversion, e.g., 1307. The DPO may query a database for a conversion algorithm to utilize for the conversion, based on the user platform, payment method, selected currency, and/or the like. For example the DPO may query a database using PHP/SQL commands similar to the example described previously to obtain the conversion algorithm to utilize. Several examples of conversion algorithms are described below. The DPO may utilize any single algorithm, or combinations of the algorithms in any sequence and to any portion of the conversion of the set of currencies, to convert the price from one currency to another For example, one algorithm, a constant ratio algorithm, may assign a constant exchange rate, regardless of the total value of the purchase price. A discreet pricing algorithm may assign a variable exchange rate depending on the total value of the purchase price. For example, the exchange rate may be lowered (e.g., more beneficial to the user) when the total purchase price is higher than a threshold value, than when it the total purchase price is lower than the threshold value. The discreet pricing algorithm may, in some embodiments, utilize a plurality of thresholds to a generate virtual currency conversions. As another example, one algorithm, a smart pricing algorithm, may round the value of any input passed to it to at least one significant digit. The inputs passed to the smart pricing algorithm may, in various embodiments, be the exchange rate calculated by another algorithm, a price calculated by another algorithm, a (portion of a) purchase price of a product, and/or the like. In some embodiments, the DPO may utilize a pre-specified table for performing some of the currency conversions. In such embodiments, the DPO may query a database for a conversion table for the identified currency conversions, using the user platform, payment method and conversion algorithms as keys for the query, e.g., 1309. Using the conversion algorithms and conversion tables, the DPO may compute a conversion currency equivalent of the share of the total purchase price. In some embodiments, the conversion currency equivalent may be rounded using the smart pricing algorithm before being returned as a response to the trigger. The DPO may perform such currency conversions for each currency identified as belonging to the set of currencies implicated in the virtual currency conversion. The DPO may return the conversion currency equivalents in a result data record as a response to the obtained trigger.

Figure 14:
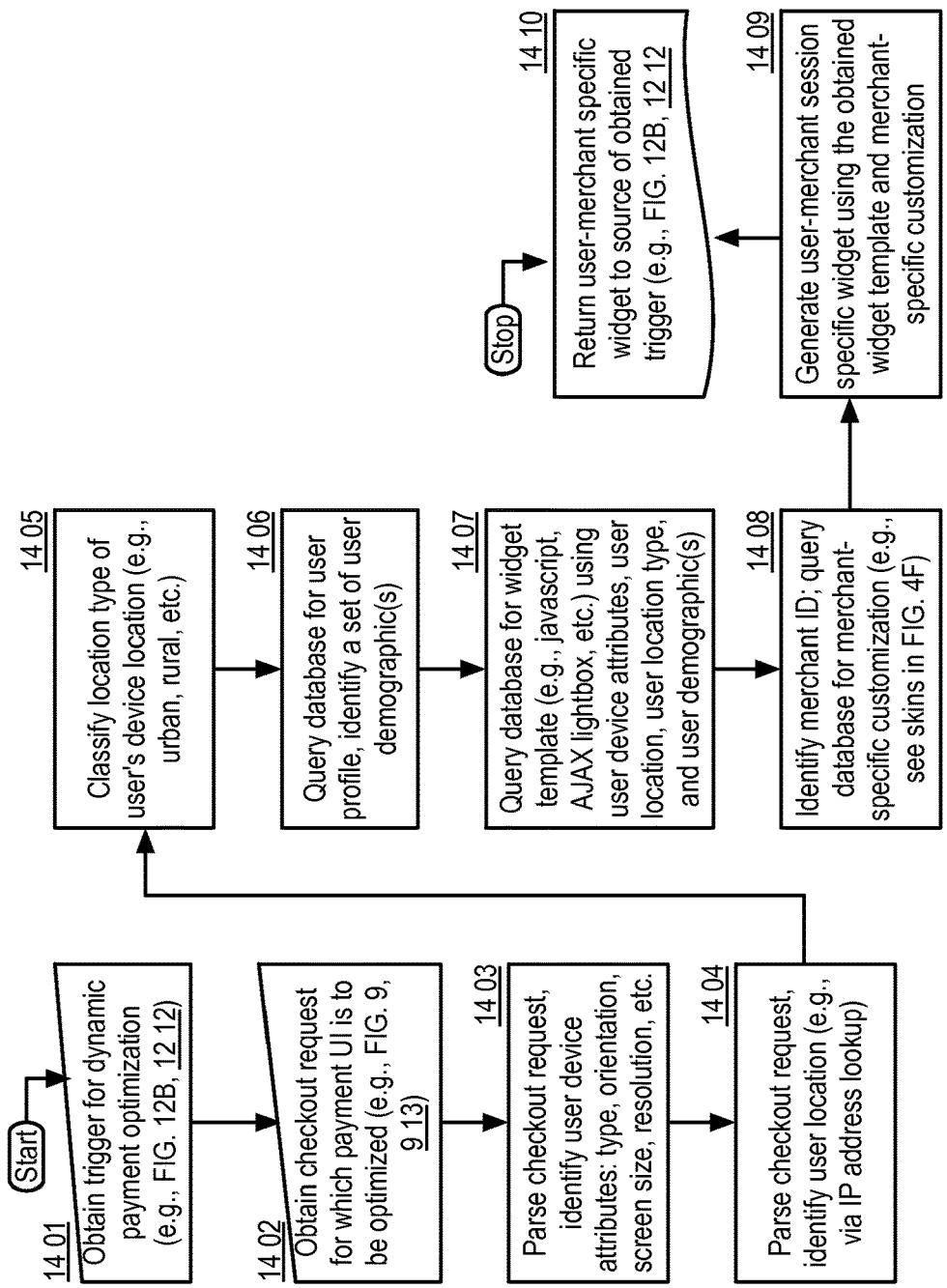
FIG. 14 shows a logic flow diagram illustrating example aspects of dynamic payment optimization in some embodiments of the DPO, e.g., a Dynamic Payment Optimization ("DPO") component 1400.

FIG. 14 shows a logic flow diagram illustrating example aspects of dynamic payment optimization in some embodiments of the DPO, e.g., a Dynamic Payment Optimization ("DPO") component 1400. In some embodiments, an entity and/or component of the DPO may obtain a trigger for dynamic payment optimization (e.g., MaaS server 1104*a* in FIG. 11A), e.g., 1401. As an example, the DPO may obtain the trigger when a user requires on-demand modification of payment options in a UI (see e.g., FIG. 3B). The DPO may obtain a checkout request for which payment UI is to be optimized (see e.g., FIG. 9, 9 13), e.g., 1402. The DPO may parse the checkout request, and identify user device attributes: type, orientation, screen size, resolution, etc., e.g., 1403. For example, the DPO may utilize parsers similar to the example parsers described below with reference to FIG. 23. The DPO may parse the checkout request, and identify a user location (e.g., via IP address lookup), e.g., 1404. The DPO may classify the location type of user's device location (e.g., urban, rural, etc.), for example, based on an lookup of the IP address of the user device, e.g., 1405. The DPO may query a database for a user profile, and identify a set of user demographic(s), e.g., 1406. For example, the DPO may obtain demographic data such as, but not limited to: age group, gender, education level, political preferences, and/or other classifications.

In some embodiments, the DPO may query, e.g., 1407, a database for a widget template (e.g., javascript, AJAX lightbox, etc.) using the user device attributes, user location, user location type, and user demographic(s) as key terms in the query. Thus, in some embodiments, the DPO may be able to generate, using a template widget, a customized widget that is optimized based on the user device attributes, user location, user location type, and user demographic(s), among other attributes. The DPO may identify, e.g., 1408, a merchant ID for the merchant, and query a database for merchant-specific customization (e.g., see skins in FIG. 4E). The DPO may generate a user-merchant session specific widget using the obtained widget template (customized to the user, user device, user location, etc.) and merchant-specific customizations, e.g., 1409. The DPO may return the user-merchant specific widget to source of obtained trigger, e.g., 1410. In some embodiments, the DPO may provide a notification of customizations to be performed for optimizing a user payment interface via an application programming interface (e.g., encoded in XML or JSON data format), as opposed to providing the customized interface itself.

Figure 15A:
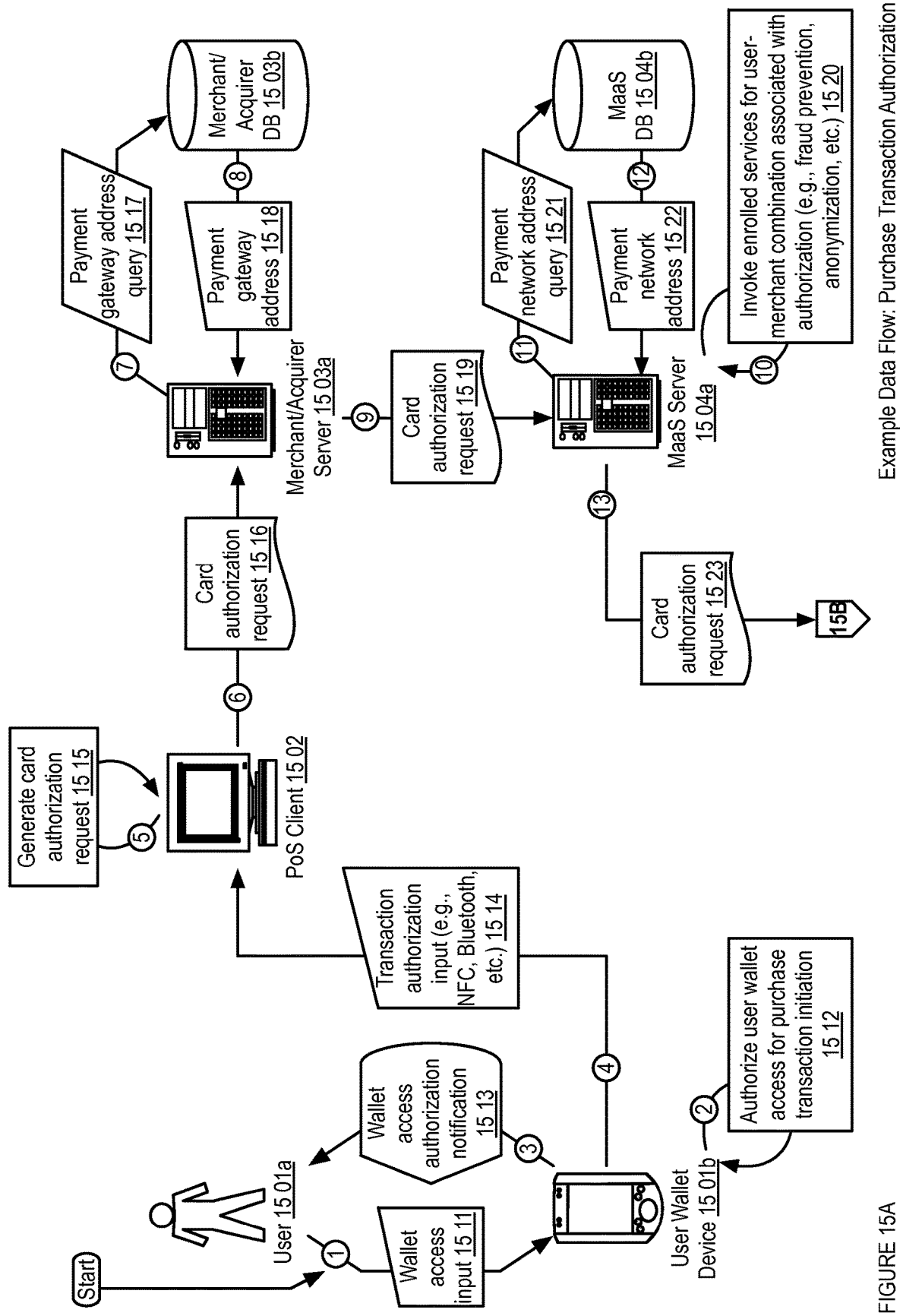
FIGS. 15A-B show data flow diagrams illustrating an example purchase transaction authorization procedure in some embodiments of the DPO.
Figure 15B:
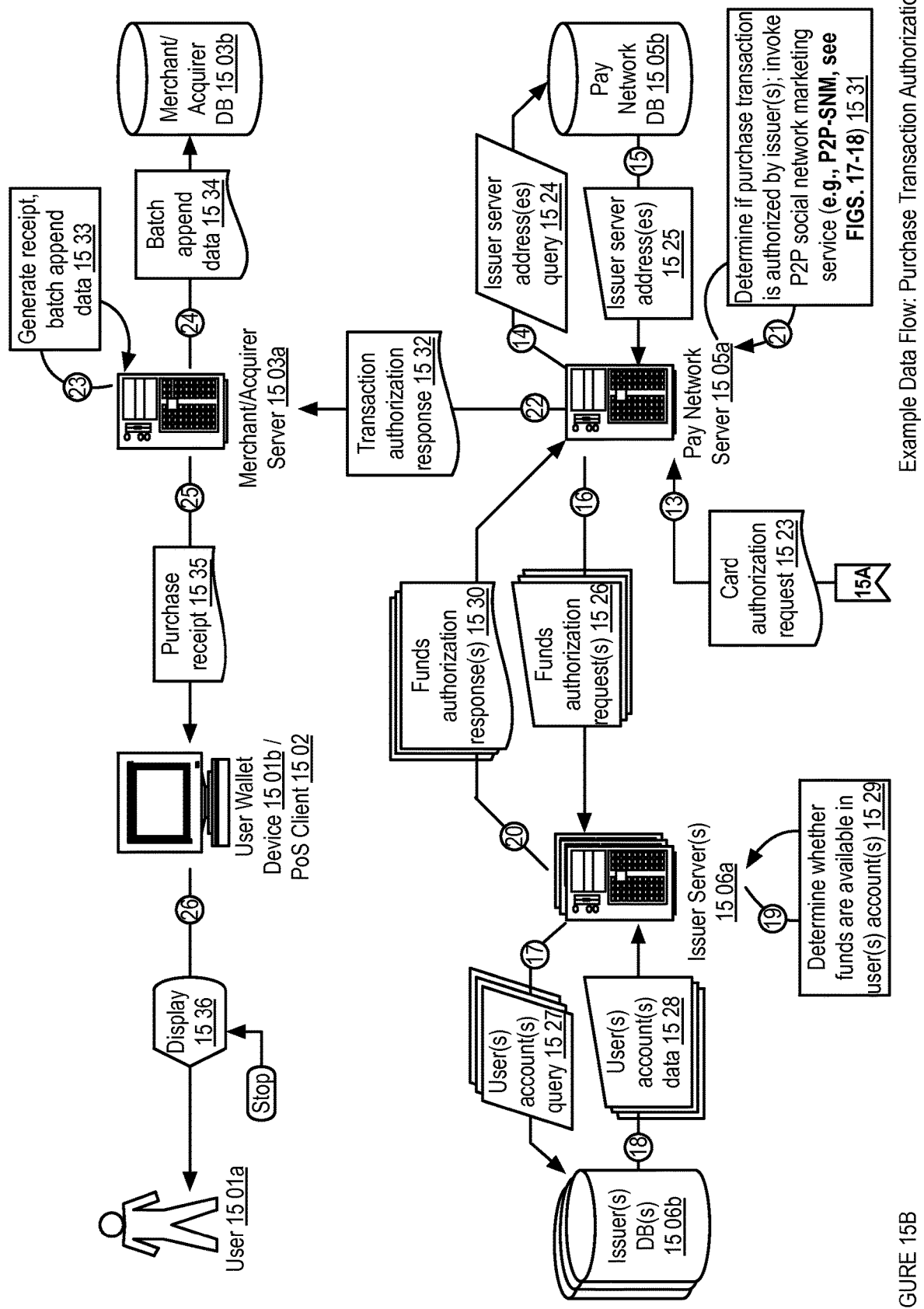

FIGS. 15A-B show data flow diagrams illustrating an example purchase transaction authorization procedure in some embodiments of the DPO. With reference to FIG. 15A, in some embodiments, a user, e.g., 1501*a*, may wish to utilize a virtual wallet account to purchase a product, service, offering, and/or the like ("product"), from a merchant via a merchant online site or in the merchant's store. The user may utilize a physical card, or a user wallet device, e.g., 1501*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 1511, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 1514, to a point-of-sale ("PoS") client, e.g., 1502. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 1514, track 1 data from the user's plastic card (e.g., credit card, debit card, prepaid card, charge card, etc.), such as the example track 1 data provided below:

TABLE-US-00014

%B123456789012345{circumflex over ( )}PUBLIC/J.Q.{circumflex over ( )}99011200000000000000901* ***?* (wherein `123456789012345` is the card number of `J.Q. Public ` and has a CVV number of 901. `990112 ` is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 1514, substantially in the form of XML-formatted data, is provided below:

TABLE-US-00015

```
<?XML version = "1.0" encoding = "UTF-8"?>
<transaction_authorization_input> <payment_data> <account>
<charge_priority>1</charge_priority> <charge_ratio>40%</charge_ratio>
<account_number>123456789012345 </account_number> <account_name>John Q.
Public</account_name> <bill_add>987 Green St #456, Chicago, IL 94652 </bill_add>
<ship_add>987 Green St #456, Chicago, IL 94652 </ship_add> <CVV>123</CVV>
</account> <account> <charge_priority>1</charge_priority>
<charge_ratio>60%</charge_ratio> <account_number>234567890123456
</account_number> <account_name>John Q. Public</account_name> <bill_add>987
Green St #456, Chicago, IL 94652 </bill_add> <ship_add>987 Green St #456, Chicago,
IL 94652 </ship_add> <CVV>173</CVV> </account> <account>
<charge_priority>2</charge_priority> <charge_ratio>100%</charge_ratio>
<account_number>345678901234567 </account_number> <account_name>John Q.
Public</account_name> <bill_add>987 Green St #456, Chicago, IL 94652 </bill_add>
<ship_add>987 Green St #456, Chicago, IL 94652 </ship_add> <CVV>695</CVV>
</account> </payment_data> <!--optional data--> <timestamp>2011-02-22
15:22:43</timestamp> <expiry_lapse>00:00:30</expiry_lapse>
<secure_key>04453290705986234879565433322</secure_key>
<alerts_track_flag>TRUE</alerts_track_flag> <wallet_device_details>
<device_IP>192.168.23.126</client_IP> <device_type>smartphone</client_type>
<device_model>HTC Hero</client_model> <OS>Android 2.2</OS>
<wallet_app_installed_flag>true </wallet_app_installed_flag> </wallet_device_details>
</transaction_authorization_input>
```

In some embodiments, the PoS client may generate a card authorization request, e.g., 1515, using the obtained transaction authorization input from the user wallet device, and/or product/checkout data (see, e.g., FIG. 9, 915-917). An example listing of a card authorization request 1515, substantially in the form of a HTTP(S) POST message including XML-formatted data, is provided below:

TABLE-US-00016

```
POST /authorizationrequests.php HTTP/1.1 Host: www.acquirer.com
Content-Type: Application/XML Content-Length: 1306 <?XML version = "1.0" encoding
= "UTF-8"?> <card_authorization_request> <session_ID>4NFU4RG94</order_ID>
<timestamp>2011-02-22 15:22:43</timestamp> <expiry>00:00:30</expiry>
<alerts_URL>www.merchant.com/shopcarts.php?sessionID= AEBB4356</alerts_URL>
<!--optional data--> <user_ID>john.q.public@gmail.com</user_ID> <PoS_details>
<PoS_IP>192.168.23.126</client_IP> <PoS_type>smartphone</client_type>
<PoS_model>HTC Hero</client_model> <OS>Android 2.2</OS>
<app_installed_flag>true</app_installed_flag> </PoS_details> <purchase_details>
<num_products>1</num_products> <product> <product_type>book</product_type>
<product_params> <product_title>XML for dummies</product_title> <ISBN>938-2-14-
168710-0</ISBN> <edition>2nd ed.</edition> <cover>hardbound</cover>
<seller>bestbuybooks</seller> </product_params> <quantity>1</quantity> </product>
</purchase_details> <merchant_params> <merchant_id>3FBCR4INC</merchant_id>
<merchant_name>Books & Things, Inc.</merchant_name>
<merchant_auth_key>1NNF484MCP59CHB27365 </merchant_auth_key>
</merchant_params> <account_params> <account_name>John Q.
Public</account_name> <account_type>credit</account_type>
<account_num>123456789012345</account_num> <billing_address>123 Green St.,
Norman, OK 98765 </billing_address> <phone>123-456-7809</phone>
<sign>/jqp/</sign> <confirm_type>email</confirm_type>
<contact_info>john.q.public@gmail.com</contact_info> </account_params>
<shipping_info> <shipping_adress>same as billing</shipping_address>
<ship_type>expedited</ship_type> <ship_carrier>FedEx</ship_carrier>
<ship_account>123-45-678</ship_account> <tracking_flag>true</tracking_flag>
<sign_flag>false</sign_flag> </shipping_info> </card_authorization_request>
```

In some implementations, the card authorization request generated by the PoS client may include a minimum of information required to process the purchase transaction. For example, this may improve the efficiency of communicating the purchase transaction request, and may also advantageously improve the privacy protections provided to the user and/or merchant. For example, in some implementations, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 1516. The merchant server may forward the card authorization request to a MaaS server, e.g., 1504*a*, for routing the card authorization request to the appropriate payment network for payment processing. For example, the MaaS server may be able to select from payment networks, such as Visa, MasterCard, American Express, Paypal, etc., to process various types of transactions including, but not limited to: credit card, debit card, prepaid card, B2B and/or like transactions. In some embodiments, the merchant server may query a database, e.g., merchant/acquirer database 1503*b*, for a network address of the payment gateway server, for example by using a portion of a user payment card number, or a user ID (such as an email address) as a keyword for the database query. For example, the merchant server may issue PHP/SQL commands to query a database table (such as FIG.

23, Pay Gateways 2319h) for a URL of the MaaS server. An example payment gateway address query 1517, substantially in the form of PHP/SQL commands, is provided below:

TABLE-US-00017

```
<?PHP header(`Content-Type: text/plain`);
mysql_connect("254.93.179.112",$DBserver,$password); // access database server
mysql_select_db("DPO_DB.SQL"); // select database table to search //create query
$query = "SELECT paygate_id paygate_address paygate_URL paygate_name FROM
PayGatewayTable WHERE card_num LIKE `%` $cardnum"; $result =
mysql_query($query); // perform the search query mysql_close("DPO_DB.SQL"); //
close database access ?>
```

In response, the merchant/acquirer database may provide the requested payment gateway address, e.g., 1518. The merchant server may forward the card authorization request to the MaaS server using the provided address. In some embodiments, upon receiving the card authorization request from the merchant server, the MaaS server may invoke a component to provide one or more service associated with purchase transaction authorization. For example, the MaaS server may invoke components for fraud prevention (see e.g., FIG. 2, risk management 206b; VerifyChat, FIG. 3E), loyalty and/or rewards, and/or other services for which the user-merchant combination is authorized. The MaaS server may forward the card authorization request to a pay network server, e.g., 1935a, for payment processing. For example, the MaaS server may be able to select from payment networks, such as Visa, MasterCard, American Express, Paypal, etc., to process various types of transactions including, but not limited to: credit card, debit card, prepaid card, B2B and/or like transactions. In some embodiments, the MaaS server may query a database, e.g., MaaS database 1504b, for a network address of the payment network server, for example by using a portion of a user payment card number, or a user ID (such as an email address) as a keyword for the database query. For example, the MaaS server may issue PHP/SQL commands to query a database table (such as FIG. 23, Pay Gateways 2319h) for a URL of the pay network server. An example payment network address query 1521, substantially in the form of PHP/SQL commands, is provided below:

TABLE-US-00018

```
<?PHP header(`Content-Type: text/plain`);
mysql_connect("254.93.179.112",$DBserver,$password); // access database server
mysql_select_db("DPO_DB.SQL"); // select database table to search //create query
$query = "SELECT payNET_id payNET_address payNET_URL payNET_name FROM
PayGatewayTable WHERE card_num LIKE `%` $cardnum"; $result =
mysql_query($query); // perform the search query mysql_close("DPO_DB.SQL"); //
close database access ?>
```

In response, the payment gateway database may provide the requested payment network address, e.g., 1522. The MaaS server may forward the card authorization request to the pay network server using the provided address, e.g., 1523.

With reference to FIG. 15B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

Figure 23:
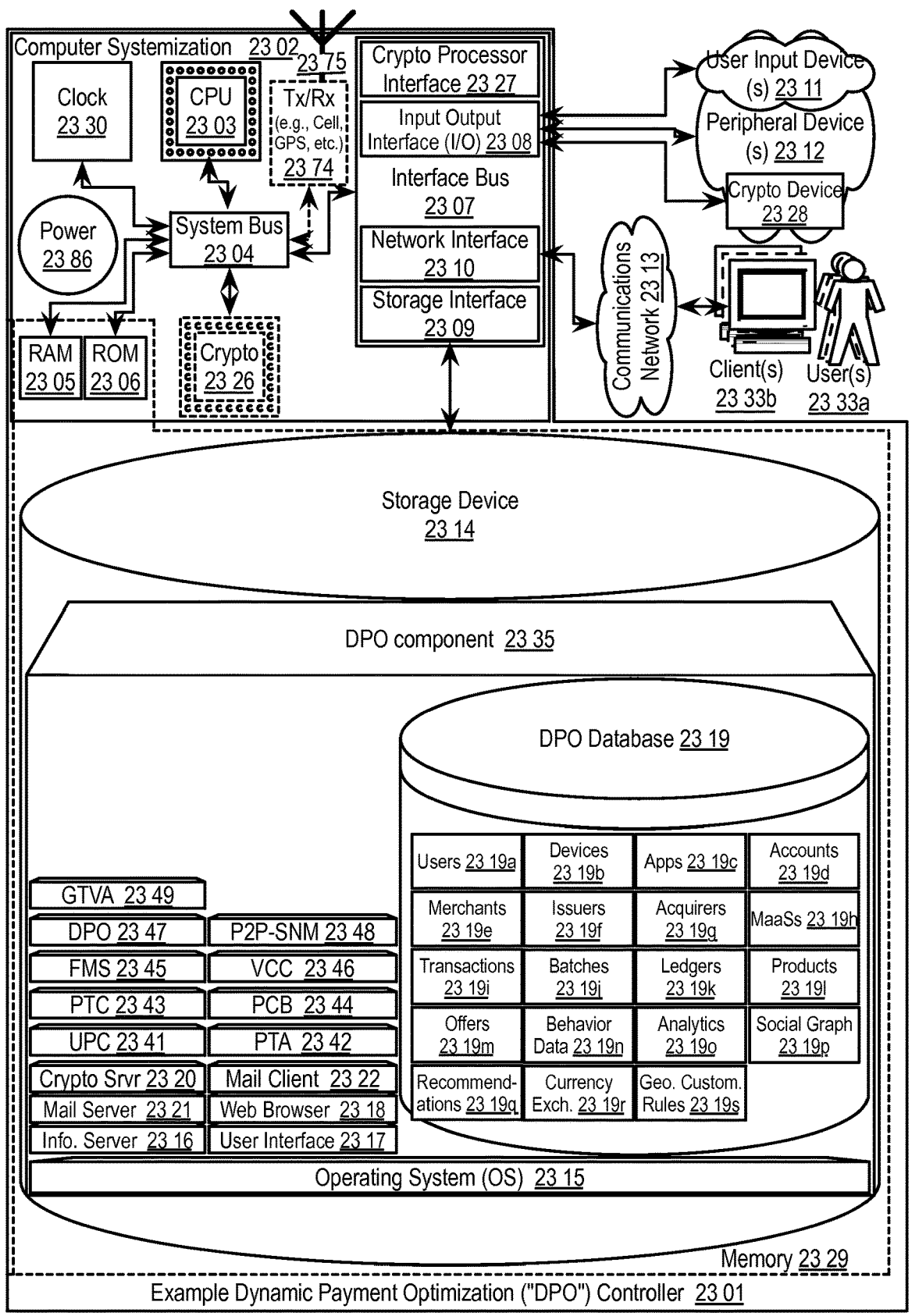
FIG. 23 shows a block diagram illustrating embodiments of a DPO controller.

In some embodiments, the pay network server may generate a query, e.g., 1524, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 1506a, of the issuer(s) may maintain details of the user's account(s). In some embodiments, a database, e.g., pay network database 1505b, may store details of the issuer server(s) associated with the issuer(s). In some embodiments, the pay network server may query a database, e.g., pay network database 1505b, for a network address of the issuer(s) server(s), for example by using a portion of a user payment card number, or a user ID (such as an email address) as a keyword for the database query. For example, the merchant server may issue PHP/SQL commands to query a database table (such as FIG. 23, Issuers 2319f) for network address(es) of the issuer(s) server(s). An example issuer server address(es) query 1524, substantially in the form of PHP/SQL commands, is provided below:

TABLE-US-00019

```
<?PHP header(`Content-Type: text/plain`);
mysql_connect("254.93.179.112",$DBserver,$password); // access database server
mysql_select_db("DPO_DB.SQL"); // select database table to search //create query
$query = "SELECT issuer_id issuer_address issuer_URL issuer_name FROM
IssuersTable WHERE card_num LIKE `%` $cardnum"; $result = mysql_query($query);
// perform the search query mysql_close("DPO_DB.SQL"); // close database access ?>
```

In response to obtaining the issuer server query, e.g., 1524, the pay network database may provide, e.g., 1525, the requested issuer server data to the pay network server. In some embodiments, the pay network server may utilize the issuer server data to generate funds authorization request(s), e.g., 1526, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 1526, substantially in the form of a HTTP(S) POST message including XML-formatted data, is provided below:

TABLE-US-00020

POST /fundsauthorizationrequest.php HTTP/1.1 Host:
www.issuer.com Content-Type: Application/XML Content-Length: 624 <?XML version =
"1.0" encoding = "UTF-8"?> <funds_authorization_request>
<query_ID>VNEI39FK</query_ID> <timestamp>2011-02-22 15:22:44</timestamp>
<transaction_cost>$22.61</transaction_cost> <account_params>
<account_type>checking</account_type>
<account_num>1234567890123456</account_num> </account_params> <!--optional
parameters--> <purchase_summary> <num_products>1</num_products> <product>
<product_summary>Book - XML for dummies </product_summary>
<product_quantity>1</product_quantity? </product> </purchase_summary>
<merchant_params> <merchant_id>3FBCR4INC</merchant_id>
<merchant_name>Books & Things, Inc.</merchant_name>
<merchant_auth_key>1NNF484MCP59CHB27365 </merchant_auth_key>
</merchant_params> </funds_authorization_request>

In some embodiments, an issuer server may parse the authorization request(s), and based on the request details may query a database, e.g., user profile database 1506b, for data associated with an account linked to the user. For example, the merchant server may issue PHP/SQL commands to query a database table (such as FIG. 23, Accounts 2319d) for user account(s) data. An example user account(s) query 1527, substantially in the form of PHP/SQL commands, is provided below:

TABLE-US-00021

<?PHP <?PHP header(`Content-Type: text/plain`);
mysql_connect("254.93.179.112",$DBserver,$password); // access database server
mysql_select_db("DPO_DB.SQL"); // select database table to search //create query
$query = "SELECT issuer user_id user_name user_balance account_type FROM
AccountsTable WHERE account_num LIKE `%` $accountnum"; $result =
mysql_query($query); // perform the search query mysql_close("DPO_DB.SQL"); //
close database access ?>

In some embodiments, on obtaining the user account(s) data, e.g., 1528, the issuer server may determine whether the user can pay for the transaction using funds available in the account, 1529. For example, the issuer server may determine whether the user has a sufficient balance remaining in the account, sufficient credit associated with the account, and/or the like. Based on the determination, the issuer server(s) may provide a funds authorization response, e.g., 1530, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

Figure 17A:
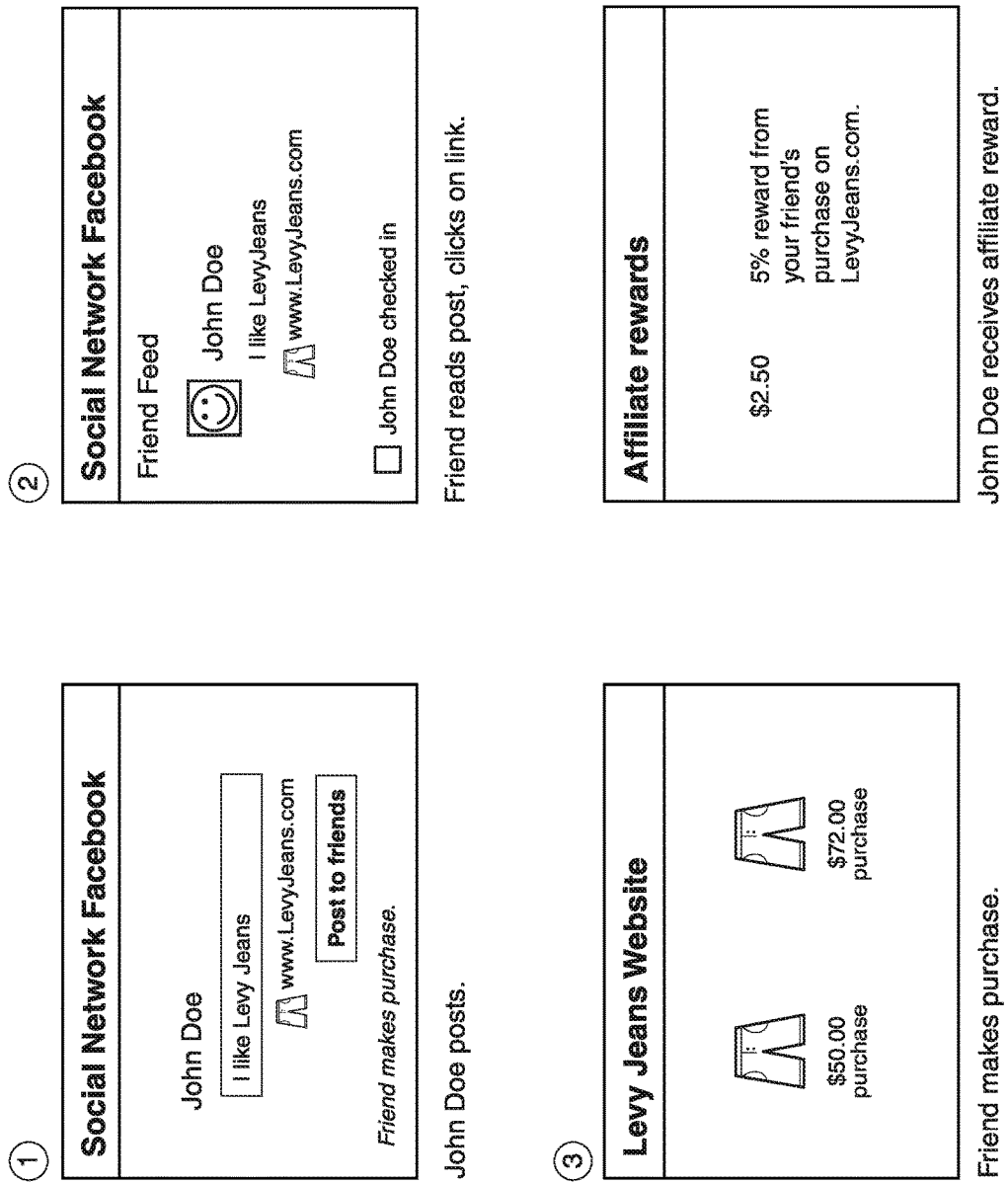
Figure 17B:
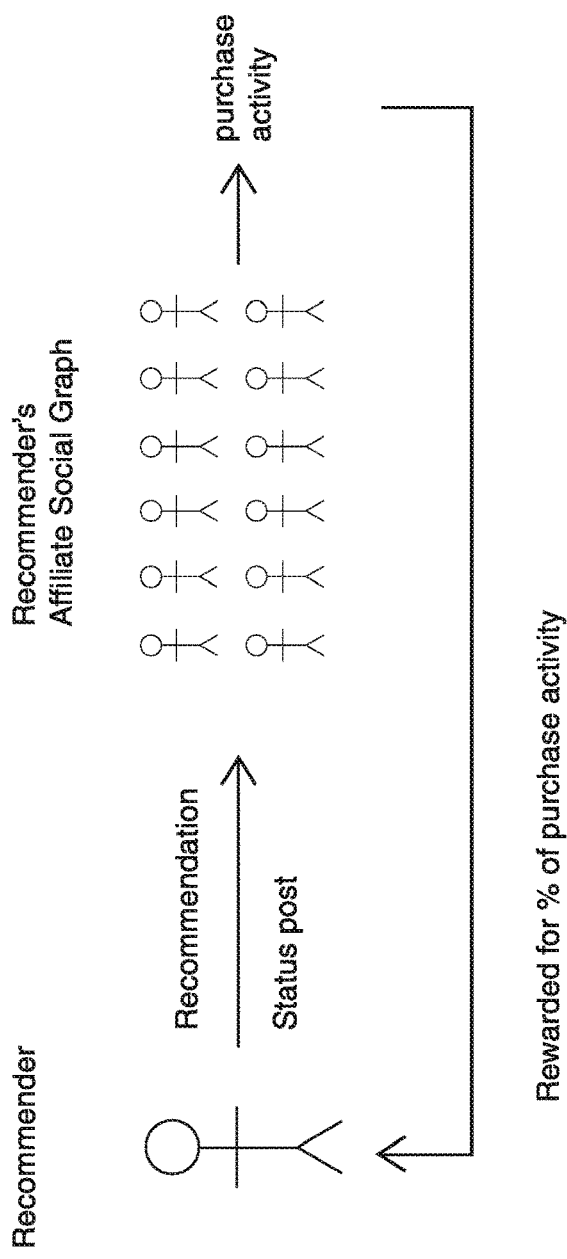

In some embodiments, the pay network server may obtain the funds authorization response including a notification of successful authorization, and parse the message to extract authorization details. Upon determining that the user possesses sufficient funds for the transaction, the pay network server may invoke a component to provide value-add services for the user, e.g., 1531. For example, the pay network server may invoke a P2P social network marketing component to post a notification of the user's successful purchase of the product to a social profile of the user hosted by a social networking service. As another example, the pay network server may invoke the P2P social network marketing component to reward a different user whose social post via a social networking service caused the user to engage in the purchase transaction. For example, the pay network server may invoke the example P2P social network marketing component discussed below with reference to FIGS. 17-18. In some embodiments, the pay network server may also generate a transaction data record from the authorization request and/or authorization response, and store the details of the transaction and authorization relating to the transaction in a transactions database. For example, the pay network server may issue PHP/SQL commands to store the data to a database table (such as FIG. 23, Transactions 2319i). An example transaction store command, substantially in the form of PHP/SQL commands, is provided below:

TABLE-US-00022

```
<?PHP header('Content-Type: text/plain');
mysql_connect("254.92.185.103",$DBserver,$password); // access database server
mysql_select("DPO_DB.SQL"); // select database to append mysql_query("INSERT
INTO TransactionsTable (PurchasesTable (timestamp, purchase_summary_list,
num_products, product_summary, product_quantity, transaction_cost,
account_params_list, account_name, account_type, account_num, billing_addres,
zipcode, phone, sign, merchant_params_list, merchant_id, merchant_name,
merchant_auth_key) VALUES (time( ), $purchase_summary_list, $num_products,
$product_summary, $product_quantity, $transaction_cost, $account_params_list,
$account_name, $account_type, $account_num, $billing_addres, $zipcode, $phone,
$sign, $merchant_params_list, $merchant_id, $merchant_name,
$merchant_auth_key)"); // add data to table in database mysql_close("DPO_DB.SQL");
// close connection to database ?>
```

In some embodiments, the pay network server may forward a transaction authorization response, e.g., 1532, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1533, and store the XML data file, e.g., 1534, in a database, e.g., merchant database 404. For example, a batch XML data file may be structured similar to the example XML data structure template provided below:

TABLE-US-00023

```
<?XML version = "1.0" encoding = "UTF-8"?> <merchant_data>
<merchant_id>3FBCR4INC</merchant_id> <merchant_name>Books & Things,
Inc.</merchant_name> <merchant_auth_key>1NNF484MCP59CHB27365
</merchant_auth_key> <account_number>123456789</account_number>
</merchant_data> <transaction_data> <transaction 1> ... </transaction 1> <transaction
2> ... </transaction 2> . . . <transaction n> ... </transaction n> </transaction_data>
```

In some embodiments, the server may also generate a purchase receipt, e.g., 1533, and provide the purchase receipt to the client, e.g., 1535. The client may render and display, e.g., 1536, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 16A:
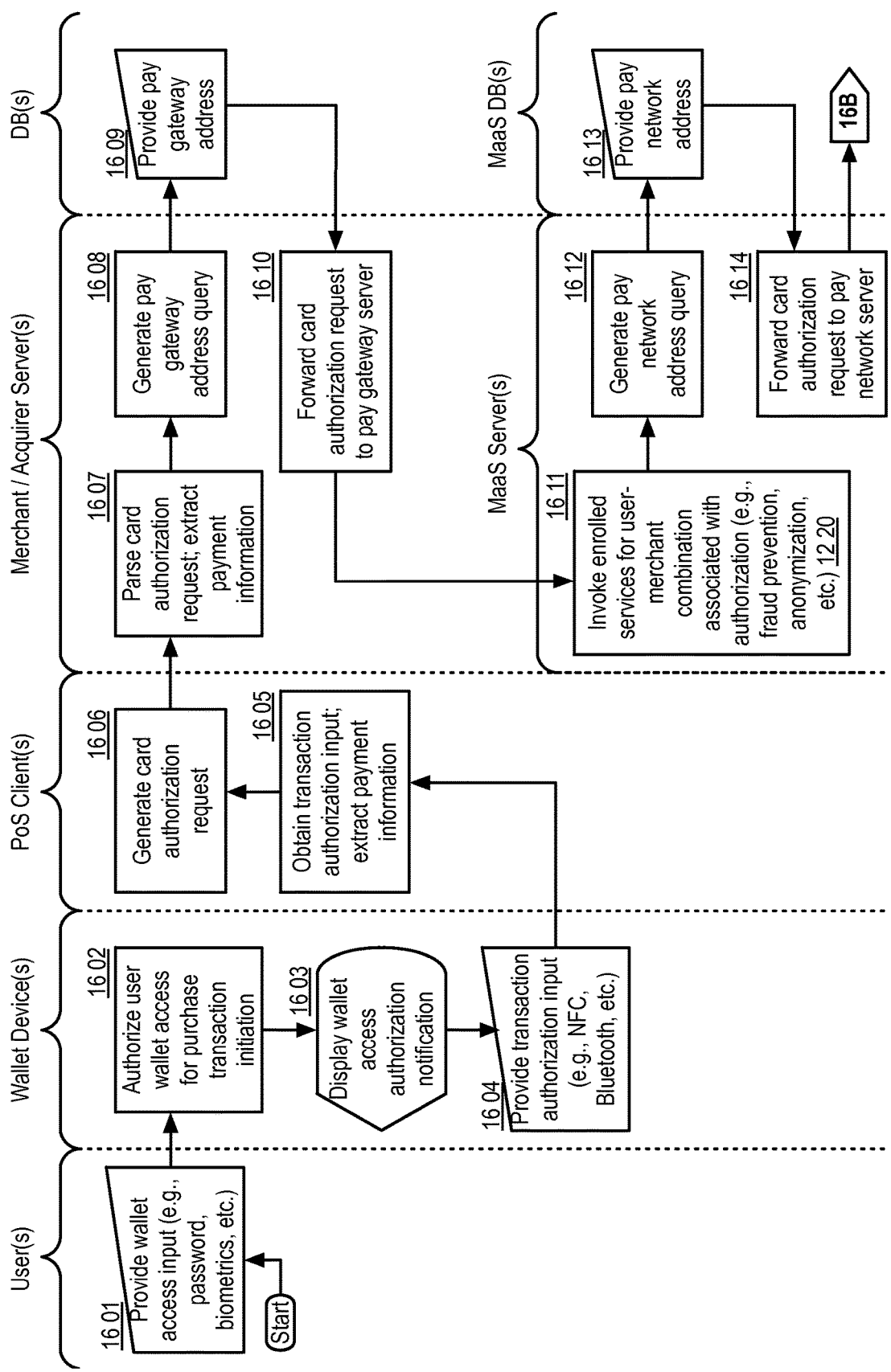
FIGS. 16A-B show logic flow diagrams illustrating example aspects of purchase transaction authorization in some embodiments of the DPO, e.g., a Purchase Transaction Authorization ("PTA") component 1600.
Figure 16B:
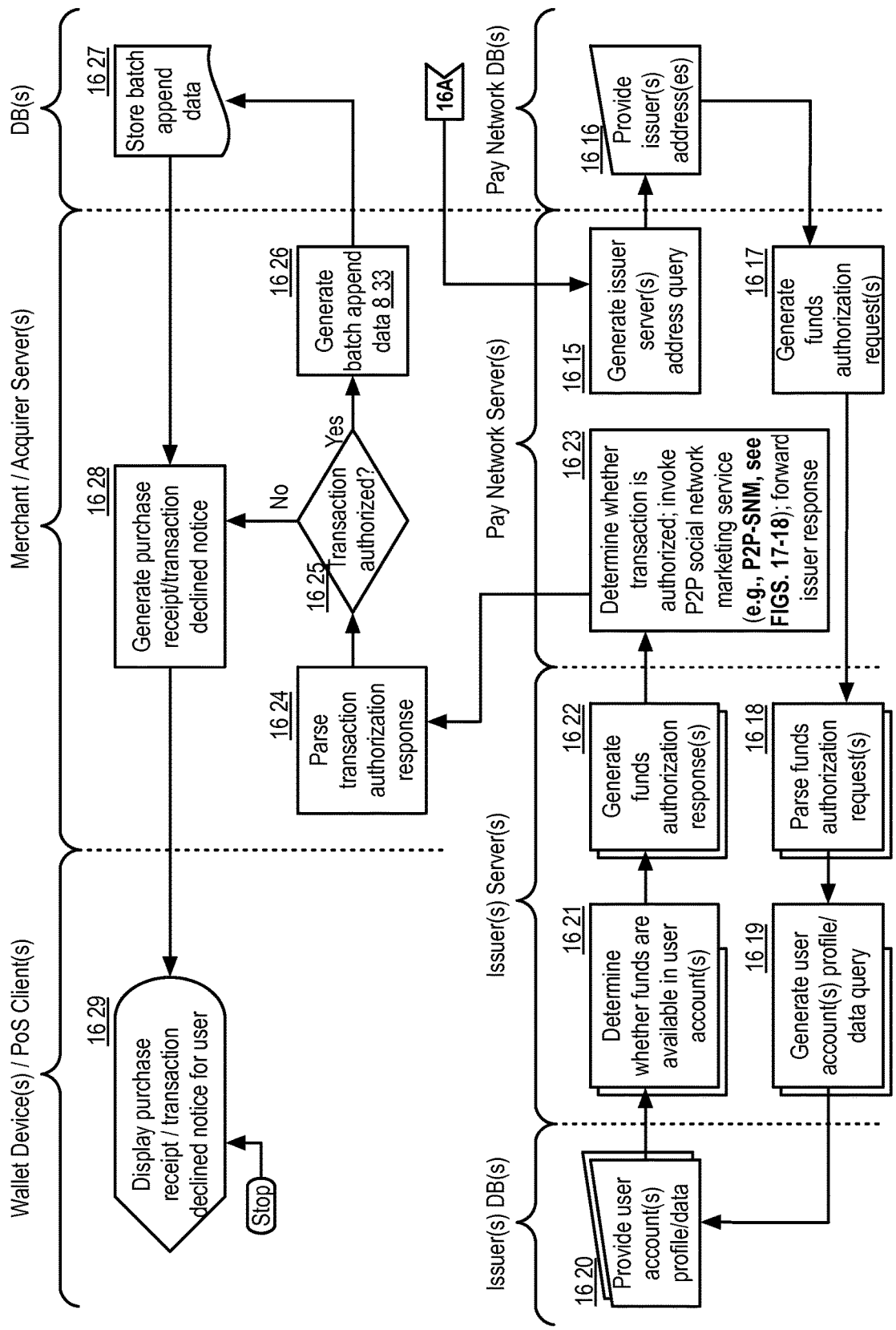

FIGS. 16A-B show logic flow diagrams illustrating example aspects of purchase transaction authorization in some embodiments of the DPO, e.g., a Purchase Transaction Authorization ("PTA") component 1600. With reference to FIG. 16A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 1601, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 1602-1603.

In some embodiments, upon authenticating the user for access to virtual wallet features, the user wallet device may provide a transaction authorization input, e.g., 1604, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 1605. For example, the PoS client may utilize a parser, such as the example parsers provided below in the discussion with reference to FIG. 23. The PoS client may generate a card authorization request, e.g., 1606, using the obtained transaction authorization input from the user wallet device, and/or product/checkout data (see, e.g., FIG. 9, 915-917).

In some embodiments, the PoS client may provide the generated card authorization request to the merchant server.

The merchant server may forward the card authorization request to a MaaS server, for routing the card authorization request to the appropriate payment network for payment processing. For example, the MaaS server may be able to select from payment networks, such as Visa, MasterCard, American Express, Paypal, etc., to process various types of transactions including, but not limited to: credit card, debit card, prepaid card, B2B and/or like transactions. In some embodiments, the merchant server may query a database, e.g., 1608, for a network address of the payment gateway server, for example by using a portion of a user payment card number, or a user ID (such as an email address) as a keyword for the database query. In response, the merchant/acquirer database may provide the requested payment gateway address, e.g., 1610. The merchant server may forward the card authorization request to the MaaS server using the provided address. In some embodiments, upon receiving the card authorization request from the merchant server, the MaaS server may invoke a component to provide one or more service associated with purchase transaction authorization. For example, the MaaS server may invoke components for fraud prevention (see e.g., FIG. 2, risk management 206*b*; VerifyChat, FIG. 3E), loyalty and/or rewards, and/or other services for which the user-merchant combination is authorized. The MaaS server may forward the card authorization request to a pay network server for payment processing, e.g., 1614. For example, the MaaS server may be able to select from payment networks, such as Visa, MasterCard, American Express, Paypal, etc., to process various types of transactions including, but not limited to: credit card, debit card, prepaid card, B2B and/or like transactions. In some embodiments, the MaaS server may query a database, e.g., 1612, for a network address of the payment network server, for example by using a portion of a user payment card number, or a user ID (such as an email address) as a keyword for the database query. In response, the payment gateway database may provide the requested payment network address, e.g., 1613. The MaaS server may forward the card authorization request to the pay network server using the provided address, e.g., 1614.

With reference to FIG. 16B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 1615, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 1615, for a network address of the issuer(s) server(s), for example by using a portion of a user payment card number, or a user ID (such as an email address) as a keyword for the database query.

In response to obtaining the issuer server query, the pay network database may provide, e.g., 1616, the requested issuer server data to the pay network server. In some embodiments, the pay network server may utilize the issuer server data to generate funds authorization request(s), e.g., 1617, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 1618, and based on the request details may query a database, e.g., 1619, for data associated with an account linked to the user.

In some embodiments, on obtaining the user account(s) data, e.g., 1620, the issuer server may determine whether the user can pay for the transaction using funds available in the account, e.g., 1621. For example, the issuer server may determine whether the user has a sufficient balance remaining in the account, sufficient credit associated with the account, and/or the like. Based on the determination, the issuer server(s) may provide a funds authorization response, e.g., 1622, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 1623, the pay network server may invoke a component to provide value-add services for the user, e.g., 1623. For example, the pay network server may invoke a P2P social network marketing component to post a notification of the user's successful purchase of the product to a social profile of the user hosted by a social networking service. As another example, the pay network server may invoke the P2P social network marketing component to reward a different user whose social post via a social networking service caused the user to engage in the purchase transaction. For example, the pay network server may invoke the example P2P social network marketing component discussed below with reference to FIGS. 17-18.

In some embodiments, the pay network server may forward a transaction authorization response to the user wallet device, PoS client, and/or merchant server. The merchant may parse, e.g., 1624, the transaction authorization response, and determine from it that the user possesses sufficient funds in the card account to conduct the transaction, e.g., 1625, option "Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1626, and store the XML data file, e.g., 1627, in a database. In some embodiments, the server may also generate a purchase receipt, e.g., 1628, and provide the purchase receipt to the client. The client may render and display, e.g., 1629, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

FIGS. 17A-D show block and data flow diagrams illustrating an example person-2-person social network marketing procedure in some embodiments of the DPO. In some embodiments, the DPO may facilitate rewarding individual users of a social network for any sales activity that might arise from them posting, commenting or communicating with their friends on a social network on their personal purchasing activities, preferences or tastes. For example, in some embodiments, the DPO may implement an Affiliate Tracking Server (referred to as Server) that may keep track of user's communications (posts, comments, update and the like) on a social network through integration to the social network server, API or platform. When a user updates his/her social network communications with a product or service that he/she bought or recommends, the Affiliate Server may track the update, and its associated vendor, advertiser or product link in the communication. The Affiliate Server may also track any user in the friend's network that clicks on that link. If any member from the social network who received or viewed the communication or from the users "social graph") clicks on the link and lands on the vendor, advertiser or product site, the Affiliate Server may credit the click-through to the user who created the original communication post. The Affiliate Server may, in some embodiments, place tracking pixels on the advertisers/brand/vendor site. The tracking pixel may send further details if the referred user did any purchase activity or browsing activity. The Affiliate Server may then attribute the credit related to the browsing of the site (click) or of the purchase (action) done by the referred user to the recommending user's (affiliate user's) account.

Thus, in some embodiments, there may be no need for the recommending user profile information to get communicated to the vendor by the Affiliate Server, thus ensuring the privacy of both the recommending user and the referred user. The "Affiliate Server" Rewards module may reward the recommending user on the successful click or action (sale) to the second user (referred user) resulting from the recommending user propagating the vendor offering to the second user, through his/her Social Network communication. The reward may include one or more items selected from a group including a cash value, one or more virtual currency based rewards, or products, offers or coupons. A description of a user interacting with the invention in an example scenario follows: A Facebook user joins the P2P Affiliate program and in so doing grants the Affiliate Server access to the users profile or social graph data. This access could be granted in the form of adding a Facebook Affiliate Application, or through the use of Facebook Connect on a website. The user is now incented to post to his/her social network about any products he/she finds appealing, or can endorse because such posts can not only inform his/her friends about his/her preferences, but can also lead to affiliate rewards if his/her friends decide to click on the posts. The user posts a link that he/she recently purchased a pair of Levy Jeans. This post gets communicated to hundreds of the user's friends through Facebook's friend feed. Ten users click on the link to browse the Levy Jean's Website. Two of the then users make a jeans purchase of $50 each. Levy has agreed to reward an affiliate with $0.50 for every user who browses their site and 5% of the sales price for any purchase. The Affiliate Server tracks the activity of the referred users on Levy's site and knows to reward the recommending user appropriately with $6.00 in this example. The Affiliate Server may take a percentage of all rewards as a service fee, or may receive a service fee from the merchants independently.

With reference to FIG. 17C, in some embodiments, a MaaS server or other entity or component within the DPO may obtain a trigger, e.g., 1711, to provide P2P social network marketing service (see, e.g., FIG. 15B, 1531). In some embodiments, the MaaS server may parse the obtained trigger for provide P2P social network marketing service, and extract transaction details from the trigger, e.g., 1714. For example, the pay network may extract fields such as, but not limited to: session ID, timestamp, alters URL, user ID, PoS client type and address, purchased products, product pricing, offers redeemed in the purchase, coupons utilized in the purchase, rewards provided due to the purchase, merchant name, URL to the product on the merchant website, and/or the like. In some embodiments, the MaaS server may generate a user social post request for a social networking service using the details of the purchase transactions extracted from the trigger and/or other communications (e.g., card authorization requests) associated with the trigger. For example, the MaaS server may query, e.g., 1712-1713, its own database (e.g., via PHP/SQL commands) to obtain a user ID of the user associated with the social networking service. Using the obtained user profile data 1713 from the MaaS database 1704b, the MaaS server may generate a user social post request, e.g., an API call, to the social networking server 1705a. For example, the MaaS server may utilize a HTTP(S) POST request message similar to the examples provided previously. As another example, the MaaS server may utilize an API provided by the social networking service. For example, the MaaS server may execute a PHP script to make a call to the social networking service's API. An example listing for a user social post request 1715, substantially in the form of PHP commands, is provided below:

TABLE-US-00024

```
<?PHP header('Content-Type: text/plain'); $attachment =
array('messages' => 'John just got a great deal at Merchant!...', 'name' => $title, 'link' =>
'http://merchant.com/' . $urlTitle, 'description' => 'Review:' . $review, 'picture' =>
$picLocal ); if(!($sendMessage = $facebook-
>api('/me/feed/','post',$attachment))){ $errors= error_get_last( ); echo "Facebook
publish error: ".$errors['type']; echo "<br />\n".$errors['message']; } ?>
```

In some embodiments, the social networking service may generate a user profile social post command, e.g., 1716, in response to obtaining the user social post request from the MaaS server. The social network server may provide a social post confirmation, e.g., 1717, in response, to the MaaS server.

With reference to FIG. 17D, in some embodiments, the MaaS server may attempt to identify the source of the recommendation leading to the product purchase by the user. For example, the MaaS server may parse all of the communications it received with regard to the purchase transaction (e.g., flexible monetization service requests, card authorization requests and/or the like) to identify a source for the recommendations. In some embodiments, the MaaS server may identify a social post of another user, e.g., user 2 1701*a*, as being part of the social search results that were presented to the user, which caused the user to engage in the purchase transaction (for example, the user performing the purchase transactions may have been in a similar situation to the user 701 in FIG. 7, and obtained a recommendation from user 2 1701*a* as part of the purchase catalog browsing display). For example, the MaaS server may determine whether a recommendation was from a social search result. The MaaS server may identify a user 2 associated with the social search result (e.g., a user 2 who posted the recommendation to the social network; a user on whose behalf the MaaS server generated a social post request, etc.), e.g., 1720. The MaaS server may determine a reward to provide for the user 2. For example, the reward may include a crediting of real currency, virtual currency, an additional of rewards points, loyalty points, providing additional offers, recommendations, providing additional posts to the social profile of the user 2 on other related offers and/or products that user 2 may be interested in purchasing, and/or other benefits for the user 2. In some embodiments, the MaaS server may provide the social marketing credit request to an issuer server hosting an account of the user 2, e.g., 1722. The issuer server may, in response, generate a user account credit command, e.g., 1723, to the issuer database, e.g., 1706*b*. In some embodiments, the issuer server may also provide a social marketing credit notification, e.g., 1724, to a device of the user 2, e.g., 1701*b*, which may display, e.g., 1725, the credit notification to the user 2.

Figure 18A:
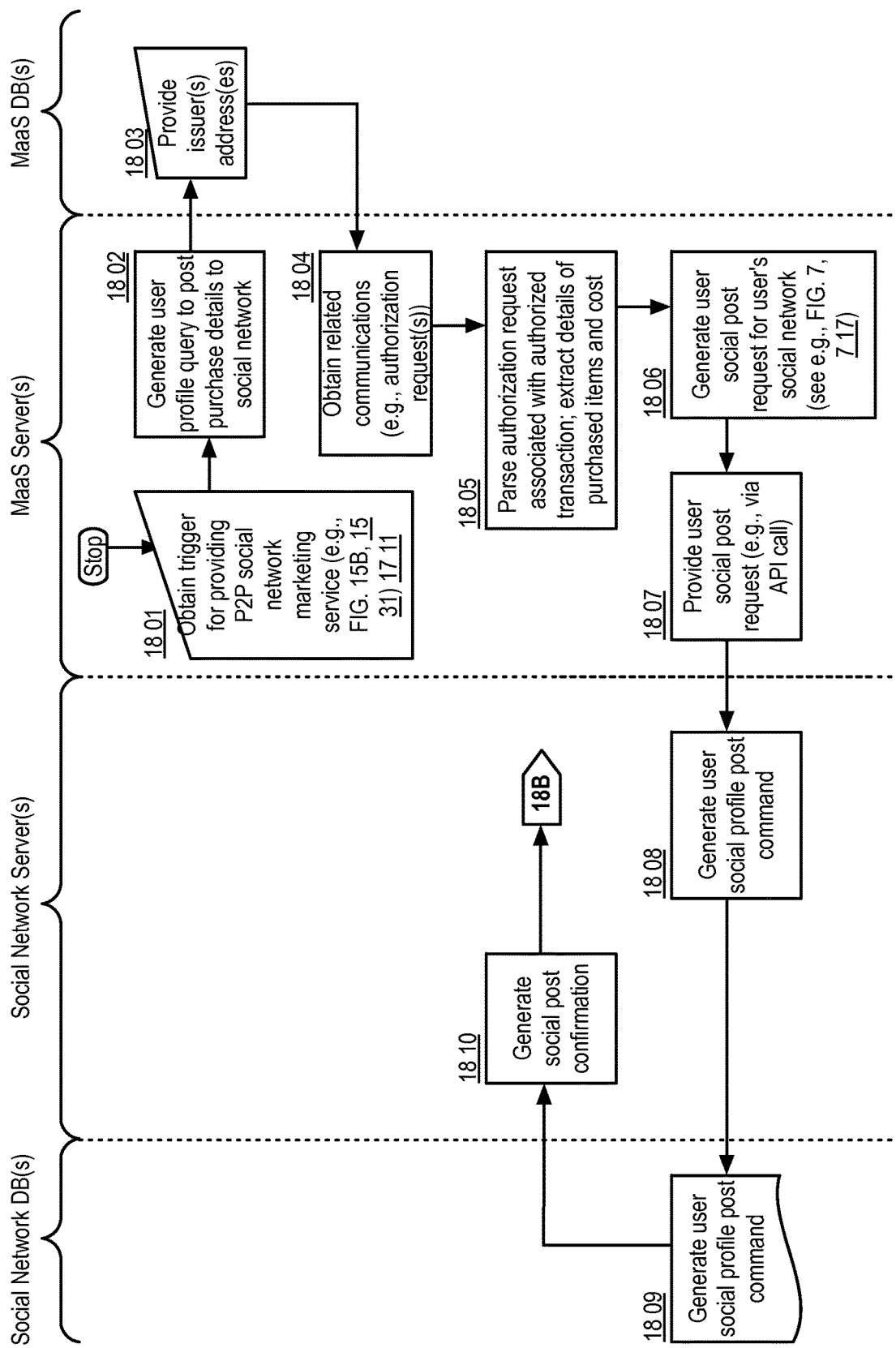
FIGS. 18A-B shows logic flow diagrams illustrating example aspects of person-2-person social network marketing in some embodiments of the DPO, e.g., a Person-2-Person (P2P) Social Network Marketing ("P2P-SNM") component 1800.
Figure 18B:
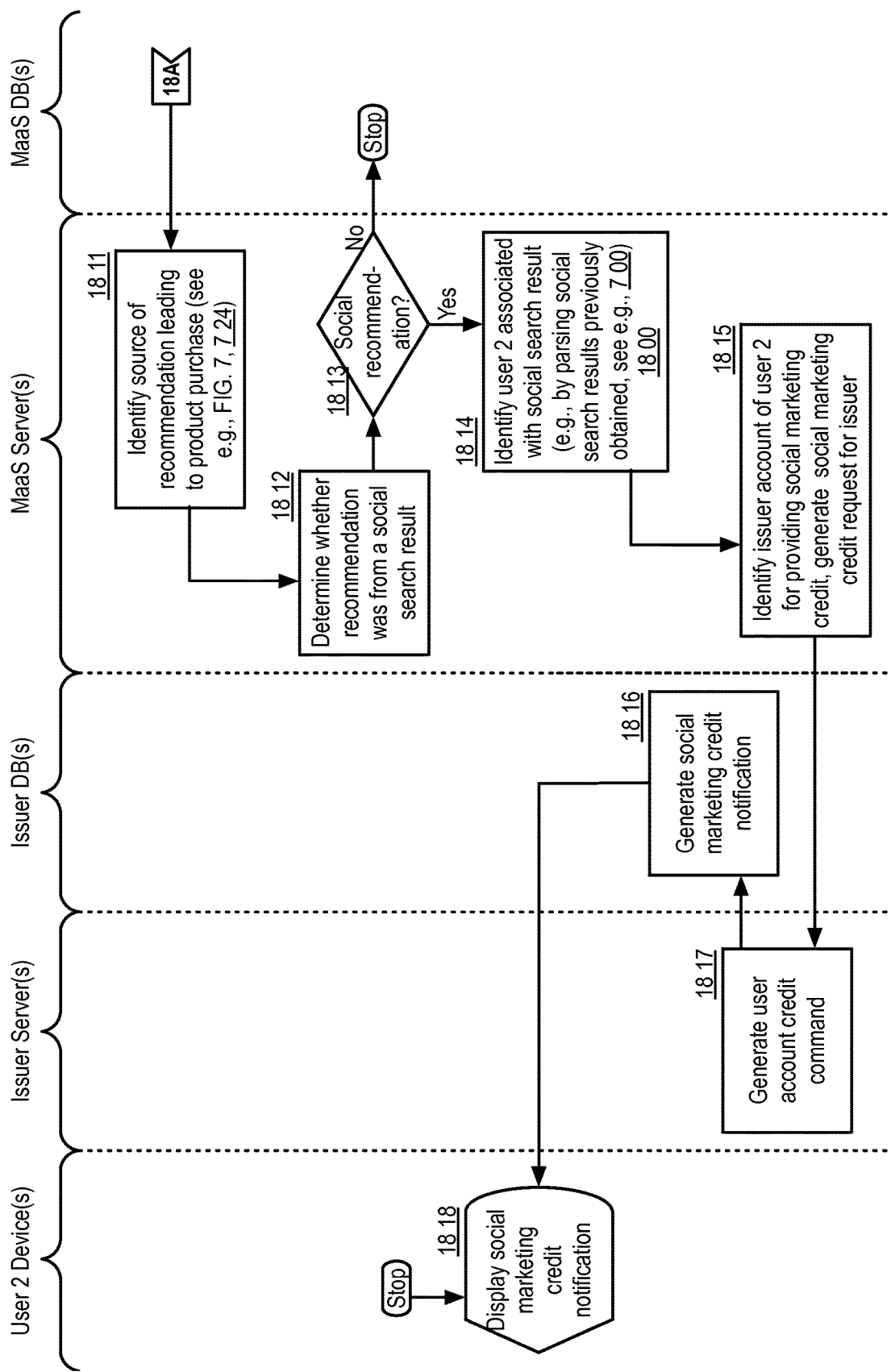

FIGS. 18A-B shows logic flow diagrams illustrating example aspects of person-2-person social network marketing in some embodiments of the DPO, e.g., a Person-2-Person (P2P) Social Network Marketing ("P2P-SNM") component 1800. In some embodiments, a MaaS server or other entity or component within the DPO may obtain a trigger, e.g., 1801, to provide P2P social network marketing service (see, e.g., a FIG. 15B, 1531). In some embodiments, the MaaS server may parse the obtained trigger for provide P2P social network marketing service, and extract transaction details from the trigger. For example, the pay network may extract fields such as, but not limited to: session ID, timestamp, alters URL, user ID, PoS client type and address, purchased products, product pricing, offers redeemed in the purchase, coupons utilized in the purchase, rewards provided due to the purchase, merchant name, URL to the product on the merchant website, and/or the like. In some embodiments, the MaaS server may generate a user social post request for a social networking service using the details of the purchase transactions extracted from the trigger and/or other communications (e.g., card authorization requests) associated with the trigger. For example, the MaaS server may query, e.g., 1802-1803, its own database (e.g., via PHP/SQL commands) to obtain a user ID of the user associated with the social networking service. Using the obtained user profile data, e.g., 1803, from the MaaS database, the MaaS server may generate a user social post request, e.g., an API call, to the social networking server 1805-1807. For example, the MaaS server may utilize a HTTP(S) POST request message similar to the examples provided previously. As another example, the MaaS server may utilize an API provided by the social networking service. In some embodiments, the social networking service may generate a user profile social post command, e.g., 1808, in response to obtaining the user social post request from the MaaS server. The social network server may provide a social post confirmation, e.g., 1810, in response, to the MaaS server.

With reference to FIG. 18B, in some embodiments, the MaaS server may attempt to identify the source of the recommendation leading to the product purchase by the user. For example, the MaaS server may parse all of the communications it received with regard to the purchase transaction (e.g., flexible monetization service requests, card authorization requests and/or the like) to identify a source for the recommendations. In some embodiments, the MaaS server may identify a social post of another user, e.g., user 2, as being part of the social search results that were presented to the user, which caused the user to engage in the purchase transaction (for example, the user performing the purchase transactions may have been in a similar situation to the user 701 in FIG. 7, and obtained a recommendation from user 2 1801*a* as part of the purchase catalog browsing display). For example, the MaaS server may determine, e.g., 1812, whether a recommendation was from a social search result. The MaaS server may identify a user 2 associated with the social search result (e.g., a user 2 who posted the recommendation to the social network; a user on whose behalf the MaaS server generated a social post request, etc.), e.g., 1814. The MaaS server may determine a reward to provide for the user 2. For example, the reward may include a crediting of real currency, virtual currency, an additional of rewards points, loyalty points, providing additional offers, recommendations, providing additional posts to the social profile of the user 2 on other related offers and/or products that user 2 may be interested in purchasing, and/or other benefits for the user 2. In some embodiments, the MaaS server may provide the social marketing credit request to an issuer server hosting an account of the user 2, e.g., 1815. The issuer server may, in response, generate a user account credit command, e.g., 1817, to the issuer database. In some embodiments, the issuer server may also provide a social marketing credit notification, e.g., 1816, to a device of the user 2, which may display, e.g., 1818, the credit notification to the user 2.

Figure 19A:
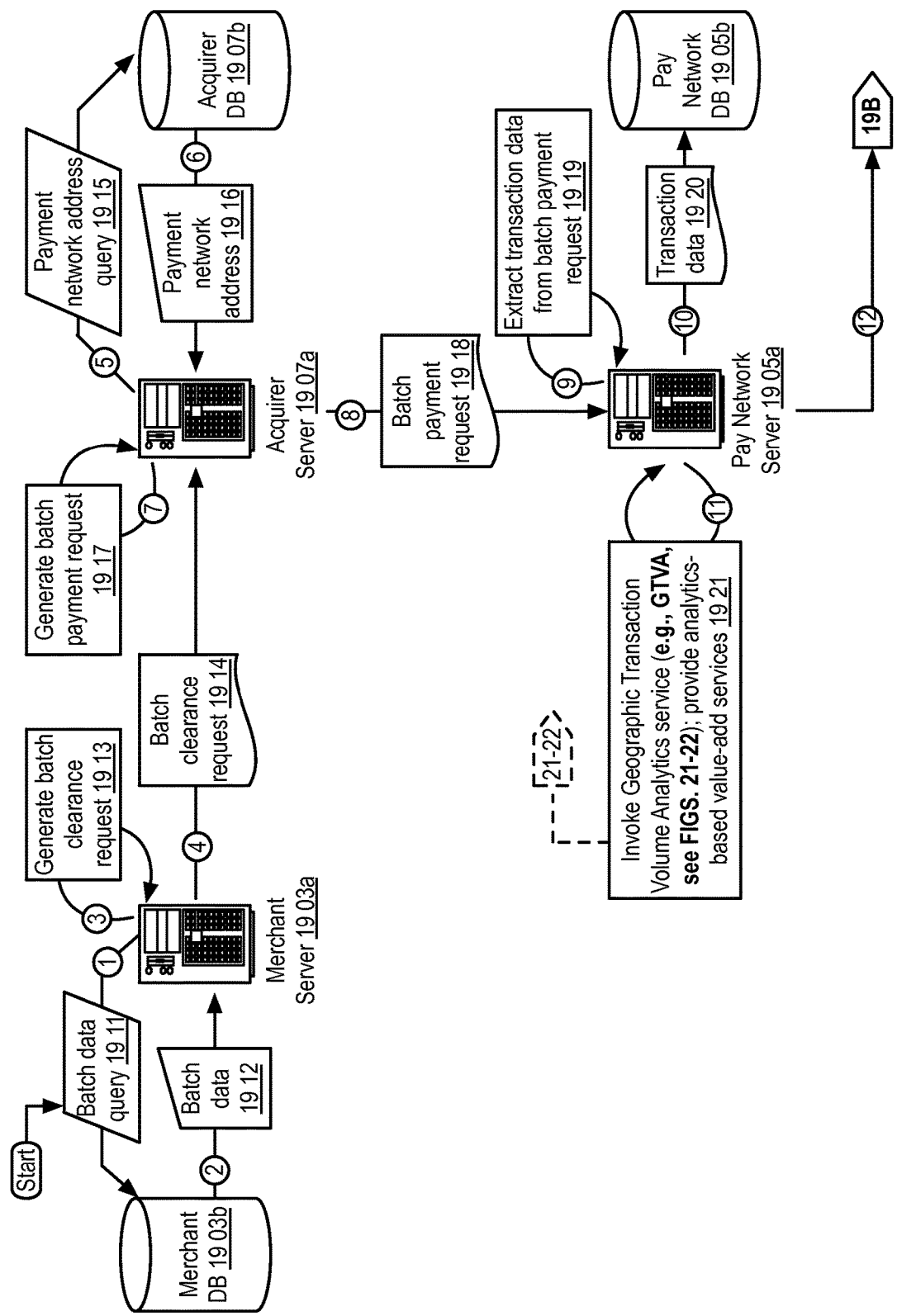
FIGS. 19A-B show data flow diagrams illustrating an example purchase transaction clearance procedure in some embodiments of the DPO.
Figure 19B:
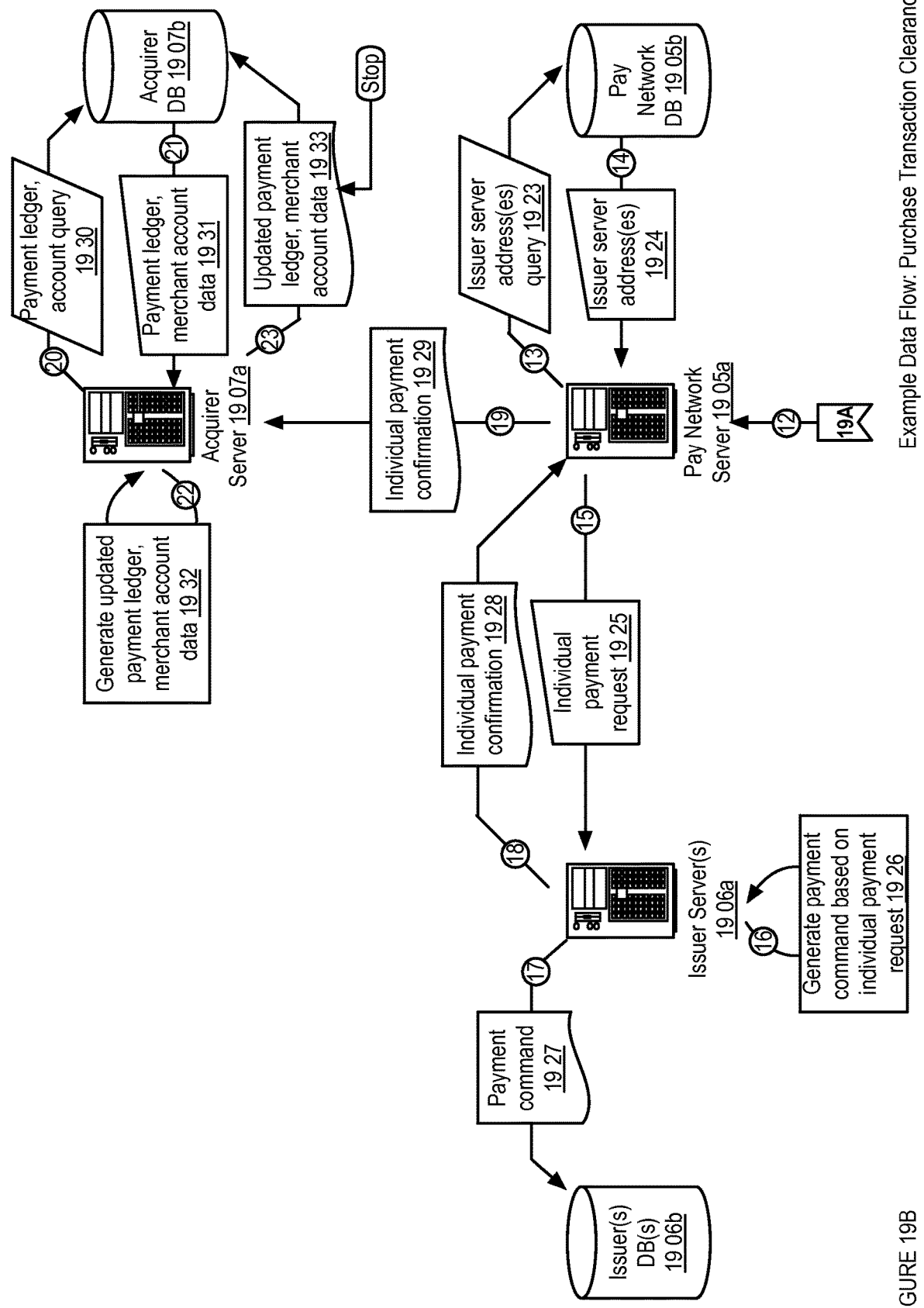

FIGS. 19A-B show data flow diagrams illustrating an example purchase transaction clearance procedure in some embodiments of the DPO. With reference to FIG. 19A, in some embodiments, a merchant server, e.g., 1903*a*, may initiate clearance of a batch of authorized transactions. For example, the merchant server may generate a batch data request, e.g., 1911, and provide the request, to a merchant database, e.g., 1903*b*. For example, the merchant server may utilize PHP/SQL commands similar to the examples provided above to query a relational database. In response to the batch data request, the database may provide the requested batch data, e.g., 1912. The server may generate a batch clearance request, e.g., 1913, using the batch data obtained from the database, and provide, e.g., 1914, the batch clearance request to an acquirer server, e.g., 1907*a*. For example, the merchant server may provide a HTTP(S) POST message including XML-formatted batch data in the message body for the acquirer server. The acquirer server may generate, e.g., 1915, a batch payment request using the obtained batch clearance request, and provide, e.g., 1918, the batch payment request to the pay network server, e.g., 1905*a*. The pay network server may parse the batch payment request, and extract the transaction data for each transaction stored in the batch payment request, e.g., 1919. The pay network server may store the transaction data, e.g., 1920, for each transaction in a database, e.g., pay network database 1905*b*. In some embodiments, the pay network server may invoke a component to provide analytics based on the transactions of the merchant for whom purchase transaction are being cleared. For example, the pay network server may invoke a geographic transaction volume analytics component, such as the example component discussed below with reference to FIGS. 21-22. Thus, in some embodiments, the pay network server may provide analytics-based value-added services for the merchant and/or the merchant's users.

With reference to FIG. 19B, in some embodiments, for each extracted transaction, the pay network server may query, e.g., 1923, a database, e.g., pay network database 1905b, for an address of an issuer server. For example, the pay network server may utilize PHP/SQL commands similar to the examples provided above. The pay network server may generate an individual payment request, e.g., 1925, for each transaction for which it has extracted transaction data, and provide the individual payment request, e.g., 1925, to the issuer server, e.g., 1906a. For example, the pay network server may provide an individual payment request to the issuer server(s) as a HTTP(S) POST message including XML-formatted data. An example listing of an individual payment request 1925, substantially in the form of a HTTP(S) POST message including XML-formatted data, is provided below:

TABLE-US-00025

POST /paymentrequest.php HTTP/1.1 Host: www.issuer.com
Content-Type: Application/XML Content-Length: 788 <?XML version = "1.0" encoding = "UTF-8"?> <pay_request> <request_ID>CNI4ICNW2</request_ID> <timestamp>2011-02-22 17:00:01</timestamp> <pay_amount>$34.78</pay_amount> <account_params>
<account_name>John Q. Public</account_name>
<account_type>credit</account_type>
<account_num>123456789012345</account_num> <billing_address>123 Green St., Norman, OK 98765 </billing_address> <phone>123-456-7809</phone>
<sign>/jqp/</sign> </account_params> <merchant_params>
<merchant_id>3FBCR4INC</merchant_id> <merchant_name>Books & Things, Inc.</merchant_name> <merchant_auth_key>1NNF484MCP59CHB27365
</merchant_auth_key> </merchant_params> <purchase_summary>
<num_products>1</num_products> <product> <product_summary>Book - XML for dummies </product_summary> <product_quantity>1</product_quantity? </product>
</purchase_summary> </pay_request>

In some embodiments, the issuer server may generate a payment command, e.g., 1927. For example, the issuer server may issue a command to deduct funds from the user's account (or add a charge to the user's credit card account). The issuer server may issue a payment command, e.g., 1927, to a database storing the user's account information, e.g., user profile database 1906b. The issuer server may provide an individual payment confirmation, e.g., 1928, to the pay network server, which may forward, e.g., 1929, the funds transfer message to the acquirer server. An example listing of an individual payment confirmation 1928, substantially in the form of a HTTP(S) POST message including XML-formatted data, is provided below:

TABLE-US-00026

POST /clearance.php HTTP/1.1 Host: www.acquirer.com Content-Type: Application/XML Content-Length: 206 <?XML version = "1.0" encoding = "UTF-8"?> <deposit_ack> <request_ID>CNI4ICNW2</request_ID>
<clear_flag>true</clear_flag> <timestamp>2011-02-22 17:00:02</timestamp>
<deposit_amount>$34.78</deposit_amount> </deposit_ack>

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 1930, an acquirer database 1907b for payment ledger and/or merchant account data, e.g., 1931. The acquirer server may utilize payment ledger and/or merchant account data from the acquirer database, along with the individual payment confirmation, to generate updated payment ledger and/or merchant account data, e.g., 1932. The acquirer server may then store, e.g., 1933, the updated payment ledger and/or merchant account data to the acquire database.

Figure 20A:
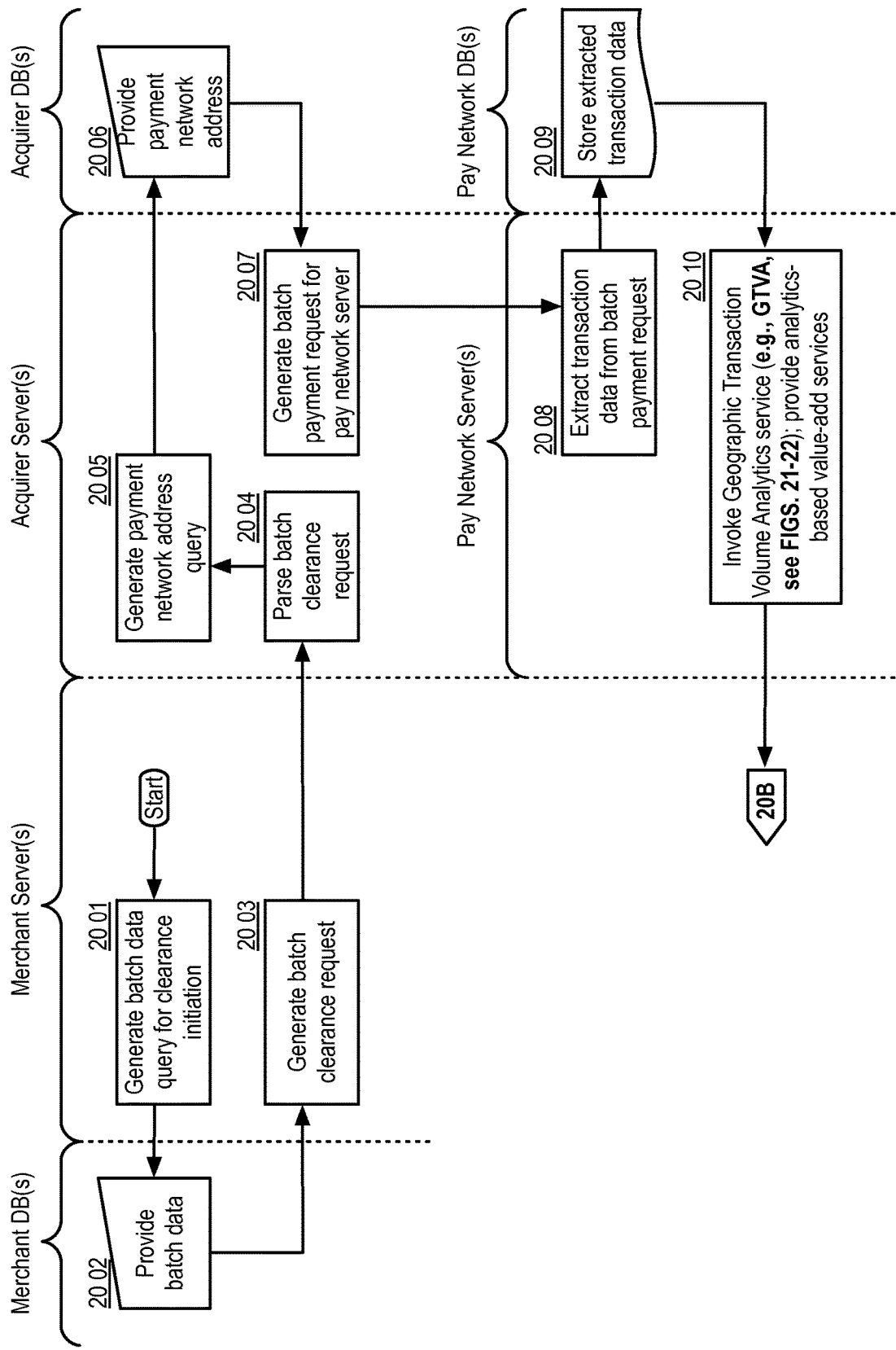
FIGS. 20A-B show logic flow diagrams illustrating example aspects of purchase transaction clearance in some embodiments of the DPO, e.g., a Purchase Transaction Clearance ("PTC") component 2000.
Figure 20B:
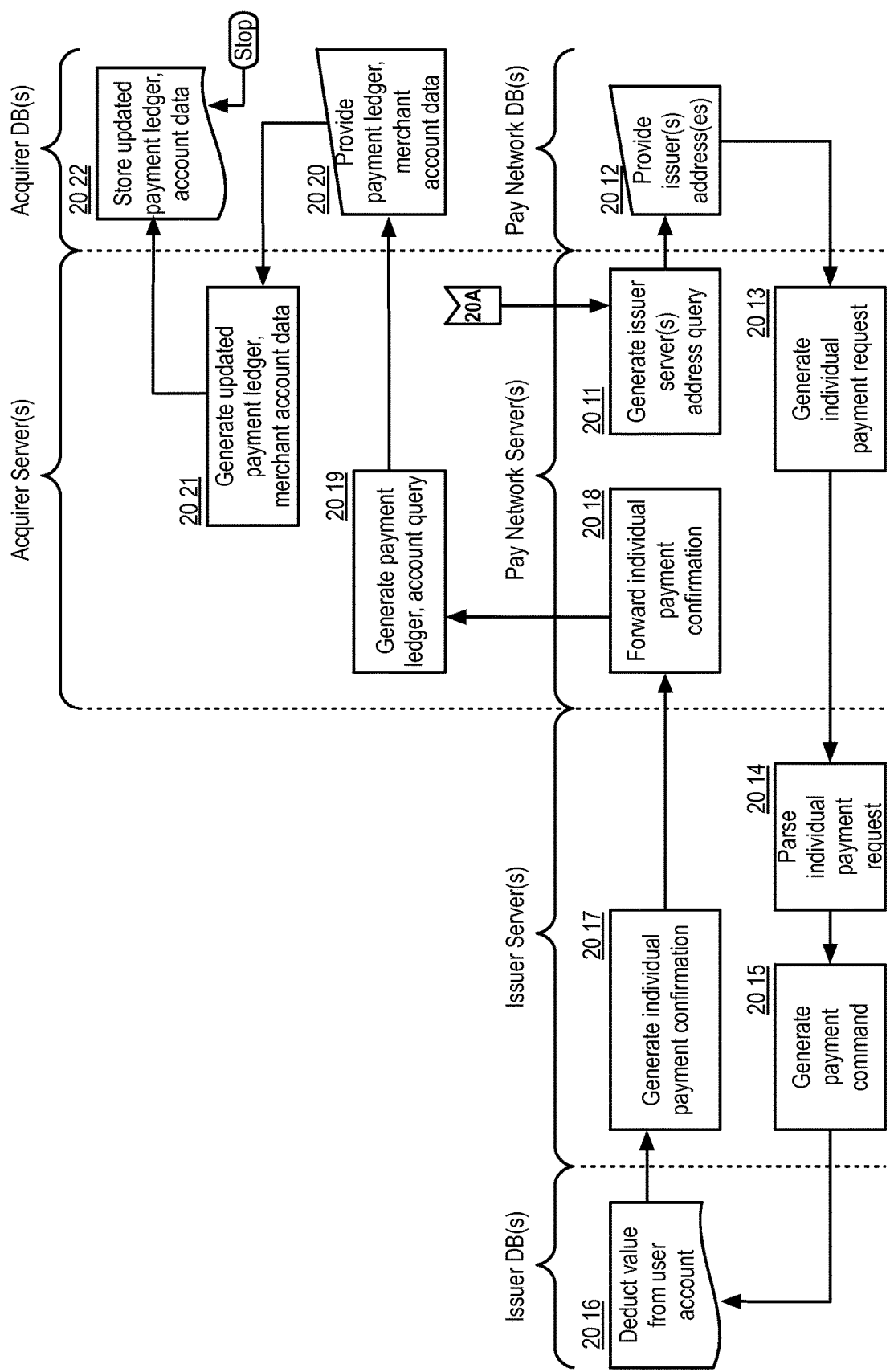

FIGS. 20A-B show logic flow diagrams illustrating example aspects of purchase transaction clearance in some embodiments of the DPO, e.g., a Purchase Transaction Clearance ("PTC") component 2000. With reference to FIG. 20A, in some embodiments, a merchant server may initiate clearance of a batch of authorized transactions. For example, the merchant server may generate a batch data request, e.g., 2001, and provide the request to a merchant database. In response to the batch data request, the database may provide the requested batch data, e.g., 2002. The server may generate a batch clearance request, e.g., 2003, using the batch data obtained from the database, and provide the batch clearance request to an acquirer server. The acquirer server may parse, e.g., 2004, the obtained batch clearance request, and generate, e.g., 2007, a batch payment request using the obtained batch clearance request to provide, the batch payment request to a pay network server. For example, the acquirer server may query, e.g., 2005, an acquirer database for an address of a payment network server, and utilize the obtained address, e.g., 2006, to forward the generated batch payment request to the pay network server.

The pay network server may parse the batch payment request obtained from the acquirer server, and extract the transaction data for each transaction stored in the batch payment request, e.g., 2008. The pay network server may store the transaction data, e.g., 2009, for each transaction in a pay network database. In some embodiments, the pay network server may invoke a component, e.g., 2010, to provide analytics based on the transactions of the merchant for whom purchase transaction are being cleared. For example, the pay network server may invoke a geographic transaction volume analytics component, such as the example component discussed below with reference to FIGS. 21-22.

With reference to FIG. 20B, in some embodiments, for each extracted transaction, the pay network server may query, e.g., 2011, a pay network database for an address of an issuer server. The pay network server may generate an individual payment request, e.g., 2013, for each transaction for which it has extracted transaction data, and provide the individual payment request to the issuer server. In some embodiments, the issuer server may parse the individual payment request, e.g., 2014, and generate a payment command, e.g., 2015, based on the parsed individual payment request. For example, the issuer server may issue a command to deduct funds from the user's account (or add a charge to the user's credit card account). The issuer server may issue a payment command, e.g., 2015, to a database storing the user's account information, e.g., a user profile database. The issuer server may provide an individual payment confirmation, e.g., 2017, to the pay network server, which may forward, e.g., 2018, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 2019, an acquirer database for payment ledger and/or merchant account data, e.g., 2020. The acquirer server may utilize payment ledger and/or merchant account data from the acquirer database, along with the individual payment confirmation, to generate updated payment ledger and/or merchant account data, e.g., 2021. The acquirer server may then store, e.g., 2022, the updated payment ledger and/or merchant account data to the acquire database.

Figure 21:
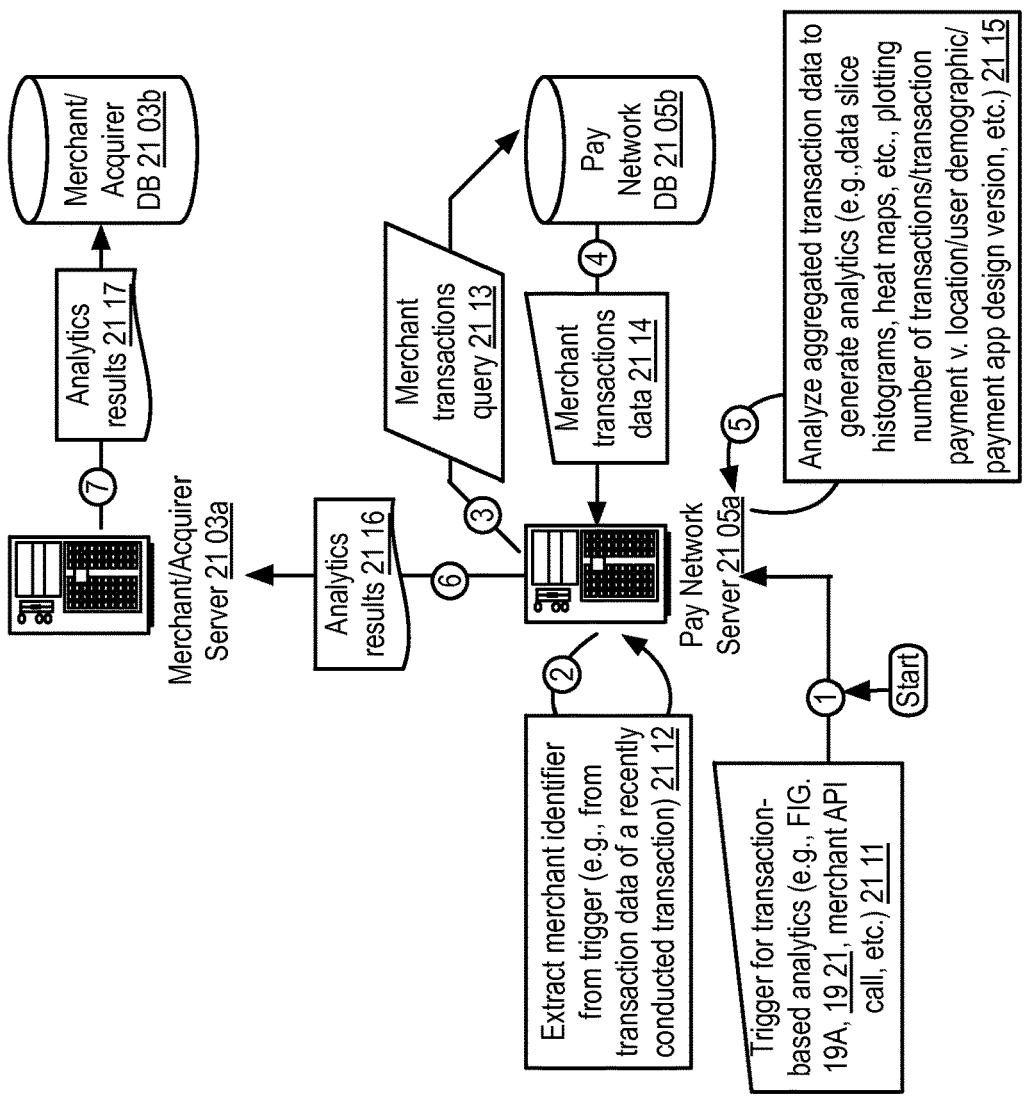
FIG. 21 shows a data flow diagram illustrating an example geographic transaction volume analytics procedure in some embodiments of the DPO.

FIG. 21 shows a data flow diagram illustrating an example geographic transaction volume analytics procedure in some embodiments of the DPO. In some embodiments, a pay network server, e.g., 2105a, or other entity or component within the DPO, may obtain a trigger to provide transaction-based analytics (see, e.g., FIG. 1519A, 1921). An example listing of a trigger 211, substantially in the form of a XML-formatted data, is provided below:

TABLE-US-00027

```
<?XML version = "1.0" encoding = "UTF-8"?> <analytics_trigger>
<trigger_ID>FDSK9058543</trigger_ID> <timestamp>2010-09-01
22:22:22</timestamp> <trigger_parameters>
<merchant_id>JTRE60594</merchant_id> <report_type>heat map</report_type>
<period>6mo</period> <geo_filter>US only</geo_filter> <resolution>city</resolution>
<report_format>JPEG XLS</report_format>
<transaction_filter>consumer</transaction_filter> <PoS_filter>online</PoS_filter>
<pay_filter>credit card</pay_filter> <report_address>mailto:reports@merchant.com
</report_address> </trigger_parameters> </analytics_trigger>
```

In some embodiments, the pay network server may parse the obtained trigger for transaction-based analytics, and extract a merchant identifier from the trigger, e.g., 2112. For example, the pay network may extract a 'merchant_id' field from transaction data relating to a transaction involving the merchant, embedded in the obtained trigger. The pay network server may attempt to aggregate the transactions of the merchant to service the trigger. For example, the trigger may provide filters, e.g., an indication of the type of transaction, time period of transaction, geographical region of transactions, and/or other attributes to be utilized in the transaction-based analytics. The pay network server may utilize the filters provided in the trigger data to query, e.g., 2113, a pay network database, e.g., 2105b, for transactions of the merchant. For example, the pay network server may utilize PHP/SQL commands similar to those described previously to send the merchant transactions query 2113 to the pay network database. In response, the pay network database may provide, e.g., 2114, the merchant transactions data satisfying the filters provided by the trigger obtained by the pay network server. In some embodiments, the pay network server may analyze the aggregated transaction data to generate the analytics. For example, based on the XML-encoded example trigger provided above, the pay network server may engage in an algorithm to provide a heat map of transactions in the US made by consumers using credit cards in an online environment, and provide a heat map, resolved at the level of cities within the US in .JPEG image and .XLS spreadsheet formats to the email address reports@merchant.com. The pay network server may provide, e.g., 2116, the analytics results to the merchant acquirer server according to the instructions provided in the trigger, or using default settings if available. In some embodiments, the merchant/acquirer server may be able to display the analytics results via a display system, and/or store, e.g., 2117, the analytics results to a merchant/acquirer database, e.g., 2103b.

Figure 22:
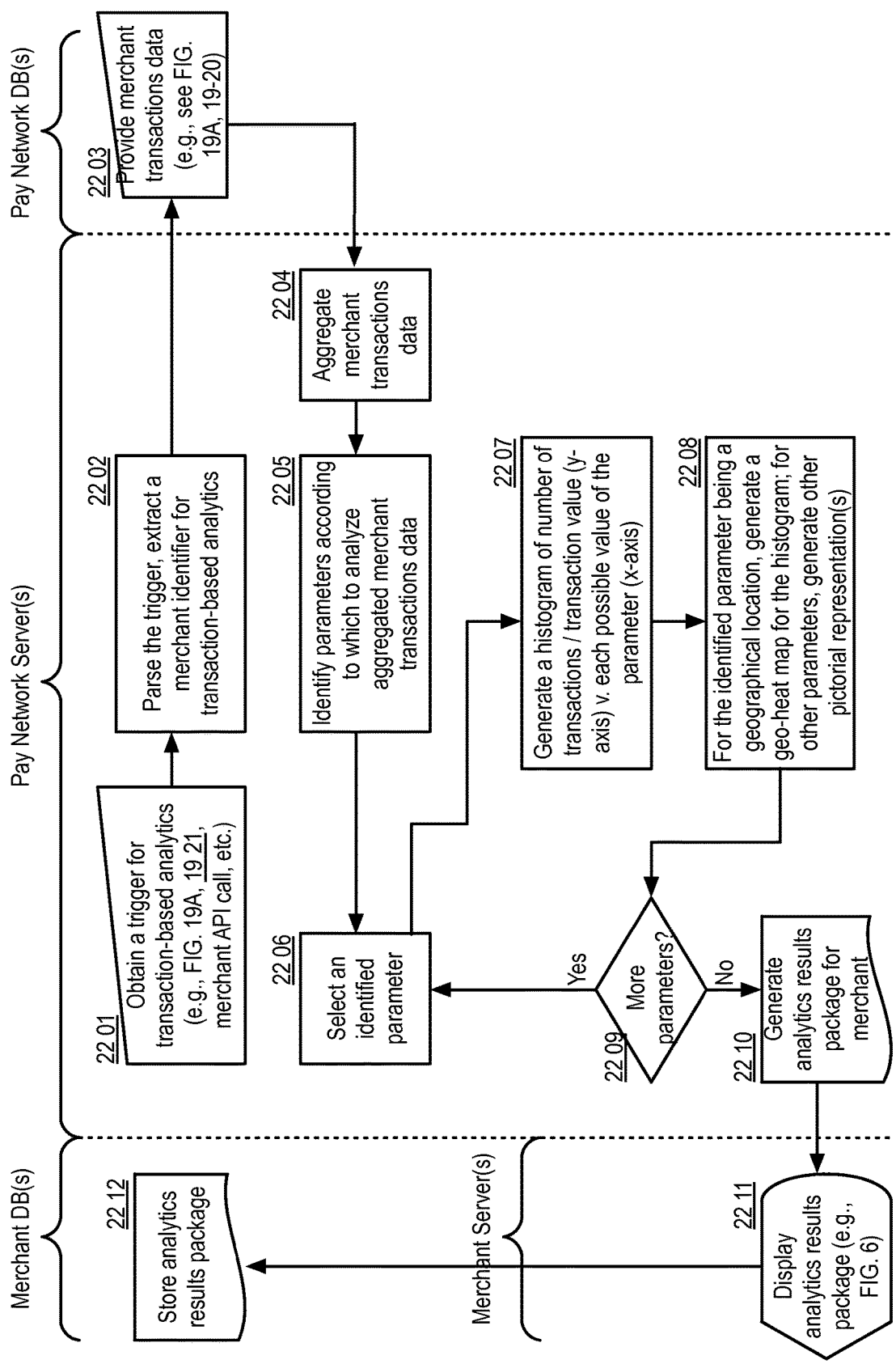
FIG. 22 shows a logic flow diagram illustrating example aspects of geographic transaction volume analytics in some embodiments of the DPO, e.g., a Geographic Transaction Volume Analytics ("GTVA") component 2200.

FIG. 22 shows a logic flow diagram illustrating example aspects of geographic transaction volume analytics in some embodiments of the DPO, e.g., a Geographic Transaction Volume Analytics ("GTVA") component 2200. In some embodiments, a pay network server or other entity or component within the DPO may obtain a trigger, e.g., 2201, to provide transaction-based analytics (see, e.g., FIG. 819A, 1921). In some embodiments, the pay network server may parse the obtained trigger for transaction-based analytics, and extract a merchant identifier from the trigger, e.g., 2202. For example, the pay network may extract a 'merchant_id' field from transaction data relating to a transaction involving the merchant, embedded in the obtained trigger. The pay network server may attempt to aggregate the transactions of the merchant to service the trigger. For example, the trigger may provide filters, e.g., an indication of the type of transaction, time period of transaction, geographical region of transactions, and/or other attributes to be utilized in the transaction-based analytics. The pay network server may utilize the filters provided in the trigger data to query, e.g., 2203, a pay network database for transactions of the merchant. In response, the pay network database may provide, e.g., 2203-2204, the merchant transactions data satisfying the filters provided by the trigger obtained by the pay network server. In some embodiments, the pay network server may analyze the aggregated transaction data to generate the analytics. For example, based on the XML-encoded example trigger provided above, the pay network server may engage in an algorithm to provide a heat map of transactions in the US made by consumers using credit cards in an online environment, and provide a heat map, resolved at the level of cities within the US in .JPEG image and .XLS spreadsheet formats to the email address reports@merchant.com. The pay network server may identify the parameters according to which to analyze the aggregated merchant transactions data, e.g., 2205. For example, the pay network server may select an identified parameters, e.g., 2206, and generate a histogram of the number of transactions or transaction volume against all possible values of that parameter, e.g., 2207. For example, if the parameter is "cities within the US," then the pay network server may generate a histogram plotting the number of transaction or total value of transaction against a y-axis, and a set of all cities within the US plotted against the x-axis. The pay network server may generate a graphical representation of the histogram, e.g., 2208. For example, if the identified parameter is a geographical parameter, then the pay network server may generate a map of the identified geographical region with a color scheme to represent volume/total value of transactions by resolvable region. As another example, the pay network server may generate bar graphs, pie charts, and/or like graphical representations, regardless of the type of parameter identified for analytics. In some embodiments, the pay network server may perform such histogram analysis, see e.g., 2209, option "Yes," for each identified parameter in the obtained trigger. In some embodiments, upon performing the analysis along each identified parameter, the pay network server may generate an analytics results package for the merchant, e.g., 2210. The pay network server may provide the analytics results to the merchant acquirer server according to the instructions provided in the trigger, or using default settings if available. In some embodiments, the merchant/acquirer server may be able to display the analytics results via a display system, e.g., 2211, and/or store, e.g., 2212, the analytics results to a merchant/acquirer database.

DPO Controller

FIG. 23 shows a block diagram illustrating embodiments of a DPO controller 2301. In this embodiment, the DPO controller 2301 may serve to aggregate, process, store, search, serve, identify, instruct, generate, match, and/or facilitate interactions with a computer through various technologies, and/or other related data.

Typically, users, e.g., 2333a, which may be people and/or other systems, may engage information technology systems (e.g., computers) to facilitate information processing. In turn, computers employ processors to process information; such processors 2303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DPO controller 2301 may be connected to and/or communicate with entities such as, but not limited to: one or more users from user input devices 2311; peripheral devices 2312; an optional cryptographic processor device 2328; and/or a communications network 2313. For example, the DPO controller 2301 may be connected to and/or communicate with users, e.g., 2333a, operating client device(s), e.g., 2333b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DPO controller 2301 may be based on computer systems that may comprise, but are not limited to, components such as: a computer systemization 2302 connected to memory 2329.

Computer Systemization

A computer systemization 2302 may comprise a clock 2330, central processing unit ("CPU(s)" and/or "processor(s)" (these terms are used interchangeable throughout the disclosure unless noted to the contrary)) 2303, a memory 2329 (e.g., a read only memory (ROM) 2306, a random access memory (RAM) 2305, etc.), and/or an interface bus 2307, and most frequently, although not necessarily, are all interconnected and/or communicating through a system bus 2304 on one or more (mother)board(s) 2302 having conductive and/or otherwise transportive circuit pathways through which instructions (e.g., binary encoded signals) may travel to effectuate communications, operations, storage, etc. The computer systemization may be connected to a power source 2386; e.g., optionally the power source may be internal. Optionally, a cryptographic processor 2326 and/or transceivers (e.g., ICs) 2374 may be connected to the system bus. In another embodiment, the cryptographic processor and/or transceivers may be connected as either internal and/or external peripheral devices 2312 via the interface bus I/O. In turn, the transceivers may be connected to antenna(s) 2375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DPO controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DPO controller and beyond through various interfaces. Should processing requirements dictate a greater amount speed and/or capacity, distributed processors (e.g., Distributed DPO), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the DPO may be achieved by implementing a microcontroller such as CAST's R8051XC2 microcontroller; Intel's MCS 51 (i.e., 8051 microcontroller); and/or the like. Also, to implement certain features of the DPO, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DPO component collection (distributed or otherwise) and/or features may be implemented via the microprocessor and/or via embedded components; e.g., via ASIC, coprocessor, DSP, FPGA, and/or the like. Alternately, some implementations of the DPO may be implemented with embedded components that are configured and used to achieve a variety of features or signal processing.

Depending on the particular implementation, the embedded components may include software solutions, hardware solutions, and/or some combination of both hardware/software solutions. For example, DPO features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DPO features. A hierarchy of programmable interconnects allow logic blocks to be interconnected as needed by the DPO system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the DPO may be developed on regular FPGAs and then migrated into a fixed version that more resembles ASIC implementations. Alternate or coordinating implementations may migrate DPO controller features to a final ASIC instead of or in addition to FPGAs. Depending on the implementation all of the aforementioned embedded components and microprocessors may be considered the "CPU" and/or "processor" for the DPO.

Power Source

The power source 2386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2386 is connected to at least one of the interconnected subsequent components of the DPO thereby providing an electric current to all subsequent components. In one example, the power source 2386 is connected to the system bus component 2304. In an alternative embodiment, an outside power source 2386 is provided through a connection across the I/O 2308 interface. For example, a USB and/or IEEE 1394 connection carries both data and power across the connection and is therefore a suitable source of power.

Interface Adapters

Interface bus(ses) 2307 may accept, connect, and/or communicate to a number of interface adapters, conventionally although not necessarily in the form of adapter cards, such as but not limited to: input output interfaces (I/O) 2308, storage interfaces 2309, network interfaces 2310, and/or the like. Optionally, cryptographic processor interfaces 2327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2309 may accept, communicate, and/or connect to a number of storage devices such as, but not limited to: storage devices 2314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2310 may accept, communicate, and/or connect to a communications network 2313. Through a communications network 2313, the DPO controller is accessible through remote clients 2333*b* (e.g., computers with web browsers) by users 2333*a*. Network interfaces may employ connection protocols such as, to but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DPO), architectures may similarly be employed to pool, load balance, and/or otherwise increase the communicative bandwidth required by the DPO controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2310 may be used to engage with various communications network types 2313. For example, multiple network interfaces may be employed to allow for the communication over broadcast, multicast, and/or unicast networks.

Input Output interfaces (I/O) 2308 may accept, communicate, and/or connect to user input devices 2311, peripheral devices 2312, cryptographic processor devices 2328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.m/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2311 often are a type of peripheral device 2312 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2312 may be connected and/or communicate to I/O and/or other facilities of the like such as network interfaces, storage interfaces, directly to the interface bus, system bus, the CPU, and/or the like. Peripheral devices may be external, internal and/or part of the DPO controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 2328), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DPO controller may be embodied as an embedded, dedicated, and/or monitor-less (i.e., headless) device, wherein access would be provided over a network interface connection.

Cryptographic units such as, but not limited to, microcontrollers, processors 2326, interfaces 2327, and/or devices 2328 may be attached, and/or communicate with the DPO controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2329. However, memory is a fungible technology and resource, thus, any number of memory embodiments may be employed in lieu of or in concert with one another. It is to be understood that the DPO controller and/or a computer systemization may employ various forms of memory 2329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2329 will include ROM 2306, RAM 2305, and a storage device 2314. A storage device 2314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2329 may contain a collection of program and/or database components and/or data such as, but not limited to: operating system component(s) 2315 (operating system); information server component(s) 2316 (information server); user interface component(s) 2317 (user interface); Web browser component(s) 2318 (Web browser); database(s) 2319; mail server component(s) 2321; mail client component(s) 2322; cryptographic server component(s) 2320 (cryptographic server); the DPO component(s) 2335; and/or the like (i.e., collectively a component collection). These components may be stored and accessed from the storage devices and/or from storage devices accessible through an interface bus. Although non-conventional program components such as those in the component collection, typically, are stored in a local storage device 2314, they may also be loaded and/or stored in memory such as: peripheral devices, RAM, remote storage facilities through a communications network, ROM, various forms of memory, and/or the like.

Operating System

The operating system component 2315 is an executable program component facilitating the operation of the DPO controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DPO controller to communicate with other entities through a communications network 2313. Various communication protocols may be used by the DPO controller as a subcarrier transport mechanism for interaction, such as, but not limited to: multicast, TCP/IP, UDP, unicast, and/or the like.

Information Server

An information server component 2316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (PTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DPO controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DPO database 2319, operating systems, other program components, user interfaces, Web browsers, and/or the like.

Access to the DPO database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DPO. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DPO as a query. Upon generating query results from the query, the results are passed over the bridge mechanism, and may be parsed formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DPO enabled nodes. The combined application may be nugatory on systems employing standard Web browsers.

Mail Server

A mail server component 2321 is a stored program component that is executed by a CPU 2303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DPO.

Access to the DPO mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2322 is a stored program component that is executed by a CPU 2303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2320 is a stored program component that is executed by a CPU 2303, cryptographic processor 2326, cryptographic processor interface 2327, cryptographic processor device 2328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DPO may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DPO component to engage in secure transactions if so desired. The cryptographic component facilitates the secure accessing of resources on the DPO and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DPO Database

The DPO database component 2319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DPO database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DPO database is implemented as a data-structure, the use of the DPO database 2319 may be integrated into another component such as the DPO component 2335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2319 includes several tables 2319*a*-*o*. A Users table 2319*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a DPO. A Devices table 2319*b* may include fields such as, but not limited to: device_ID, device_name, device_IP, device_MAC, device_type, device_model, device_version, device_OS, device_apps_list, device_securekey, wallet_app_installed_flag, and/or the like. An Apps table 2319c may include fields such as, but not limited to: app_ID, app_name, app_type, app_dependencies, and/or the like. An Accounts table 2319d may include fields such as, but not limited to: account_number, account_security_code, account_name, issuer_acquirer_flag, issuer_name, acquirer_name, account_address, routing_number, access_API_call, linked_wallets_list, and/or the like. A Merchants table 2319e may include fields such as, but not limited to: merchant_id, merchant_name, merchant_address, ip_address, mac_address, auth_key, port_num, security_settings_list, and/or the like. An issuers table 2319f may include fields such as, but not limited to: issuer_id, issuer_name, issuer_address, ip_address, mac_address, auth_key, port_num, security_settings_list, and/or the like. An Acquirers table 2319g may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 2319h may include fields such as, but not limited to: service_type, service_list, secure_ley, access_API_list, API_template_array, paygate_id, paygate_address, paygate_URL, paygate_name, payNET_id, payNET_address, payNET_URL, payNET_name, and/or the like. A Transactions table 2319i may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 2319j may include fields such as, but not limited to: batch_id, transaction_id_list, timestamp_list, cleared_flag_list, clearance_trigger_settings, and/or the like. A Ledgers table 2319k may include fields such as, but not limited to: request_id, timestamp, deposit_amount, batch_id, transaction_id, clear_flag, deposit_account, transaction_summary, payor_name, payor_account, and/or the like. A Products table 2319l may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 2319m may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 2319n may include fields such as, but not limited to: user_id, user_name, user_gaming_times_hist, user_gaming_list, user_product_purchase_categories_list, and/or the like. An Analytics table 2319o may include fields such as, but not limited to: merchant_id, timestamp, report_type, report_criterion_list, algorithm_list, results_array, and/or the like. A Social Graph table 2319p may include fields such as, but not limited to: user_id, user_name, user_graph_list, graph_weight_list, user_friend_list, user_enemy_list, user_posts_list, and/or the like. A Recommendations table 2319q may include fields such as, but not limited to: recommendation_id, recommendation_name, recommendsation_type, user_id, products_list, pricing_list, expriry_date, tax_info, and/or the like. A Currency Exchange table 2319r may include fields such as, but not limited to: currency_id, currency_name, currency_type, algorithm_pref_list, threshold_values, base_currency, and/or the like. A Geographical Customizations table 2319s may include fields such as, but not limited to: geo_id, geo_name, geo_UI_customizations_list, geo_currency_customizations_list, and/or the like.

In one embodiment, the DPO database may interact with other database systems. For example, employing a distributed database system, queries and data access by search DPO component may treat the combination of the DPO database, an integrated data security layer database as a single database entity.

In one embodiment, user programs may contain various user interface primitives, which may serve to update the DPO. Also, various accounts may require custom database tables depending upon the environments and the types of clients the DPO may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2319a-o. The DPO may be configured to keep track of various settings, inputs, and parameters via database controllers.

The DPO database may communicate to and/or with other components in a component collection, including itself, and/or facilities of the like. Most frequently, the DPO database communicates with the DPO component, other program components, and/or the like. The database may contain, retain, and provide information regarding other nodes and data.

The DPOs

The DPO component 2335 is a stored program component that is executed by a CPU. In one embodiment, the DPO component incorporates any and/or all combinations of the aspects of the DPO discussed in the previous figures. As such, the DPO affects accessing, obtaining and the provision of information, services, transactions, and/or the like across various communications networks.

The DPO component may transform requests for on-demand and flexible monetization and related services via DPO components into currency transfers, purchase receipt notifications, social networking communications and transaction analytics reports, and/or the like and use of the DPO. In one embodiment, the DPO component 2335 takes inputs (e.g., catalog browsing input 711, product cart data 729, product catalog 720, social search results 717, product selection input 725, checkout request input 911, product data 915, service authorization response 1115, service data 1121, wallet access input 1511, transaction authorization input 1514, payment gateway address 1518, payment network address 1522, issuer server address(es) 1525, user account(s) data 1528, user profile data 1713, batch data 1912, payment network address 1916, issuer server address(es) 1924, payment ledger, merchant account data 1931, merchant transactions data 2114, and/or the like) etc., and transforms the inputs via various components (e.g., UPC 2341, PTA 2342, PTC 343, PCB 2344, FMS 2345, VCC 2346, DPO 2347, P2P-SNM 2348, GTVA 2349, and/or the like), into outputs (e.g., product search response 723, display 724, updated product cart data 731, checkout data 917, display 918, service authorization confirmation/retry message 1117, flexible monetization service request 1113, checkout widget 1124, card authorization request 1516, 1519, 1523, batch append data 1534, purchase receipt 1535, social post confirmation 1717, user account credit command 1723, social marketing credit notification 1724, display credit notification 1725, batch payment request 1914, 1918, transaction data 1920, payment command 1927, individual payment confirmation 1928, 1929, updated payment ledger, merchant account data 1933, analytics results 2116, 2117, and/or the like).

The DPO component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DPO server employs a cryptographic server to encrypt and decrypt communications. The DPO component may communicate to and/or with other components in a component collection, including itself, and/or facilities of the like. Most frequently, the DPO component communicates with the DPO database, operating systems, other program components, and/or the like. The DPO may contain, communicate, generate, obtain, and/or provide program component, system, user, and/or data communications, requests, and/or responses.

Distributed DPOs

The structure and/or operation of any of the DPO node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DPO controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DPO controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

TABLE-US-00028

```
<?PHP header('Content-Type: text/plain'); $address =
'192.168.0.100'; $port = 255; $sock = socket_create(AF_INET, SOCK_STREAM, 0);
socket_bind($sock, $address, $port) or die('Could not bind to address');
socket_listen($sock); $client = socket_accept($sock); do { $input = ""; $input =
socket_read($client, 1024); $data .= $input; } while($input != ""); $obj =
json_decode($data, true); mysql_connect("201.408.185.132",$DBserver,$password); //
access database server mysql_select("CLIENT_DB.SQL"); // select database to append
mysql_query("INSERT INTO UserTable (transmission) VALUES ($data)"); // add data to
UserTable table in a CLIENT database mysql_close("CLIENT_DB.SQL"); // close
connection to database ?>
```

Also, the following resources may be used to provide example embodiments regarding SOAP parser implementation:

TABLE-US-00029 http://www.xav.com/perl/site/lib/SOAP/Parser.html
http://publib.boulder.ibm.com/infocenter/tivihelp/
v2r1/index.jsp?topic=/com.ibm.IBMDI.doc/
referenceguide295.htm and other parser implementations:

TABLE-US-00030 http://publib.boulder.ibm.com/infocenter/tivihelp/
v2r1/index.jsp?topic=/com.ibm.IBMDI.doc/
referenceguide259.htm all of which are hereby expressly incorporated by reference herein. As noted in FIGS. 1-2, "The Emergence of Monetization as a Service (MaaS) Platform," the "Technical Overview of Platform" slides, and "PlaySpan Monetization Platform API", from provisional application Ser. No. 61/456,118, the figures and disclosure therein depict the following:

Additional non-limiting exemplary embodiments of the DPO highlighting numerous further advantageous aspects include:

1. A virtual currency configuration processor-implemented method embodiment, comprising:

obtaining a request to convert a sale price provided in a real currency into a sale price in a virtual currency;

accessing a database to obtain at least one virtual currency management rule provided by a merchant;

identifying one among the at least one obtained virtual currency management rule to apply for converting the sale price provided in the real currency into the sale price in the virtual currency;

calculating, via a processor, the sale price in the virtual currency from the sale price provided in the real currency using the identified virtual currency management rule; and providing the calculated sale price in the virtual currency in response to the request.

2. The method of embodiment 1, wherein the identified virtual currency management rule includes a discrete pricing rule that specifies a higher virtual-to-real currency exchange rate for larger amounts of the real currency.

3. The method of embodiment 2, wherein the discrete pricing rule includes pre-specified minimum and maximum virtual currency sale price points, and discrete price points between the minimum and maximum virtual currency sale price points.

4. The method of embodiment 3, wherein the price points are configurable by the merchant.

5. The method of embodiment 3, wherein the discrete price points are optimized to maximize user purchasing behavior using analytics on prior user purchase transactions.

6. The method of embodiment 1, wherein the identified virtual currency management rule includes a smart pricing rule that specifies that the calculated sale price in the virtual currency be rounded to at least one significant digit.

7. The method of embodiment 6, wherein the smart pricing rule specifies that the virtual-to-real currency exchange rate be rounded to at least one significant digit.

8. The method of embodiment 6, wherein the smart pricing rule is configured to provide a rounded virtual currency sale price that maximizes user purchasing behavior.

9. The method of embodiment 8, wherein the smart pricing rule is configured using analytics on prior user purchase transactions.

10. The method of embodiment 6, wherein the virtual currency is rounded within pre-determined upper and lower bounds.

11. The method of embodiment 1, wherein the sale price in the virtual currency is calculated from the sale price provided in the real currency using a plurality of virtual currency management rules.

12. The method of embodiment 1, wherein the identified virtual currency management rule includes a linear pricing rule that specifies a first constant virtual-to-real currency exchange rate up to a threshold sale price in the real currency, and a second constant virtual-to-real currency exchange rate above the threshold sale price in the real currency.

13. The method of embodiment 11, wherein the plurality of virtual currency management rules includes a discrete pricing rule that specifies a higher virtual-to-real currency exchange rate for larger amounts of the real currency, and a smart pricing rule.

14. The method of embodiment 1, wherein a virtual-to-real currency exchange rate for calculating the sale price in the virtual currency from the sale price provided in the real currency depends on a payment mechanism.

15. The method of embodiment 11, wherein calculating the sale price in the virtual currency includes rounding both the sale price provided in the real currency and a virtual-to-real currency exchange rate.

16. The method of embodiment 15, wherein the virtual-to-real currency exchange rate varies with a cost of the payment mechanism.

17. The method of embodiment 1, wherein the request is obtained via an application programming interface call.

18. The method of embodiment 1, wherein the at least one virtual currency management rule can be modified by the merchant via a user interface.

19. The method of embodiment 18, wherein the merchant can create a plurality of virtual currencies for purchases from the merchant, and specify rules for currency conversion between the plurality of virtual currencies, wherein the plurality of currency management rules may be included in a virtual currency bundle, and wherein a discount level for any virtual currency bundle may vary based on a user-selected payment method and a device type from where the user procures the virtual currency bundle.

20. The method of embodiment 19, wherein the custom virtual currency is configured to be utilized only for user purchases from the merchant.

21. A virtual currency configuration system embodiment, comprising:
a processor; and
a memory disposed in communication with the processor and storing processor-executable instructions to:
obtain a request to convert a sale price provided in a real currency into a sale price in a virtual currency;
access a database to obtain at least one virtual currency management rule provided by a merchant;
identify one among the at least one obtained virtual currency a management rule to apply for converting the sale price provided in the real currency into the sale price in the virtual currency;
calculate the sale price in the virtual currency from the sale price provided in the real currency using the identified virtual currency management rule; and
provide the calculated sale price in the virtual currency in response to the request.

22. The system of embodiment 21, wherein the identified virtual currency management rule includes a discrete pricing rule that specifies a higher virtual-to-real currency exchange rate for larger amounts of the real currency.

23. The system of embodiment 22, wherein the discrete pricing rule includes pre-specified minimum and maximum virtual currency sale price points, and discrete price points between the minimum and maximum virtual currency sale price points.

24. The system of embodiment 23, wherein the price points are configurable by the merchant.

25. The system of embodiment 23, wherein the discrete price points are optimized to maximize user purchasing behavior using analytics on prior user purchase transactions.

26. The system of embodiment 21, wherein the identified virtual currency management rule includes a smart pricing rule that specifies that the calculated sale price in the virtual currency be rounded to at least one significant digit.

27. The system of embodiment 26, wherein the smart pricing rule specifies that the virtual-to-real currency exchange rate be rounded to at least one significant digit.

28. The system of embodiment 26, wherein the smart pricing rule is configured to provide a rounded virtual currency sale price that maximizes user purchasing behavior.

29. The system of embodiment 28, wherein the smart pricing rule is configured using analytics on prior user purchase transactions.

30. The system of embodiment 26, wherein the virtual currency is rounded within pre-determined upper and lower bounds.

31. The system of embodiment 21, wherein the sale price in the virtual currency is calculated from the sale price provided in the real currency using a plurality of virtual currency management rules.

32. The system of embodiment 21, wherein the identified virtual currency management rule includes a linear pricing rule that specifies a first constant virtual-to-real currency exchange rate up to a threshold sale price in the real currency, and a second constant virtual-to-real currency exchange rate above the threshold sale price in the real currency.

33. The system of embodiment 31, wherein the plurality of virtual currency management rules includes a discrete pricing rule that specifies a higher virtual-to-real currency exchange rate for larger amounts of the real currency, and a smart pricing rule.

34. The system of embodiment 21, wherein a virtual-to-real currency exchange rate for calculating the sale price in the virtual currency from the sale price provided in the real currency depends on a payment mechanism.

35. The system of embodiment 34, wherein calculating the sale price in the virtual currency includes rounding both the sale price provided in the real currency and a virtual-to-real currency exchange rate 36. The system of embodiment 35, wherein the virtual-to-real currency exchange rate varies with a cost of the payment mechanism.

37. The system of embodiment 21, wherein the request is obtained via an application programming interface call.

38. The system of embodiment 21, wherein the at least one virtual currency management rule can be modified by the merchant via a user interface.

39. The system of embodiment 38, wherein the merchant can create a plurality of virtual currencies for purchases from the merchant, and specify rules for currency conversion between the plurality of virtual currencies, wherein the plurality of currency management rules may be included in a virtual currency bundle, and wherein a discount level for any virtual currency bundle may vary based on a user-selected payment method and a device type from where the user procures the virtual currency bundle.

40. The system of embodiment 39, wherein the custom virtual currency is configured to be utilized only for user purchases from the merchant.

41. A processor-readable tangible medium embodiment storing processor-executable virtual currency configuration instructions to:
obtain a request to convert a sale price provided in a real currency into a sale price in a virtual currency;
access a database to obtain at least one virtual currency management rule provided by a merchant;
identify one among the at least one obtained virtual currency management rule to apply for converting the sale price provided in the real currency into the sale price in the virtual currency;
calculate the sale price in the virtual currency from the sale price provided in the real currency using the identified virtual currency management rule; and
provide the calculated sale price in the virtual currency in response to the request.

42. The medium of embodiment 41, wherein the identified virtual currency management rule includes a discrete pricing rule that specifies a higher virtual-to-real currency exchange rate for larger amounts of the real currency.

43. The medium of embodiment 42, wherein the discrete pricing rule includes pre-specified minimum and maximum virtual currency sale price points, and discrete price points between the minimum and maximum virtual currency sale price points.

44. The medium of embodiment 43, wherein the price points are configurable by the merchant.

45. The medium of embodiment 43, wherein the discrete price points are optimized to maximize user purchasing behavior using analytics on prior user purchase transactions.

46. The medium of embodiment 41, wherein the identified virtual currency management rule includes a smart pricing rule that specifies that the calculated sale price in the virtual currency be rounded to at least one significant digit.

47. The medium of embodiment 46, wherein the smart pricing rule specifies that the virtual-to-real currency exchange rate be rounded to at least one significant digit.

48. The medium of embodiment 46, wherein the smart pricing rule is configured to provide a rounded virtual currency sale price that maximizes user purchasing behavior.

49. The medium of embodiment 48, wherein the smart pricing rule is configured using analytics on prior user purchase transactions.

50. The medium of embodiment 46, wherein the virtual currency is rounded within pre-determined upper and lower bounds.

51. The medium of embodiment 41, wherein the sale price in the virtual currency is calculated from the sale price provided in the real currency using a plurality of virtual currency management rules.

52. The medium of embodiment 41, wherein the identified virtual currency management rule includes a linear pricing rule that specifies a first constant virtual-to-real currency exchange rate up to a threshold sale price in the real currency, and a second constant virtual-to-real currency exchange rate above the threshold sale price in the real currency.

53. The medium of embodiment 51, wherein the plurality of virtual currency management rules includes a discrete pricing rule that specifies a higher virtual-to-real currency exchange rate for larger amounts of the real currency, and a smart pricing rule.

54. The medium of embodiment 41, wherein a virtual-to-real currency exchange rate for calculating the sale price in the virtual currency from the sale price provided in the real currency depends on a payment mechanism.

55. The medium of embodiment 54, wherein calculating the sale price in the virtual currency includes rounding both the sale price provided in the real currency and a virtual-to-real currency exchange rate.

56. The medium of embodiment 55, wherein the virtual-to-real currency exchange rate varies with a cost of the payment mechanism.

57. The medium of embodiment 41, wherein the request is obtained via an application programming interface call.

58. The medium of embodiment 41, wherein the at least one virtual currency management rule can be modified by the merchant via a user interface.

59. The medium of embodiment 58, wherein the merchant can create a plurality of virtual currencies for purchases from the merchant, and specify rules for currency conversion between the plurality of virtual currencies, wherein the plurality of currency management rules may be included in a virtual currency bundle, and wherein a discount level for any virtual currency bundle may vary based on a user-selected payment method and a device type from where the user procures the virtual currency bundle.

60. The medium of embodiment 59, wherein the custom virtual currency is configured to be utilized only for user purchases from the merchant.

61. A geographically-resolved transaction volume analytics processor-implemented method embodiment, comprising:
obtaining a merchant identifier of a merchant;
aggregating data records of purchase transactions of users with the merchant;
parsing the aggregated data records to extract location identifying information of the users when engaging in the purchase transactions with the merchant;
generating, via a processor, a calculation of volume of transactions against geographical locations based on the extracted location identifying information and the aggregated data records; and
generating a graphical representation of the calculation of volume of transactions against geographical locations.

62. The method of embodiment 61, wherein the location identifying information extracted from the aggregated data records are computer network addresses.

63. The method of embodiment 61, wherein generating a calculation of volume of transactions against geographical locations includes generating a histogram of volume of transactions against geographical locations.

64. The method of embodiment 61, wherein the graphical representation is a geographical heat map.

65. The method of embodiment 64, wherein the geographical heat map is of one or more countries.

66. The method of embodiment 65, wherein transaction volume is represented in the geographical heat map by varying a size of one or more countries on the heat map according to transaction volumes associated with the one or more countries.

67. The method of embodiment 64, wherein the graphical representation includes dynamic scaling to utilize a spectrum of colors to represent the histogram of volume of transactions.

68. The method of embodiment 61, wherein the volume of transactions is defined as one of: a number of aggregated transactions; and a total sale price of aggregated transactions.

69. The method of embodiment 61, wherein the volume of transactions is defined as a ratio of users transacting with the merchant to users visiting a website of the merchant.

70. The method of embodiment 61, wherein the volume of transactions is defined as a number of aggregated transactions via a particular payment mechanism.

71. The method of embodiment 61, further comprising:
obtaining a geographical transaction volume analytics request from a merchant;
determining that the merchant providing the geographical transaction volume analytics request has the same identifier as the merchant enrolled in the geographically-resolved purchase transaction volume analytics service; and
providing the generated graphical representation of the histogram of volume of transactions against geographical locations to the merchant.

72. The method of embodiment 71, further wherein the generated graphical representation is provided via an online merchant console interface.

73. The method of embodiment 71, wherein the geographical transaction volume analytics request is obtained via an application programming interface call from the merchant.

74. A geographically-resolved transaction volume analytics system embodiment, comprising:
a processor; and
a memory disposed in communication with the processor and storing processor-executable instructions to:
obtain a merchant identifier of a merchant; aggregate data records of purchase transactions of users with the merchant; parse the aggregated data records to extract location identifying information of the users when engaging in the purchase transactions with the merchant;

generate a calculation of volume of transactions against geographical locations based on the extracted location identifying information and the aggregated data records; and generate a graphical representation of the calculation of volume of transactions against geographical locations.

75. The system of embodiment 74, wherein the location identifying information extracted from the aggregated data records are computer network addresses.

76. The system of embodiment 74, wherein generating a calculation of volume of transactions against geographical locations includes generating a histogram of volume of transactions against geographical locations.

77. The system of embodiment 74, wherein the graphical representation is a geographical heat map.

78. The system of embodiment 77, wherein the geographical heat map is of one or more countries.

79. The system of embodiment 78, wherein transaction volume is represented in the geographical heat map by varying a size of one or more countries on the heat map according to transaction volumes associated with the one or more countries.

80. The system of embodiment 77, wherein the graphical representation includes dynamic scaling to utilize a spectrum of colors to represent the histogram of volume of transactions.

81. The system of embodiment 74, wherein the volume of transactions is defined as one of: a number of aggregated transactions; and a total sale price of aggregated transactions.

82. The system of embodiment 74, wherein the volume of transactions is defined as a ratio of users transacting with the merchant to users visiting a website of the merchant.

83. The system of embodiment 74, wherein the volume of transactions is defined as a number of aggregated transactions via a particular payment mechanism.

84. The system of embodiment 74, the memory further storing instructions to:

obtain a geographical transaction volume analytics request from a merchant;

determine that the merchant providing the geographical transaction volume analytics request has the same identifier as the merchant enrolled in the geographically-resolved purchase transaction volume analytics service; and provide the generated graphical representation of the histogram of volume of transactions against geographical locations to the merchant.

85. The system of embodiment 84, further wherein the generated graphical representation is provided via an online merchant console interface.

86. The system of embodiment 84, wherein the geographical transaction volume analytics request is obtained via an application programming interface call from the merchant.

87. A processor-readable tangible medium embodiment storing processor-executable geographically-resolved transaction volume analytics instructions to: obtain a merchant identifier of a merchant;

aggregate data records of purchase transactions of users with the merchant;

parse the aggregated data records to extract location identifying information of the users when engaging in the purchase transactions with the merchant;

generate a calculation of volume of transactions against geographical locations based on the extracted location identifying information and the aggregated data records; and generate a graphical representation of the calculation of volume of transactions against geographical locations.

88. The medium of embodiment 87, wherein the location identifying information extracted from the aggregated data records are computer network addresses.

89. The medium of embodiment 87, wherein generating a calculation of volume of transactions against geographical locations includes generating a histogram of volume of transactions against geographical locations.

90. The medium of embodiment 87, wherein the graphical representation is a geographical heat map.

91. The medium of embodiment 90, wherein the geographical heat map is of one or more countries.

92. The medium of embodiment 91, wherein transaction volume is represented in the geographical heat map by varying a size of one or more countries on the heat map according to transaction volumes associated with the one or more countries.

93. The medium of embodiment 90, wherein the graphical representation includes dynamic scaling to utilize a spectrum of colors to represent the histogram of volume of transactions.

94. The medium of embodiment 87, wherein the volume of transactions is defined as one of: a number of aggregated transactions; and a total sale price of aggregated transactions.

95. The medium of embodiment 87, wherein the volume of transactions is defined as a ratio of users transacting with the merchant to users visiting a website of the merchant.

96. The medium of embodiment 87, wherein the volume of transactions is defined as a number of aggregated transactions via a particular payment mechanism.

97. The medium of embodiment 87, further storing instructions to:

obtain a geographical transaction volume analytics request from a merchant;

determine that the merchant providing the geographical transaction volume analytics request has the same identifier as the merchant enrolled in the geographically-resolved purchase transaction volume analytics service; and provide the generated graphical representation of the histogram of volume of transactions against geographical locations to the merchant.

98. The medium of embodiment 97, further wherein the generated graphical representation is provided via an online merchant console interface.

99. The medium of embodiment 97, wherein the geographical transaction volume analytics request is obtained via an application programming interface call from the merchant.

100. A person-to-person social network marketing processor-implemented method embodiment, comprising:

obtaining a product purchase request for a product, the product purchase request including an identifier of a user who made a communication about the product;

parsing, via a processor, the product purchase request to extract the identifier of the user who made the communication about the product;

querying a database for an account of the user using the extracted identifier; and generating a request to provide the account of the user with a credit in response to successful completion of processing of the product purchase request.

101. The method of embodiment 100, wherein the communication was made in one of: an online public forum; and a social networking site.

102. The method of embodiment 101, wherein the user is a member of a social graph of a consumer on whose behalf the product purchase request is obtained.

103. The method of embodiment 102, further comprising:
obtaining a social networking service identifier for the consumer; and
providing a notification of successful completion of processing of the product purchase request to the social networking service, using the social networking service identifier for the consumer.

104. The method of embodiment 103, further comprising:
obtaining a set of members of the consumer's social graph by querying the social networking service using the social networking service identifier for the consumer;
identifying a successfully completed purchase transaction of one of the set of members of the consumer's social graph that is related to the notification of successful completion of processing of the product purchase request provided to the social networking service;
querying a database for an account of the consumer; and
generating a request to provide the account of the consumer with a credit.

105. The method of embodiment 100, wherein the credit includes one of: cash value; a virtual currency reward; a product; an offer for purchase of a product; and a coupon.

106. The method of embodiment 100, wherein the account of the user is a social networking service account.

107. The method of embodiment 100, wherein the credit includes a cash value and a non-cash value.

108. The method of embodiment 103, wherein the notification of successful completion of processing of the product purchase request to the social networking service includes a link to generate a new product purchase request.

109. The method of embodiment 100, further comprising:
identifying a product category associated with the user product purchase request;
querying a database for products or offers related to the identified product category; generating a communication using the products or offers related to the identified product category; and
providing the generated communication for publication.

110. A person-to-person social network marketing system embodiment, comprising:
a processor; and
a memory disposed in communication with the processor and storing processor-executable instructions to:
obtain a product purchase request for a product, the product purchase request including an identifier of a user who made a communication about the product;
parse, via the processor, the product purchase request to extract the identifier of the user who made the communication about the product; query a database for an account of the user using the extracted identifier; and generate a request to provide the account of the user with a credit in response to successful completion of processing of the product purchase request.

111. The system of embodiment no, wherein the communication was made in one of: an online public forum; and a social networking site.

112. The system of embodiment 111, wherein the user is a member of a social graph of a consumer on whose behalf the product purchase request is obtained.

113. The system of embodiment 112, the memory further storing instructions to: obtain a social networking service identifier for the consumer; and
provide a notification of successful completion of processing of the product purchase request to the social networking service, using the social networking service identifier for the consumer.

114. The system of embodiment 113, the memory further storing instructions to:
obtain a set of members of the consumer's social graph by querying the social networking service using the social networking service identifier for the consumer;
identify a successfully completed purchase transaction of one of the set of members of the consumer's social graph that is related to the notification of successful completion of processing of the product purchase request provided to the social networking service;
query a database for an account of the consumer; and
generate a request to provide the account of the consumer with a credit.

115. The system of embodiment 110, wherein the credit includes one of: cash value; a virtual currency reward; a product; an offer for purchase of a product; and a coupon.

116. The system of embodiment no, wherein the account of the user is a social networking service account.

117. The system of embodiment no, wherein the credit includes a cash value and a non-cash value.

118. The system of embodiment 113, wherein the notification of successful completion of processing of the product purchase request to the social networking service includes a link to generate a new product purchase request.

119. The system of embodiment no, the memory further storing instructions to:
identify a product category associated with the user product purchase request;
query a database for products or offers related to the identified product category;
generate a communication using the products or offers related to the identified product category; and
provide the generated communication for publication.

120. A processor-readable tangible medium embodiment storing processor-executable person-to-person social network marketing instructions to:
obtain a product purchase request for a product, the product purchase request including an identifier of a user who made a communication about the product;
parse, via the processor, the product purchase request to extract the identifier of the user who made the communication about the product;
query a database for an account of the user using the extracted identifier; and
generate a request to provide the account of the user with a credit in response to successful completion of processing of the product purchase request.

121. The medium of embodiment 120, wherein the communication was made in one of: an online public forum; and a social networking site.

122. The medium of embodiment 121, wherein the user is a member of a social graph of a consumer on whose behalf the product purchase request is obtained.

123. The medium of embodiment 122, further storing instructions to: obtain a social networking service identifier for the consumer; and
provide a notification of successful completion of processing of the product purchase request to the social networking service, using the social networking service identifier for the consumer.

124. The medium of embodiment 123, further storing instructions to: obtain a set of members of the consumer's social graph by querying the social networking service using the social networking service identifier for the consumer;
identify a successfully completed purchase transaction of one of the set of members of the consumer's social graph that is related to the notification of successful completion of processing of the product purchase request provided to the social networking service;

query a database for an account of the consumer; and generate a request to provide the account of the consumer with a credit.

125. The medium of embodiment 120, wherein the credit includes one of: cash value; a virtual currency reward; a product; an offer for purchase of a product; and a coupon.

126. The medium of embodiment 120, wherein the account of the user is a social networking service account.

127. The medium of embodiment 120, wherein the credit includes a cash value and a non-cash value.

128. The medium of embodiment 123, wherein the notification of successful completion of processing of the product purchase request to the social networking service includes a link to generate a new product purchase request.

129. The medium of embodiment 120, further storing instructions to: identify a product category associated with the user product purchase request; query a database for products or offers related to the identified product category; generate a communication using the products or offers related to the identified product category; and provide the generated communication for publication.

130. A dynamic payment optimization processor-implemented method embodiment, comprising:

obtaining a user product purchase request for a user engaged in an online experience at a point of sale device;

identifying at least one attribute of at least one of: the user; the online experience; and the point of sale device via parsing the user product purchase request;

customizing, via a processor, one or more properties of a user interface for initiating a purchase transaction related to the user product purchase request, according to the identified at least one attribute of the user, the online experience or the point of sale device; and providing the customized user interface.

131. The method of embodiment 130, wherein the at least one attribute of the user is at least one of: the user's age; an approximate location of the user; an experience level of the user with the online experience; and a prior behavioral pattern of the user.

132. The method of embodiment 130, wherein the at least one attribute of the online experience is at least one of: an online experience type, an online experience genre; and an online experience game level.

133. The method of embodiment 130, wherein the at least one attribute of the point of sale device is at least one of: an approximate location of the point of sale device; a type of the point of sale device; a display attribute of the point of sale device; an orientation of the point of sale device; and a default language setting associated with the point of sale device.

134. The method of embodiment 130, wherein customizing one or more properties of the user interface includes customizing a number of displayed user interface element within the user interface display.

135. The method of embodiment 130, wherein customizing one or more properties of the user interface includes modifying a set of payment options displayed as available for initiating the purchase transaction related to the user product purchase request.

136. The method of embodiment 135, wherein modifying the set of payment options displayed as available for initiating the purchase transaction related to the user product purchase request includes modifying an order of display of the set of payment options displayed as available for initiating the purchase transaction related to the user product purchase request.

137. The method of embodiment 130, wherein the customized user interface is a user interface overlaid on top of the online experience.

138. The method of embodiment 136, wherein modifying the set of payment options is performed based on historic purchasing data on payment options utilized by one or more users.

139. The method of embodiment 138, wherein the one or more users are randomly segmented from a population of users for dynamic payment optimization testing.

140. The method of embodiment 130, wherein customizing one or more properties of a user interface includes customizing a language utilized in the user interface display.

141. The method of embodiment 130, wherein customizing one or more properties of a user interface includes customizing a currency utilized for the user product purchase request.

142. The method of embodiment 130, wherein customizing one or more properties of a user interface includes customizing an ordering of payment options provided within the user interface.

143. The method of embodiment 130, wherein customizing one or more properties of a user interface includes customizing a logo displayed within the user interface.

144. The method of embodiment 130, wherein customizing one or more properties of a user interface includes customizing offer and product pricing displayed within the user interface.

145. The method of embodiment 130, wherein the point of sale device is a user device.

146. A dynamic payment optimization system embodiment, comprising:

a processor; and a memory disposed in communication with the processor and storing processor-executable instructions to:

obtain a user product purchase request for a user engaged in an online experience at a point of sale device;

identify at least one attribute of at least one of: the user; the online experience; and the point of sale device via parsing the user product purchase request;

customize one or more properties of a user interface for initiating a purchase transaction related to the user product purchase request, according to the identified at least one attribute of the user, the online experience or the point of sale device; and provide the customized user interface.

147. The system of embodiment 146, wherein the at least one attribute of the user is at least one of: the user's age; an approximate location of the user; an experience level of the user with the online experience; and a prior behavioral pattern of the user.

148. The system of embodiment 146, wherein the at least one attribute of the online experience is at least one of: an online experience type, an online experience genre; and an online experience game level.

149. The system of embodiment 146, wherein the at least one attribute of the point of sale device is at least one of: an approximate location of the point of sale device; a type of the point of sale device; a display attribute of the point of sale device; an orientation of the point of sale device; and a default language setting associated with the point of sale device.

150. The system of embodiment 146, wherein customizing one or more properties of the user interface includes customizing a number of displayed user interface element within the user interface display.

151. The system of embodiment 146, wherein customizing one or more properties of the user interface includes modifying a set of payment options displayed as available for initiating the purchase transaction related to the user product purchase request.

152. The system of embodiment 151, wherein modifying the set of payment options displayed as available for initiating the purchase transaction related to the user product purchase request includes modifying an order of display of the set of payment options displayed as available for initiating the purchase transaction related to the user product purchase request.

153. The system of embodiment 146, wherein the customized user interface is a user interface overlaid on top of the online experience.

154. The system of embodiment 152, wherein modifying the set of payment options is performed based on historic purchasing data on payment options utilized by one or more users.

155. The system of embodiment 154, wherein the one or more users are randomly segmented from a population of users for dynamic payment optimization testing.

156. The system of embodiment 146, wherein customizing one or more properties of a user interface includes customizing a language utilized in the user interface display.

157. The system of embodiment 146, wherein customizing one or more properties of a user interface includes customizing a currency utilized for the user product purchase request.

158. The system of embodiment 146, wherein customizing one or more properties of a user interface includes customizing an ordering of payment options provided within the user interface.

159. The system of embodiment 146, wherein customizing one or more properties of a user interface includes customizing a logo displayed within the user interface.

160. The system of embodiment 146, wherein customizing one or more properties of a user interface includes customizing offer and product pricing displayed within the user interface.

161. The system of embodiment 146, wherein the point of sale device is a user device.

162. A processor-readable tangible medium embodiment storing processor-executable dynamic payment optimization instructions to:
obtain a user product purchase request for a user engaged in an online experience at a point of sale device;
identify at least one attribute of at least one of: the user; the online experience; and the point of sale device via parsing the user product purchase request; customize one or more properties of a user interface for initiating a purchase transaction related to the user product purchase request, according to the identified at least one attribute of the user, the online experience or the point of sale device; and provide the customized user interface.

163. The medium of embodiment 162, wherein the at least one attribute of the user is at least one of: the user's age; an approximate location of the user; an experience level of the user with the online experience; and a prior behavioral pattern of the user.

164. The medium of embodiment 162, wherein the at least one attribute of the online experience is at least one of: an online experience type, an online experience genre; and an online experience game level.

165. The medium of embodiment 162, wherein the at least one attribute of the point of sale device is at least one of: an approximate location of the point of sale device; a type of the point of sale device; a display attribute of the point of sale device; an orientation of the point of sale device; and a default language setting associated with the point of sale device.

166. The medium of embodiment 162, wherein customizing one or more properties of the user interface includes customizing a number of displayed user interface element within the user interface display.

167. The medium of embodiment 162, wherein customizing one or more properties of the user interface includes modifying a set of payment options displayed as available for initiating the purchase transaction related to the user product purchase request.

168. The medium of embodiment 167, wherein modifying the set of payment options displayed as available for initiating the purchase transaction related to the user product purchase request includes modifying an order of display of the set of payment options displayed as available for initiating the purchase transaction related to the user product purchase request.

169. The medium of embodiment 162, wherein the customized user interface is a user interface overlaid on top of the online experience.

170. The medium of embodiment 168, wherein modifying the set of payment options is performed based on historic purchasing data on payment options utilized by one or more users.

171. The medium of embodiment 170, wherein the one or more users are randomly segmented from a population of users for dynamic payment optimization testing.

172. The medium of embodiment 162, wherein customizing one or more properties of a user interface includes customizing a language utilized in the user interface display.

173. The medium of embodiment 162, wherein customizing one or more properties of a user interface includes customizing a currency utilized for the user product purchase request.

174. The medium of embodiment 162, wherein customizing one or more properties of a user interface includes customizing an ordering of payment options provided within the user interface.

175. The medium of embodiment 162, wherein customizing one or more properties of a user interface includes customizing a logo displayed within the user interface.

176. The medium of embodiment 162, wherein customizing one or more properties of a user interface includes customizing offer and product pricing displayed within the user interface.

177. The medium of embodiment 162, wherein the point of sale device is a user device.

178. A flexible monetization service processor-implemented method embodiment, comprising:
obtaining a request from a computing device of a merchant to process a user purchase checkout by a user from a point of sale device, the request including a merchant identifier;
determining that the merchant is authorized to obtain servicing of the request to process the user purchase checkout, by querying a database using the merchant identifier;
generating, via a processor, a user interface customized to the merchant and the point of sale device, upon determining that the merchant is authorized to obtain the service of the request; and providing the customized user interface to process the user purchase checkout by the user.

179. The method of embodiment 178, wherein the customized user interface is a widget.

180. The method of embodiment 178, wherein the request from the computing device of the merchant is encrypted via a hash algorithm.

181. The method of embodiment 178, wherein the customized user interface is configured to provide a purchase transaction processing service for the user at the point of sale device by communicating directly with the point of sale device, bypassing the computing device of the merchant.

182. The method of embodiment 178, wherein the customized user interface is configured to provide one or more services to conduct electronic transactions.

183. The method of embodiment 182, wherein the one or more services to conduct electronic transactions include at least one of: payment service provider transaction routing; risk management; micro-payment; subscription management; in-app optimization; storefronts and marketplaces; analytics; developer applications; virtual currency management; and customer support.

184. The method of embodiment 178, wherein the request to process a user purchase checkout is obtained via an application programming interface call by the merchant.

185. The method of embodiment 178, wherein the customized user interface is configured to facilitate user purchase checkout via a plurality of payment methods.

186. The method of embodiment 178, wherein the customized user interface is optimized to maximize a likelihood of the user completing the user purchase checkout from the point of sale device.

187. The method of embodiment 178, wherein the customized user interface includes a skin to match the appearance of an online experience provided by the merchant to the user at the point of sale device.

188. The method of embodiment 187, wherein the customized user interface is configured to display as an overlay over the online experience provided by the merchant to the user at the point of sale device.

189. The method of embodiment 178, wherein the point of sale device is a user device.

190. The method of embodiment 178, wherein the computing device of the merchant is the point of sale device at which the user purchase checkout is initiated.

191. The method of embodiment 178, wherein the customized user interface is designed for implementation within a web browser environment executing on the point of sale device.

192. The method of embodiment 178, wherein the customized user interface is a javascript module.

193. A flexible monetization service system embodiment, comprising:
a processor; and
a memory disposed in communication with the processor and storing processor-executable instructions to:
obtain a request from a computing device of a merchant to process a user purchase checkout by a user from a point of sale device, the request including a merchant identifier;
determine that the merchant is authorized to obtain servicing of the request to process the user purchase checkout, by querying a database using the merchant identifier;
generate, via the processor, a user interface customized to the merchant and the point of sale device, upon determining that the merchant is authorized to obtain the service of the request; and
provide the customized user interface to process the user purchase checkout by the user.

194. The system of embodiment 193, wherein the customized user interface is a widget.

195. The system of embodiment 193, wherein the request from the computing device of the merchant is encrypted via a hash algorithm.

196. The system of embodiment 193, wherein the customized user interface is configured to provide a purchase transaction processing service for the user at the point of sale device by communicating directly with the point of sale device, bypassing the computing device of the merchant.

197. The system of embodiment 193, wherein the customized user interface is configured to provide one or more services to conduct electronic transactions.

198. The system of embodiment 197, wherein the one or more services to conduct electronic transactions include at least one of: payment service provider transaction routing; risk management; micro-payment; subscription management; in-app optimization; storefronts and marketplaces; analytics; developer applications; virtual currency management; and customer support.

199. The system of embodiment 193, wherein the request to process a user purchase checkout is obtained via an application programming interface call by the merchant.

200. The system of embodiment 193, wherein the customized user interface is configured to facilitate user purchase checkout via a plurality of payment methods.

201. The system of embodiment 193, wherein the customized user interface is optimized to maximize a likelihood of the user completing the user purchase checkout from the point of sale device.

202. The system of embodiment 193, wherein the customized user interface includes a skin to match the appearance of an online experience provided by the merchant to the user at the point of sale device.

203. The system of embodiment 202, wherein the customized user interface is configured to display as an overlay over the online experience provided by the merchant to the user at the point of sale device.

204. The system of embodiment 193, wherein the point of sale device is a user device.

205. The system of embodiment 193, wherein the computing device of the merchant is the point of sale device at which the user purchase checkout is initiated.

206. The system of embodiment 193, wherein the customized user interface is designed for implementation within a web browser environment executing on the point of sale device.

207. The system of embodiment 193, wherein the customized user interface is a javascript module.

208. A processor-readable tangible medium embodiment storing processor-executable flexible monetization service instructions to:
obtain a request from a computing device of a merchant to process a user purchase checkout by a user from a point of sale device, the request including a merchant identifier;
determine that the merchant is authorized to obtain servicing of the request to process the user purchase checkout, by querying a database using the merchant identifier; generate, via a processor, a user interface customized to the merchant and the point of sale device, upon determining that the merchant is authorized to obtain the service of the request; and
provide the customized user interface to process the user purchase checkout by the user.

209. The medium of embodiment 208, wherein the customized user interface is a widget.

210. The medium of embodiment 208, wherein the request from the computing device of the merchant is encrypted via a hash algorithm.

211. The medium of embodiment 208, wherein the customized user interface is configured to provide a purchase transaction processing service for the user at the point of sale device by communicating directly with the point of sale device, bypassing the computing device of the merchant.

212. The medium of embodiment 208, wherein the customized user interface is configured to provide one or more services to conduct electronic transactions.

213. The medium of embodiment 212, wherein the one or more services to conduct electronic transactions include at least one of: payment service provider transaction routing; risk management; micro-payment; subscription management; in-app optimization; storefronts and marketplaces; analytics; developer applications; virtual currency management; and customer support.

214. The medium of embodiment 208, wherein the request to process a user purchase checkout is obtained via an application programming interface call by the merchant.

215. The medium of embodiment 208, wherein the customized user interface is configured to facilitate user purchase checkout via a plurality of payment methods.

216. The medium of embodiment 208, wherein the customized user interface is optimized to maximize a likelihood of the user completing the user purchase checkout from the point of sale device.

217. The medium of embodiment 208, wherein the customized user interface includes a skin to match the appearance of an online experience provided by the merchant to the user at the point of sale device.

218. The medium of embodiment 217, wherein the customized user interface is configured to display as an overlay over the online experience provided by the merchant to the user at the point of sale device.

219. The medium of embodiment 208, wherein the point of sale device is a user device.

220. The medium of embodiment 208, wherein the computing device of the merchant is the point of sale device at which the user purchase checkout is initiated.

221. The medium of embodiment 208, wherein the customized user interface is designed for implementation within a web browser environment executing on the point of sale device.

222. The medium of embodiment 208, wherein the customized user interface is a javascript module.

In order to address various issues and advance the art, the entirety of this application for DYNAMIC PAYMENT OPTIMIZATION APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DPO individual and/or enterprise user, database configuration and/or relational model, data type, data transmission and/or network framework, syntax structure, and/or the like, various embodiments of the DPO may be implemented that enable a great deal of flexibility and customization. For example, aspects of the DPO may be adapted for electronic service management, crowd-source management, order processing, and/or the like. While various embodiments and discussions of the DPO have been directed to electronic commerce, however, it is to be understood that the embodiments described herein may be readily configured and/or customized for a wide variety of other applications and/or implementations.

What is claimed is:

1. A dynamic payment optimization processor-implemented method, comprising:

obtaining, by one or more data processors, a user product purchase request for a user engaged in a transaction for goods or services at a user trusted computing device having a plurality of user trusted computing device attributes;

identifying, by the one or more data processors, in the obtained plurality of user trusted computing device attributes, at least one user trusted computing device attribute to customize the user trusted computing device user interface;

querying, by the one or more data processors, a database for a widget user interface template associated with the identified at least one user trusted computing device attribute and with a merchant identifier; determining, by the one or more data processors, a transaction session for the user engaged in the transaction for the good or service, wherein the transaction session includes a session identifier;

obtaining, by the one or more data processors, using the session identifier, at least one profile characteristic for the user engaged in the transaction;

customizing for the transaction session, by the one or more data processors, based on the widget user interface template using the at least one profile characteristic for the user engaged in the transaction and the identified at least one user trusted computing device attribute and additionally the merchant identifier for customizing the widget user interface template to a specific merchant, said customized widget user interface defining user interface elements on the user trusted computing device for the user for interactions with the user, said defined user interface elements comprising one or more of the following:

a user interface element on the user trusted computing device for capturing and detecting a product identifier;

a user interface element on the user trusted computing device for searching for products;

a user interface element on the user trusted computing device for switching between screens;

a user interface element for displaying a location indication;

a user interface element for displaying and accepting payment options;

a user interface element for displaying a user profile and accepting modifications to the user profile; and providing, by the one or more data processors, the customized widget user interface template for use by the user trusted computing device.

2. The method of claim 1, additionally comprising:
determining a session for the user engaged in the transaction for goods or services, wherein the session includes a session identifier; and
obtaining, using the session identifier, at least one profile characteristic for the user engaged in the transaction.

3. The method of claim 2, wherein customizing the widget user interface template includes customizing based on information associated with the determined session.

4. The method of claim 3, wherein the user trusted computing device is one of: a merchant credit card terminal, a user device, a point-of-sale terminal, and a smart phone.

5. The method of claim 1, wherein the at least one user trusted computing device attribute to customize the user trusted computing device user interface comprises a device screen size.

6. The method of claim 1, wherein the at least one user trusted computing device attribute to customize the user trusted computing device user interface comprises a device location.

7. The method of claim 1, wherein providing the customized widget user interface template for use by the user trusted computing device includes configuring the widget user interface for use as a user trusted computing device user interface overlay.

8. The method of claim 1, wherein customizing the widget user interface template includes customizing the widget user interface template to display a custom logo.

9. The method of claim 1, wherein customizing the widget user interface template includes customizing an ordering of payment options.

10. The method of claim 1, wherein the widget user interface template is customized based on a factor that is one of: a payment method, a user location, a user device capability and a user trusted computing device capability.

11. The method of claim 10, wherein the factor is a plurality of payment methods associated with the user's virtual wallet.

12. The method of claim 11, wherein the user interface template customization includes re-ordering the plurality of payment methods into an order that is more likely to have the user complete a transaction.

13. The method of claim 12, wherein payment methods accepted in a given region are ordered higher.

14. The method of claim 12, wherein payment methods accepted by a merchant are ordered higher.

15. The method of claim 12, wherein payment methods preferred by the user are ordered higher.

16. A dynamic payment optimization processor-implemented apparatus, comprising:
a memory; and
a processor disposed in communication with said memory, and configured to execute a plurality of processing instructions stored in the memory, wherein the processor executes instructions to:
obtain a user product purchase request for a user engaged in a transaction for goods or services at a user trusted computing device and a plurality of user trusted computing device attributes;
identify, in the obtained plurality of user trusted computing device attributes, at least one user trusted computing device attribute to customize the user trusted computing device user interface;
query a database for a widget user interface template associated with the identified at least one user trusted computing device attribute and with a merchant identifier;
customize, via a processor, the widget user interface template using the identified at least one user trusted computing device attribute and the merchant identifier for customizing the widget user interface template to a specific merchant, said customized widget user interface defining user interface elements on the user trusted computing device for the user for interactions with the user, said defined user interface elements comprising one or more of the following:
a user interface element on the user trusted computing device for capturing and detecting a product identifier;
a user interface element on the user trusted computing device for searching for products;
a user interface element on the user trusted computing device for switching between screens;
a user interface element for displaying a location indication;
a user interface element for displaying and accepting payment options;
a user interface element for displaying a user profile and accepting modifications to the user profile; and
provide the customized widget user interface template for use by the user trusted computing device.

17. The apparatus of claim 16, wherein the process is further configured to execute instructions to:

determine a session for the user engaged in the transaction for goods or services, wherein the session includes a session identifier; and obtain, using the session identifier, at least one profile characteristic for the user engaged in the transaction.

18. A dynamic payment optimization processor-implemented system, comprising:

an interface for obtaining a user product purchase request for a user engaged in a transaction for goods or services at a user trusted computing device and a plurality of user trusted computing device attributes;

a processor configured to execute computer-executable instructions for:

identifying, in the obtained plurality of user trusted computing device attributes, at least one user trusted computing device attribute to customize the user trusted computing device user interface;

querying a database for a widget user interface template associated with the identified at least one user trusted computing device attribute and with a merchant identifier;

customizing the widget user interface template using the identified at least one user trusted computing device attribute and the merchant identifier for customizing the widget user interface template to a specific merchant, said customized widget user interface defining user interface elements on the user trusted computing device for the user for interactions with the user, said defined user interface elements comprising one or more of the following:

a user interface element on the user trusted computing device for capturing and detecting a product identifier;

a user interface element on the user trusted computing device for searching for products;

a user interface element on the user trusted computing device for switching between screens;

a user interface element for displaying a location indication;

a user interface element for displaying and accepting payment options;

a user interface element for displaying a user profile and accepting modifications to the user profile; and wherein the interface provides the customized widget user interface template for use by the user trusted computing device.

19. The system of claim 18, wherein the processor is configured for:

determining a session for the user engaged in the transaction for goods or services, wherein the session includes a session identifier; and obtaining, using the session identifier, at least one profile characteristic for the user engaged in the transaction.

* * * * *